(12) United States Patent
Kirchhoffer et al.

(10) Patent No.: US 11,979,584 B2
(45) Date of Patent: May 7, 2024

(54) ARITHMETIC ENCODERS AND DECODERS, VIDEO ENCODERS AND DECODERS, METHODS FOR ENCODING OR DECODING SYMBOLS, AND METHODS FOR ENCODING OR DECODING VIDEO CONTENT

(71) Applicant: Fraunhofer-Gesellschaft zur Förderung der angewandten Forschung e.V., Munich (DE)

(72) Inventors: Heiner Kirchhoffer, Berlin (DE); Detlev Marpe, Berlin (DE); Benjamin Bross, Berlin (DE); Phan Hoang Tung Nguyen, Berlin (DE); Christian Rudat, Berlin (DE); Heiko Schwarz, Berlin (DE); Thomas Wiegand, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 162 days.

(21) Appl. No.: 17/702,979

(22) Filed: Mar. 24, 2022

(65) Prior Publication Data
US 2022/0239924 A1 Jul. 28, 2022

Related U.S. Application Data

(63) Continuation of application No. PCT/EP2020/076740, filed on Sep. 24, 2020.

(30) Foreign Application Priority Data

| Sep. 24, 2019 | (EP) | 19199403 |
| Oct. 2, 2019 | (EP) | 19201213 |
| Dec. 30, 2019 | (EP) | 19220134 |

(51) Int. Cl.
*H04N 19/149* (2014.01)
*H04N 19/172* (2014.01)
(Continued)

(52) U.S. Cl.
CPC ......... *H04N 19/149* (2014.11); *H04N 19/172* (2014.11); *H04N 19/184* (2014.11); *H04N 19/46* (2014.11)

(58) Field of Classification Search
CPC .. H04N 19/149; H04N 19/172; H04N 19/184; H04N 19/46
(Continued)

(56) References Cited

U.S. PATENT DOCUMENTS

| 2013/0177069 A1* | 7/2013 | Sze ..................... H04N 19/60 375/240.02 |
| 2016/0295214 A1* | 10/2016 | Gamei ................ H04N 19/176 |

FOREIGN PATENT DOCUMENTS

| CN | 1703089 A | 11/2005 |
| WO | 2011128268 A1 | 10/2011 |

OTHER PUBLICATIONS

Alshin A et al, "Removal of infrequently used context models", No. m48690, (Jul. 5, 2019), 127. MPEG Meeting; Jul. 8-Jul. 12, 2019; Gothenburg; (Motion Picture Expert Group or ISO/IEC JTC1/SC29/WG11), URL: http://phenix.intevry.fr/mpeg/doc_end_user/documents/127_Gothenburg/wg11/m48690-JVET-O0554-v3-JVET-O0554-v3.zip JVET_00554-v2.docx or JVET-O00554.pptx, (Jul. 5, 2019), XP030222177 or XP030222178.

(Continued)

*Primary Examiner* — Allen C Wong
(74) *Attorney, Agent, or Firm* — NKL LAW; Jae Youn Kim

(57) ABSTRACT

Arithmetic encoder for encoding a plurality of symbols is configured to derive an interval size information for an arithmetic encoding of one or more symbol values to be encoded on the basis of one or more state variable value, in a first mode of operation, and to update the one or more state variable values and/or the interval size information for an encoding of one or more subsequent symbol values to be
(Continued)

encoded in the first mode; in a second mode, the arithmetic encoder is configured to disable an update of the one or more state variable values and/or of the interval size information. Additionally, further embodiments of arithmetic encoders and decoders and video encoders and decoders are described.

17 Claims, 24 Drawing Sheets

(51) Int. Cl.
  *H04N 19/184* (2014.01)
  *H04N 19/46* (2014.01)
(58) Field of Classification Search
  USPC .................................................. 375/240.02
  See application file for complete search history.

(56) References Cited

OTHER PUBLICATIONS

Abe K et al, "AHG14: CABAC skip mode", No. JVET-N0207, (Mar. 25, 2019), 14. JVET Meeting; Mar. 19-Mar. 27, 2019; Geneva; (The Joint Video Exploration Team of ISO/IEC JTC1/SC29/WG11 and ITU-T SG.16 ),URL:http://phenix.intevry.fr/jvet/doc_end_user/documents/14_Geneva/wg11/JVET-N0207-v4.zip JVET-N0207-v2.doc, (Mar. 25, 2019), XP030256688.

Kirchhoffer H et al., "Description of Core Experiment 5 (CE5): Arithmetic Coding Engine", No. JVET-K1025, (Sep. 24, 2018), 11. JVET Meeting; Jul. 11-Jul. 18, 2018; Ljubljana; (The Joint Video Exploration Team of ISO/IEC JTC1/SC29/WG11 and ITU-T SG.16 ),, URL: http://phenix.int-evry.fr/jvet/doc_end_user/documents/11_Ljubljana/wg11/JVET-K1025-v4.zip JVET-K1025-v4.docx, (Sep. 24, 2018), XP030249859.

Bross B et al., "Versatile Video Coding (Draft 6)", No. m49908, (Jul. 31, 2019), 127. MPEG Meeting; Jul. 8-Jul. 12, 2019; Gothenburg; (Motion Picture Expert Group or ISO/IEC JTC1/SC29/WG11),, URL: http://phenix.intevry.fr/mpeg/doc_end_user/documents/127_Gothenburg/wg11/m49908-JVET-O2001-v14-JVET-O2001-vE.zip JVET-O2001-vE.docx, (Jul. 31, 2019), XP030208568.

ITU-T, "Advanced video coding for generic audiovisual services", Series H: Audiovisual and Multimedia Systems Infrastructure of audiovisual services—Coding of moving video, H.264, Jun. 2019.

ITU-T, "High efficiency video coding", Series H: Audiovisual and Multimedia Systems Infrastructure of audiovisual services—Coding of moving video, H.265, Jun. 2019.

Xi Hu, The First Office Action, Application No. 202080080942.9, Feb. 8, 2024, 11pages, China National Intellectual Property Administration.

* cited by examiner

ARITHMETIC ENCODERS AND DECODERS, VIDEO ENCODERS AND DECODERS, METHODS FOR ENCODING OR DECODING SYMBOLS, AND METHODS FOR ENCODING OR DECODING VIDEO CONTENT

CROSS-REFERENCES TO RELATED APPLICATIONS

This application is a continuation of copending International Application No. PCT/EP2020/076740, filed Sep. 24, 2020, which is incorporated herein by reference in its entirety, and additionally claims priority from European Applications Nos. EP 19199403.7, filed Sep. 24, 2019, EP 19201213.6, filed Oct. 2, 2019, and EP 19220134.1, filed Dec. 30, 2019, all of which are incorporated herein by reference in their entirety.

Embodiments of the invention refer to arithmetic encoders. Further embodiments refer to arithmetic decoders. Further embodiments refer to video encoders or video decoders.

Further embodiments of the invention refer to methods for encoding symbols having symbol values. Further embodiments of the invention refer to methods for decoding symbols having symbol values. Further embodiments of the invention refer to methods for encoding video content. Further embodiments of the invention refer to methods for decoding video content.

Embodiments according to the invention are related to decoders and encoders of digitally represented content (like e.g. video signals, audio signals, parameters of neural networks, etc.) which employ, for example, entropy encoding and decoding of binary decisions (or, optionally, decisions having more than two states).

An embodiment according to the invention is related to a probability estimation method for binary entropy encoding or decoding, which can be used, for example, in video encoders, video decoders but also in image encoders, image decoders, audio encoders, audio decoders, encoders and decoder for parameters of neural networks and the like. In this context, binary entropy encoding or decoding denotes any approach that encodes or decodes a sequence of binary decisions where the binary entropy encoder or decoder may (or in some cases will be provided with a probability estimate for each binary decision prior to the encoding or decoding of the decision. These probability estimates are provided, for example, by a probability estimation method, which may be the same in encoder and decoder. For example, the M coder of CABAC of the HEVC video compression standard is such a binary entropy coding scheme. Another example is the PIPE coding concept.

BACKGROUND OF THE INVENTION

Arithmetic encoding and decoding is proven to be a valuable tool in the encoding and decoding of audio and video contents and also in the encoding of other types of information, like pictures, neural network coefficients and the like. Embodiments of the invention can be used for all of these applications. For example, it is possible to exploit known occurrence probabilities of binary values (e.g., symbols) in a binary sequence representing a video or audio content (or other types of content) to increase encoding efficiency.

However, for arithmetic encoding and decoding to bring an optimal coding efficiency, it is important to have a good information about the probabilities the symbol values which well reflects an actual frequency of occurrence.

In order to adapt to the probabilities of "0"s and "1"s (or generally, to adapt to probabilities of the symbols to be encoded), a concept is typically used to adjust boundaries of intervals within a total (current) range of values, to obtain an interval sub-division (for example, such that a full range of values is sub-divided into intervals associated with different binary values or groups of binary values).

In other words, information about the probabilities of different symbols (like "0"s and "1"s) is used to derive an interval size which describes a width of an interval associated with a symbol (wherein a total interval width (e.g. an overall coding interval size value) may, for example, vary over time depending on the encoding or decoding process).

Accordingly, there is a need for concepts for the determination of an interval size information (e.g. a probability estimate) and/or an interval size for the encoding or decoding process, e.g. for the interval sub-division (e.g., for the sub-division of a total coding interval), which provide a good tradeoff between a high compression rate, and computational efficiency.

SUMMARY

An embodiment may have an arithmetic decoder for decoding a plurality of symbols having symbol values, wherein the arithmetic decoder is configured to derive an interval size information for an arithmetic decoding of one or more symbol values to be decoded on the basis of one or more state variable values, which represent statistics of a plurality of previously decoded symbol values in a first mode of operation and to update the one or more state variable values and/or the interval size information for a decoding of one or more subsequent symbol values to be decoded in the first mode; wherein the arithmetic decoder is configured to disable an update of the one or more state variable values and/or of the interval size information in a second mode; wherein the arithmetic decoder is configured to receive a side information indicating whether the first mode, in which the update of the one or more state variable values and/or of the interval size information is enabled, or the second mode, in which the update of the one or more state variable values and/or of the interval size information is disabled, is used.

Another embodiment may have an arithmetic encoder for encoding a plurality of symbols having symbol values, wherein the arithmetic encoder is configured to derive an interval size information for an arithmetic encoding of one or more symbol values to be encoded on the basis of one or more state variable values, which represent statistics of a plurality of previously encoded symbol values in a first mode of operation and to update the one or more state variable values and/or the interval size information for an encoding of one or more subsequent symbol values to be encoded in the first mode; wherein the arithmetic encoder is configured to disable an update of the one or more state variable values 364 and/or of the interval size information in a second mode; wherein the arithmetic encoder is configured to provide a side information indicating whether the first mode, in which the update of the one or more state variable values and/or of the interval size information is enabled, or the second mode, in which the update of the one or more state variable values and/or of the interval size information is disabled, is used.

Yet another embodiment may have a method for decoding a plurality of symbols having symbol values, wherein the method may have the step of: deriving an interval size information for an arithmetic decoding of one or more symbol values to be decoded on the basis of one or more state variable values, which represent statistics of a plurality of previously decoded symbol values in a first mode of operation and to update the one or more state variable values and/or the interval size information for a decoding of one or more subsequent symbol values to be decoded in the first mode; wherein the method may have the step of: disabling an update of the one or more state variable values and/or of the interval size information in a second mode; wherein the method may have the step of: receiving a side information indicating whether the first mode, in which the update of the one or more state variable values and/or of the interval size information is enabled, or the second mode, in which the update of the one or more state variable values and/or of the interval size information is disabled, is used.

According to still another embodiment, a non-transitory digital storage medium may have a computer program stored thereon to perform the inventive method, when said computer program is run by a computer.

Embodiments of the invention may refer to encoders, such as arithmetic encoders and video encoders, and decoders, such as arithmetic decoders and video decoders. For example, the described decoders may allow for a decoding of information encoded by the described encoders. Correspondingly, the described encoders may allow for an encoding of information so that the described decoders are able to decode the encoded information. Thus, implementations of the inventive concepts may include features implemented on the encoder side or on the decoder side or on both sides. Accordingly, functionalities and advantages of features described with respect to the encoder side or the decoder side may equivalently or similarly apply to the corresponding features on the decoder side or the encoder side respectively, although the description may not be explicitly repeated. Further, some of the described features may be implemented in multiple of the described aspects of the invention. Functionalities and advantages of a feature described with respect to a specific aspect may equivalently or similarly apply to an implementation of the corresponding feature in the context of other aspects, although the description is not explicitly repeated. Embodiments of the invention may combine individual features and combinations thereof described with respect to the aspects of the invention.

A first aspect of the invention relies on the idea to implement two or more operation modes for an encoding or a decoding of a symbol value so that for each of the operation modes, the trade-off between compression rate and computational effort may be chosen individually. In the first operation mode, the symbol value to be encoded or decoded is used for updating one or more state variable values and/or an interval size information, which are used for determining an interval size for an arithmetic encoding or decoding of one or more subsequent symbol values to be encoded or decoded. Thus, the encoding or decoding of the subsequent symbol value may be performed in dependence on the symbol value to be currently encoded or decoded, that is, the symbol value that directly precedes the subsequent symbol value. Considering the directly preceding symbol value may provide for an accurate estimation of an interval size information associated with a symbol value, for example a probability estimate for a symbol value, and may thus allow for a high compression. In the second operation mode, the encoder or decoder disables the update of the one or more state variable values and/or the interval size information, saving computational power. Therefore, a higher data throughput may be achieved. As the encoder or decoder may operate in the first or in the second operation mode, the operation of the encoder or decoder may be adapted to current requirements for the encoding or decoding process or the bitstream provided by the encoder or received by the decoder. In particular, in situations, in which symbol values to be encoded are expected to stay constant, i.e. a probability for a change of the symbol value is estimated to be low, disabling the update of the state variable values and/or the interval size information may allow for an increased throughput while the compression rate may be only little affected. For example, the interval size information may be determined in dependence on the context model for the symbol value to be encoded or decoded, even if an update of the state variable values is disabled, so that a liable determination of the interval size information may still be achieved, for example in cases, in which the interval size information depends mainly on the context model. In further examples, in which the update of the interval size information is disabled, the computational power that may be used may be particularly low, allowing for a high throughput. Thus, a trade-off between compression rate and throughput of the encoder or decoder may be adapted to requirements for operation particularly accurately.

An embodiment according to the first aspect provides an arithmetic encoder for encoding a plurality of symbols having symbol values (e.g. binary values) (e.g. in order to provide a bitstream comprising an arithmetically encoded representation of the symbols, and a side information), wherein the arithmetic encoder is configured to derive an interval size information (e.g. a probability value $p_{t+1}$ or a probability value $P_{t+1}$ or $P_{LPS}$ or a shift operation count value $g_{LPS}$) for an arithmetic encoding of one or more symbol values to be encoded ($x_{t+1}$) on the basis of one or more state variable values ($a_{t+1}, b_{t+1}$, also designated as source statistic values) (which are, for example, associated with a given context model), which represent statistics of a plurality of previously encoded symbol values (e.g. a sequence of binary values 0 and 1, e.g. $x_t$, $x_{t-1}$, $x_{t-2}$, etc.) in a first mode of operation and to update the one or more state variable values and/or the interval size information for an encoding of one or more subsequent symbol values to be encoded in the first mode (e.g. in a normal throughput operation mode); wherein the arithmetic encoder is configured to disable an update of the one or more state variable values and/or of the interval size information in a second mode (e.g. in a high throughput operation mode) (e.g. such that one or more state variable values which have already been used for an encoding of one or more symbol values and/or an interval size information which has already been used for an encoding of one or more symbol values is/are reused for an encoding of one or more subsequent symbol values) wherein the arithmetic encoder is configured to provide a side information (e.g. a dedicated bit or flag, or a side information describing a profile) indicating whether the first mode, in which the update of the one or more state variable values and/or of the interval size information is enabled, or the second mode, in which the update of the one or more state variable values and/or of the interval size information is disabled, is used.

According to an embodiment, the arithmetic encoder is configured to provide the side information (e.g. a dedicated bit or flag, or a side information describing a profile) indicating whether the first mode, in which the update of the one or more state variable values and/or of the interval size information is enabled, or the second mode, in which the update of the one or more state variable values and/or of the interval size information is disabled, is used, on a per frame basis (e.g. once per frame), or on a per-slice-basis (e.g. once per slice), or on a per-group-of-pictures basis (e.g. once per group of pictures) or on a per-sequence basis (e.g. once per sequence). By avoiding to provide the side information individually for each symbol value to be encoded or decoded, signaling overhead, and thus a size of the bitstream, may be low.

According to an embodiment, the arithmetic encoder is configured to provide the side information (e.g. a dedicated bit or flag, or a side information describing a profile) indicating whether the first mode, in which the update of the one or more state variable values and/or of the interval size information is enabled, or the second mode, in which the update of the one or more state variable values and/or of the interval size information is disabled, is used, on a per profile basis (wherein, for example, an each profile may have associated a mode out of the first mode and the second mode, such that selection of a profile, which is signaled by a side information, may, for example, decide whether the first mode or the second mode is used). For example, the encoder and the decoder may have information about which operation mode is associated with a specific profile. Thus, it may be sufficient to signal the profile currently used. As further information about the encoding and decoding process may be associated with the profile, signaling the operation mode on a per profile basis may have a particularly low signaling overhead.

According to an embodiment, the arithmetic encoder is configured to provide a dedicated side information (e.g. a dedicated bit or flag, which is specifically dedicated to indicating whether the first mode or the second mode is used) indicating whether the first mode, in which the update of the one or more state variable values and/or of the interval size information is enabled, or the second mode, in which the update of the one or more state variable values and/or of the interval size information is disabled, is used. Having a dedicated side information for signaling the operation mode provides for an easy implementation and a low computational effort for providing and for extracting the side information on the encoder and decoder side respectively.

According to an embodiment, the arithmetic encoder is configured to re-use one or more previously determined state variable values and/or a previously determined interval size information (e.g. for an encoding of one or more subsequent symbol values to be encoded) when using the second mode (such that, for example, when using the second mode, the same one or more previously determined state variable values or the same previously determined interval size information is used for the encoding of a plurality of subsequent symbol value to be encoded, which would be encoded using different, updated interval size information when using the first mode). Reusing previously determined state variable values and/or interval size information may increase the liability or accuracy for determining the interval size, although the state variable values and/or interval size information may not be updated.

According to an embodiment, the arithmetic encoder is configured to obtain an interval size (e.g. $R_{LPS}$) associated with a symbol value out of a plurality of possible symbol values on the basis of an overall coding interval size value (e.g. R) and on the basis of the interval size information ((e.g. a probability value $p_{t+1}$ or a probability value $P_{t+1}$ or a shift operation count value $g_{LPS}$) (such that, for example, due to a change of the overall coding interval size value, a different interval size is obtained for the encoding of subsequent symbol values to be encoded).

According to an embodiment, the arithmetic encoder is configured to obtain an interval size (e.g. $R_{LPS}$) associated with a symbol value out of a plurality of possible symbol values on the basis of an overall coding interval size value (e.g. R) and on the basis of the interval size information using a first computation rule when operating in the first mode and using a second computation rule when operating in the second mode (wherein, for example, the first computation rule comprises a higher accuracy than the second computation rule, and/or wherein the first computation rule comprises a higher complexity than the second computation rule). Using individual computation rules for the operation modes allows to further adapt respective accuracies and computational efforts for determining the interval size in the operation modes.

According to an embodiment, the arithmetic encoder is configured to obtain an interval size (e.g. $R_{LPS}$) associated with a symbol value out of a plurality of possible symbol values on the basis of an overall coding interval size value (e.g. R) and on the basis of the interval size information using a multiplication of the overall coding interval size value, or of a bit-shifted version thereof, (e.g. R) with an interval size information value, or with a bit-shifted version thereof when operating in the first mode; and using an application of a bit shift operation (or by an application of a bit shift operation) (e.g. a shift-to-the-right operation) to the overall coding interval size value (e.g. R), wherein a number of bits by which the overall coding interval size value is shifted, is determined by the interval size information (e.g. $g_{LPS}$), when operating in the second mode. A multiplication may provide for an accurate determination of the interval size, allowing for a particularly high compression rate when operating in the first mode. A bit shift operation provides a particularly fast and computationally efficient method for determining the interval size, thus allowing for a high throughput when operating in the second operation mode.

According to an embodiment, the arithmetic encoder is configured to determine a shift count value (e.g. $g_{LPS}$), which describes a number of bits by which the overall coding interval size value is shifted, on the basis of an integer value representation (e.g. $P_{LPS}$) of the probability value comprising (or using) a number BITS of bits using a determination of a bit position of a most significant non-zero bit of an operand value (x, $P_{LPS}+(P_{LPS}>>2)$) which is increased or decreased with respect to the integer value representation of the probability value (for example, by a scaling operation, and/or by an addition or subtraction of a value which is dependent on the integer value representation of the probability value, and/or by an addition of a predetermined, e.g. constant, value). Determining the bit position of the most significant non-zero bit is a low complex operation, so that this kind of determination of the shift count value is very efficient.

According to an embodiment, the arithmetic encoder is configured to determine a shift count value (e.g. $g_{LPS}$), which describes a number of bits by which the overall coding interval size value is shifted, on the basis of one or more initialization parameters (e.g. slopeIdx and/or qp and/or offsetIdx) (e.g. without determining an interval size information on the basis of one or more source statistic values). For example, determining the shift count value on the basis of the initialization parameters may allow an initialization of the encoding or decoding in the second operation mode, for example, without having to initialize parameters for the encoding or decoding in the first mode.

According to an embodiment, the arithmetic encoder is configured to obtain an updated version $a_{t+1}$ of the first state value according to $$a_{t+1} = a_t + x_t \cdot (ONE_a >> n_a) - (a_t >> n_a)$$

wherein $a_t$ is a current version of the first state value, wherein $x_t$ is a current encoded symbol (e.g. binary symbol taking values of 0 or 1), wherein $n_a$ is a window size information (e.g. having integer values), wherein $$ONE_a = (1 << BITS_a) - k_a$$

wherein $BITS_a$ is a number of bits used to represent the first state value, wherein $k_a$ is a predetermined number (e.g. an integer number, e.g. 0 or 1); and/or wherein the arithmetic encoder is configured to obtain an updated version $b_{t+1}$ of the first state value according to $$b_{t+1} = b_t + x_t \cdot (ONE_b >> n_b) - (b_t >> n_b)$$

wherein $b_t$ is a current version of the first state value, wherein $x_t$ is a current encoded symbol (e.g. binary symbol taking values of 0 or 1), wherein $n_b$ is a window size information (e.g. having integer values), wherein $$ONE_b = (1 << BITS_b) - k_b$$

wherein $BITS_b$ is a number of bits used to represent the first state value, wherein $k_b$ is a predetermined number (e.g. an integer number, e.g. 0 or 1).

According to an embodiment, the arithmetic encoder is configured to perform a weighted combination of the first state variable value $(a_t)$ and of the second state variable value $(b_t)$, in order to obtain the interval size information.

According to an embodiment, the arithmetic encoder is configured to derive a probability estimate $P_t$ according to $$P_t = ((a_t >> (BITS_a - BITS_{min})) + (b_t >> (BITS_b - BITS_{min}))) >> 1$$

where $$BITS_{min} = \min(BITS_a, BITS_b)$$

wherein $a_t$ is the first state variable value, wherein $b_t$ is the second state variable value, wherein $BITS_a$ is a number of bits used for a representation of $a_t$; wherein $BITS_b$ is a number of bits used for a representation of $b_t$. (wherein a probability value may be derived by dividing $P_t$ by $1 << BITS_{min}$).

A second aspect of the invention relies on the idea to implement two or more operation modes for an encoding or a decoding of a symbol value so that for each of the operation modes, the trade-off between compression rate and computational effort may be chosen individually. In the first operation mode, an interval size for an encoding or decoding of a symbol value is obtained by multiplying an overall coding interval size value with an interval size information. This kind of determination of the interval size may be particularly accurate or reliable. An accurate interval size may provide for a high compression rate. In the second operation mode, the interval size for the encoding or decoding is obtained using a bit shift operation in which the overall coding interval size value is shifted by a number of bits which is determined by the interval size information. As a bit shift operation is computationally efficient, the second mode may provide for a high throughput. As the encoder or decoder may operate in the first or in the second operation mode, the operation of the encoder or decoder may be adapted to current requirements for the encoding or decoding process or the bitstream provided by the encoder or received by the decoder.

An embodiment according to the second aspect provides an arithmetic encoder for encoding a plurality of symbols having symbol values (e.g. binary values) (e.g. in order to provide a bitstream comprising an arithmetically encoded representation of the symbols, and a side information), wherein the arithmetic encoder is configured to determine (e.g. derive) an interval size information (e.g. a probability value $p_{t+1}$ or a probability value $P_{t+1}$ or $P_{LPS}$ or a shift operation count value $g_{LPS}$) for an arithmetic encoding of one or more symbol values to be encoded $(x_{t+1})$; wherein the arithmetic encoder is configured to derive an interval size (e.g. size of an interval associated with a given symbol value; e.g. $R_{LPS}$) on the basis of the interval size information; wherein the arithmetic encoder is configured to multiply an overall coding interval size value, or a bit-shifted version thereof, (e.g. R) with an interval size information value, or a bit-shifted version thereof, (e.g. $p_{LPS}$ or $P_{LPS}$) (which has a resolution of two or more bits having different bit weight and/or which can take values that are different from a potency of 2), in order to obtain (directly or indirectly, e.g. using an additional addition) an interval size (e.g. $R_{LPS}$) associated with a symbol value out of a plurality of possible symbol values, in a first mode; and wherein the arithmetic encoder is configured to obtain an interval size (e.g. $R_{LPS}$) associated with a symbol value out of a plurality of possible symbol values by applying a bit shift operation (e.g. a shift-to-the-right operation) to the overall coding interval size value (e.g. R), wherein number of bits by which the overall coding interval size value is shifted, is determined by the interval size information (e.g. $g_{LPS}$), in a second mode; and wherein the arithmetic encoder is configured to provide a side information (e.g. a dedicated bit or flag, or a side information describing a profile) indicating whether the first mode, in which the multiplication between the overall coding size value and the interval size information value is performed, or the second mode, in which the interval size is obtained by a bit shift, is used.

According to an embodiment, the arithmetic encoder is configured to derive a shift count value (e.g. $g_{LPS}$) describing by how many bits the overall coding interval size value is shifted. Having the shift count value enables an efficient implementation of the bit shift operation.

According to an embodiment, the arithmetic encoder is configured to derive a shift count value (e.g. $g_{LPS}$) describing by how many bits the overall coding interval size value is shifted on the basis of a probability value (e.g. $P_{LPS}$) describing a probability of a symbol value out of a plurality of possible symbol values. Deriving the shift count value on the basis of the probability value allows for a determination of the interval size in dependence on the probability value. Thus, the interval size may be determined very accurately, so that a good compression rate may be achieved when determining the interval size using the bit shift operation.

According to an embodiment, the arithmetic encoder is configured to derive the shift count value (e.g. $g_{LPS}$) on the basis of an integer value representation (e.g. $P_{LPS}$) of the probability value comprising (or using) a number BITS of bits using a determination of a bit position of a most significant non-zero bit of an operand value (x, $P_{LPS}$+ $(P_{LPS} >> 2)$) which is increased or decreased with respect to the integer value representation of the probability value (for example, by a scaling operation, and/or by an addition or subtraction of a value which is dependent on the integer value representation of the probability value, and/or by an addition of a predetermined, e.g. constant, value). A bit position of a most significant nonzero bit may be derived with the low effort. Further, using an integer value representation of the probability value may decrease a number of bits that may be used for performing the operation. Thus, the shift count value may be determined particularly fast.

According to an embodiment, the arithmetic encoder is configured to derive the shift count value using a determination of a bit position of a most significant non-zero bit of an operand value (x, $P_{LPS}+(P_{LPS}>>2)$) which is increased or decreased with respect to the integer value representation of the probability value by an addition or subtraction of a value ($P_{LPS}>>2$) which is dependent on the integer value representation of the probability value. An addition or subtraction may be performed with a low computational effort.

According to an embodiment, the arithmetic encoder is configured to derive the shift count value using a determination of a bit position of a most significant non-zero bit of an operand value (x, $P_{LPS}+(P_{LPS}>>2)$) which is increased or decreased with respect to the integer value representation of the probability value by an addition or subtraction of a value ($P_{LPS}>>2$) which is a right-shifted version of the integer value representation of the probability value. A right shifted version of the integer value representation of the probability value may be determined with local mutational effort. Thus, in combination with the addition or subtraction operation, the shift count value may be determined particularly efficiently.

According to an embodiment, the arithmetic encoder is configured to derive the shift count value $g_{LPS}$ according to $$g_{LPS}=\text{const1}-\lfloor \log_2(P_{LPS}+(P_{LPS}>>\text{const2})+\text{const3})\rfloor$$

or according to $$g_{LPS}=\min(g_{MAX},\text{const1}-\lfloor \log_2(P_{LPS}+(P_{LPS}>\text{const2})+\text{const3})\rfloor)$$

or according to $$g_{LPS}=\text{const1}-\lfloor \log_2(\text{const2'}*P_{LPS}+\text{const3})\rfloor$$

or according to $$g_{LPS}=\min(g_{MAX},\text{const1}-\lfloor \log_2(\text{const2'}*P_{LPS}+\text{const3})\rfloor)$$

wherein $P_{LPS}$ is is the integer value representation of the probability value; wherein const1 is a predetermined value (e.g. BITS−1) (advantageously an integer value); wherein const2 is a predetermined value (e.g. 2) (advantageously an integer value); wherein const 2' is a predetermined value (advantageously a value which is different from 1); wherein const3 is a predetermined value (advantageously an integer value; e.g. equal to zero); wherein $g_{MAX}$ is a predetermined value; wherein ">>" is a shift-to-the-right operator; wherein log 2 is a logarithm operator to base 2; wherein $\lfloor \ldots \rfloor$ is a ceiling operator. Having a maximum allowed value for the shift count value may limit a maximum number of bits that may be used for representing the shift count value and/or the interval size and may allow for an efficient computation of the interval size.

According to an embodiment, the arithmetic encoder is configured to derive the shift count value $g_{LPS}$ according to $$g_{LPS}=\min(g_{MAX},\text{BITS}-1-\lfloor \log_2(P_{LPS}+(P_{LPS}>>2))\rfloor)$$

wherein BITS−1 is a number of bits used for a number representation of $P_{LPS}$ (wherein a number representation of $P_{LPS}$ advantageously comprises one bit less than a number representation of $P_t$); wherein $P_{LPS}$ is the integer value representation of the probability value; wherein $g_{MAX}$ is a predetermined number; wherein >> is a shift-to-the-right operator; wherein $\log_2$ is a logarithm operator to base 2; wherein $\lfloor \ldots \rfloor$ is a ceiling operator.

According to an embodiment, the arithmetic encoder is configured to derive the shift count value on the basis of an (range-restricted) integer value representation (e.g. $P_{clip}$) of an initial probability value ($p_{init}$), which is obtained on the basis of one or more context model initialization parameters (e.g. slope, qp and offset) (e.g. at least in case that an update of the one or more state variable values and/or of the interval size information is disabled). Thus, the shift count value may be determined on the basis of one or more initialization parameters, allowing for an initialization of the second operation mode based on initialization parameters. Thus, the determination of the shift count value does not necessarily depend on previously encoded or decoded symbol values or state variable values describing statistics thereof. Thus, the shift count value and consequently the interval size may be determined accurately, even if previously encoded or decoded symbol values or state variable values describing statistics thereof are not updated.

According to an embodiment, the arithmetic encoder is configured to initialize one or more source statistic values (e.g. $a_t$, $b_t$) in dependence on the (range-restricted) integer value representation (e.g. $P_{clip}$) of an initial probability value (e.g. $p_{init}$ or $P_{init}$), which is obtained on the basis of one or more context model initialization parameters (e.g. at least in case that an update of the one or more state variable values and/or of the interval size information is used).

According to an embodiment, the arithmetic encoder is configured to initialize one or more source statistic values $a_t$, $b_t$ in dependence on the range-restricted integer value representation $P_{clip}$ of an initial probability value ($p_{init}$) using a bit shift operation.

According to an embodiment, the arithmetic encoder is configured to initialize one or more source statistic values $a_t$, $b_t$ in dependence on the range-restricted integer value representation $P_{clip}$ of an initial probability value ($p_{init}$) according to $$a_t=P_{clip}<<(\text{BITS}_a-\text{const31})$$

and/or according to $$b_t=P_{clip}<<(\text{BITS}_b-\text{const31})$$

wherein $\text{BITS}_a$ is a number of bits used for a number representation of the source statistic value $a_t$; wherein $\text{BITS}_b$ is a number of bits used for a number representation of the source statistic value $b_t$; wherein const31 is a predetermined value (e.g. 7); and wherein << is a shift-to-the-left operator.

According to an embodiment, the arithmetic encoder is configured to derive the (range-restricted) integer value representation (e.g. $P_{clip}$) of the initial probability value (e.g. $p_{init}$) according to $$P_{clip}=\min(\text{const11},\max(\text{const12},P_{init}))$$

$$P_{init}=((\text{slope}\cdot(qp-\text{const13}))>>\text{const14})+\text{offset}$$

wherein const 11 is a predetermined value (e.g. 127); wherein const 12 is a predetermined value (e.g. 1); wherein const 13 is a predetermined value (e.g. 16); wherein const 14 is a predetermined value (e.g. 1); wherein slope is an initialization parameter value (e.g. an integer value, e.g. in a range between −4 and 3) (which may be represented by an initialization parameter, e.g. slopeIdx); wherein qp is a quality parameter value (e.g. an integer value, e.g. in a range between 0 and 51) (e.g. a quantization parameter describing quantization steps used for a quantization of symbol values); wherein offset is an initialization parameter value (e.g. an integer value, e.g. in a range between 1 and 127) (which may be represented by a initialization parameter, e.g. offsetIdx).

According to an embodiment, the arithmetic encoder is configured to determine initial values of one or more source statistic values (e.g. $a_t$, $b_t$), which are used for the derivation of the interval size information value (e.g. $p_{LPS}$ or $P_{LPS}$) in the first mode, and an initial value of the shift count value (e.g. $g_{LPS}$), which is used in the second mode, on the basis of the same one or more initialization parameters (e.g. slopeIdx, offsetIdx).

According to an embodiment, the arithmetic encoder is configured to obtain the interval size $R_{LPS}$ according to $$R_{LPS}=(((R\gg SHIFT_R)\cdot(P_{LPS}\gg SHIFT_P))\gg SHIFT_{MUL})+add_{LPS}$$

in the first mode, wherein R is the overall coding interval size value; herein $SHIFT_R$ is a predetermined value; wherein $P_{LPS}$ is an integer valued interval size information value; Wherein $SHIFT_P$ is a predetermined value; wherein $SHIFT_{MUL}$ is a predetermined value; wherein $add_{LPS}$ is a predetermined value (advantageously larger than zero).

According to an embodiment, the arithmetic encoder is configured to obtain the integer valued interval size information value $P_{LPS}$ according to $$val_{MPS}=P_t\gg(BITS_{min}-1)$$

$$P_{LPS}=(val_{MPS}?(1\ll BITS_{min})-1-P_t:P_t)$$

wherein $P_t$ is an integer-valued probability value; wherein $BITS_{min}$ is a number of bits used for a representation of $P_t$; wherein (cond? A:B) is an operator providing value A if the condition cond is non-zero, and providing B otherwise. For example, $P_{LPS}$ may represent the probability of the less probable symbol, so that the interval size determined on the basis of the integer valued interval size information value may be the smaller out of a possible interval sizes associated with the less probable symbol and the more probable symbol respectively. Determining the interval size for the less probable symbol increases in accuracy of the interval size of assuming a constant number of bits for representing the interval size.

A third aspect of the invention is based on the idea to determine an interval size for an encoding or decoding of a symbol value by applying a bit shift operation to an overall coding interval size value. A bit shift operation is computationally efficient way to derive the interval size. The aspect further includes that a shift count value which determines a number of bits, by which the overall coding interval size value is shifted, is derived on the basis of an integer value representation of an interval size information, which, for example, represents an estimate for a probability of a symbol value associated with the interval size to be determined. The integer value representation of the interval size information may have a low number of bits, for example, lower than a fractional representation. A low number of bits may ensure a short processing time. The aspect further includes to determine the shift count value using a determination of a bit position of a most significant nonzero bit of an operand value depending on the interval size information. A bit position of a most significant bits may be determined efficiently, providing for a low computational effort for determining the interval size.

An embodiment according to the third aspect provides an arithmetic encoder for encoding a plurality of symbols having symbol values (e.g. binary values) (e.g. in order to provide a bitstream comprising an arithmetically encoded representation of the symbols, and a side information), wherein the arithmetic encoder is configured to determine (e.g. derive) an interval size information (e.g. a probability value $p_{t+1}$ or a probability value $P_{t+1}$ or $P_{LPS}$ or a shift operation count value $g_{LPS}$) for an arithmetic encoding of one or more symbol values to be encoded ($x_{t+1}$); wherein the arithmetic encoder is configured to derive an interval size (e.g. size of an interval associated with a given symbol value; e.g. $R_{LPS}$) on the basis of the interval size information; wherein the arithmetic encoder is configured to obtain an interval size (e.g. $R_{LPS}$) associated with a symbol value out of a plurality of possible symbol values by applying a bit shift operation (e.g. a shift-to-the-right operation) to the overall coding interval size value (e.g. R), wherein a number of bits by which the overall coding interval size value is shifted, is determined by a shift count value (e.g. $g_{LPS}$); and wherein the arithmetic encoder is configured to derive the shift count value (e.g. $g_{LPS}$) on the basis of an integer value representation (e.g. $P_{LPS}$) of the probability value (e.g. the interval size information) (e.g. comprising (or using) a number BITS of bits) using a determination of a bit position of a most significant non-zero bit of an operand value (x, $P_{LPS}+(P_{LPS}\gg 2)$) which is increased or decreased with respect to the integer value representation of the probability value (for example, by a scaling operation, and/or by an addition or subtraction of a value which is dependent on the integer value representation of the probability value, and/or by an addition or subtraction of a predetermined, e.g. constant, value).

According to an embodiment, the arithmetic encoder is configured to derive the shift count value using a determination of a bit position of a most significant non-zero bit of an operand value (x, $P_{LPS}+(P_{LPS}\gg 2)$) which is increased or decreased with respect to the integer value representation of the probability value by an addition or subtraction of a value ($P_{LPS}\gg 2$) which is dependent on the integer value representation of the probability value.

According to an embodiment, the arithmetic encoder is configured to derive the shift count value using a determination of a bit position of a most significant non-zero bit of an operand value (x, $P_{LPS}+(P_{LPS}\gg 2)$) which is increased or decreased with respect to the integer value representation of the probability value by an addition or subtraction of a value ($P_{LPS}\gg 2$) which is a right-shifted version of the integer value representation of the probability value.

According to an embodiment, the arithmetic encoder is configured to derive the shift count value $g_{LPS}$ according to $$g_{LPS}=const1-\lfloor \log_2(P_{LPS}+(P_{LPS}\gg const2)+const3)\rfloor$$

or according to $$g_{LPS}=\min(g_{MAX},const1-\lfloor \log_2(P_{LPS}+(P_{LPS}\gg const2)+const3)\rfloor)$$

or according to $$g_{LPS}=const1-\lfloor \log_2(const2'*P_{LPS}+const3)\rfloor$$

or according to $$g_{LPS}=\min(g_{MAX},const1-\lfloor \log_2(const2'*P_{LPS}+const3)\rfloor)$$

wherein $P_{LPS}$ is is the integer value representation of the probability value; wherein const 1 is a predetermined value (e.g. BITS−1) (advantageously an integer value); wherein const 2 is a predetermined value (e.g. 2) (advantageously an integer value); wherein const 2' is a predetermined value (advantageously a value which is different from 1); wherein const3 is a predetermined value (advantageously an integer value); wherein $g_{MAX}$ is a predetermined value; wherein ">>" is a shift-to-the-right operator; wherein log 2 is a logarithm operator to base 2; wherein ⌈ . . . ⌉ is a ceiling operator. This method for determining the shift count value is a good trade-off between computational complexity and the resulting compression.

According to an embodiment, the arithmetic encoder is configured to derive the shift count value $g_{LPS}$ according to $$g_{LPS}=\min(g_{MAX},\text{BITS}-1-\lceil \log_2(P_{LPS}+(P_{LPS}>>2))\rceil)$$

wherein BITS−1 is a number of bits used for a number representation of $P_{LPS}$; wherein $P_{LPS}$ is the integer value representation of the probability value; wherein $g_{MAX}$ is a predetermined number; wherein >> is a shift-to-the-right operator; wherein $\log_2$ is a logarithm operator to base 2; wherein ⌈ . . . ⌉ is a ceiling operator.

According to an embodiment, the arithmetic encoder is configured to derive the shift count value on the basis of a (range-restricted) integer value representation (Pclip) of an initial probability value ($p_{init}$), which is obtained on the basis of one or more context model initialization parameters (e.g. slope, qp and offset) (e.g. at least in case that an update of the one or more state variable values and/or of the interval size information is disabled).

According to an embodiment, the arithmetic encoder is configured to initialize one or more source statistic values (e.g. $a_t$, $b_t$) in dependence on the (range-restricted) integer value representation ($P_{clip}$) of an initial probability value ($p_{init}$), which is obtained on the basis of one or more context model initialization parameters (e.g. at least in case that an update of the one or more state variable values and/or of the interval size information is used)

According to an embodiment, the arithmetic encoder is configured to initialize one or more source statistic values $a_t$, $b_t$ in dependence on the range-restricted integer value representation $P_{clip}$ of an initial probability value ($p_{init}$) using a bit shift operation.

According to an embodiment, the arithmetic encoder is configured to initialize one or more source statistic values $a_t$, $b_t$ in dependence on the range-restricted integer value representation $P_{clip}$ of an initial probability value ($p_{init}$) according to $$a_t = P_{clip} << (\text{BITS}_a - \text{const31})$$

and/or according to $$b_t = P_{clip} << (\text{BITS}_b - \text{const31})$$

wherein $\text{BITS}_a$ is a number of bits used for a number representation of the source statistic value $a_t$; wherein $\text{BITS}_b$ is a number of bits used for a number representation of the source statistic value $b_t$; wherein const31 is a predetermined value (e.g. 7); and wherein << is a shift-to-the-left operator.

According to an embodiment, the arithmetic encoder is configured to derive the (range-restricted) integer value representation $P_{clip}$ of the initial probability value ($p_{init}$) according to $$P_{clip} = \min(\text{const11}, \max(\text{const12}, P_{init}))$$

$$P_{init} = ((\text{slope} \cdot (qp - \text{const13})) >> \text{const14}) + \text{offset}$$

wherein const 11 is a predetermined value (e.g. 127); wherein const 12 is a predetermined value (e.g. 1); wherein const 13 is a predetermined value (e.g. 16); wherein const 14 is a predetermined value (e.g. 1); wherein slope is an initialization parameter value (e.g. an integer value, e.g. in a range between −4 and 3) (which may be represented by an initialization parameter, e.g. slopeIdx); wherein qp is a quality parameter value (e.g. an integer value, e.g. in a range between 0 and 51) (e.g. a quantization parameter describing quantization steps used for a quantization of symbol values); wherein offset is an initialization parameter value (e.g. an integer value, e.g. in a range between 1 and 127) (which may be represented by a initialization parameter, e.g. offsetIdx).

According to an embodiment, the arithmetic encoder is configured to determine initial values of one or more source statistic values (e.g. $a_t$, $b_t$), which are used for the derivation of the interval size information value (e.g. $p_{LPS}$ or $P_{LPS}$) in the first mode, and an initial value of the shift count value (e.g. $g_{LPS}$), which is used in the second mode, on the basis of the same one or more initialization parameters (e.g. slopeIdx, offsetIdx).

A fourth aspect of the invention relies on the idea to implement two or more operation modes for an encoding or a decoding of a symbol value so that for each of the operation modes, the trade-off between compression rate and computational effort may be chosen individually. The fourth aspect includes that first initialization values which may be used for determining an interval size for an encoding or decoding of symbol values in the first mode, and a second initialization values which may be used for determining the interval size for the encoding or decoding in the second mode are determined on the basis of a common set of one or more initialization parameters. As the first and the second initialization values are determined from the same set of initialization parameters, an implementation of the two modes has a low complexity, and a number of initialization parameters that may be used by the encoder or decoder is low. Having a low number of initialization parameters meters may provide for a small signaling overhead.

An embodiment according to the fourth aspect provides arithmetic encoder for encoding a plurality of symbols having symbol values (e.g. binary values) (e.g. in order to provide a bitstream comprising an arithmetically encoded representation of the symbols, and a side information), wherein the arithmetic encoder is configured to determine (e.g. derive) an interval size information (e.g. a probability value $p_{t+1}$ or a probability value $P_{t+1}$ or $P_{LPS}$ or a shift operation count value $g_{LPS}$) for an arithmetic encoding of one or more symbol values to be encoded ($x_{t+1}$); wherein the arithmetic encoder is configured to derive an interval size (e.g. size of an interval associated with a given symbol value; e.g. $R_{LPS}$) on the basis of the interval size information; wherein the arithmetic encoder is configured to obtain an interval size (e.g. $R_{LPS}$) associated with a symbol value out of a plurality of possible symbol values using a first interval size determination method in a first mode; and wherein the arithmetic encoder is configured to obtain an interval size (e.g. $R_{LPS}$) associated with a symbol value out of a plurality of possible symbol values using a second interval size determination method (e.g. by applying a bit shift operation (e.g. a shift-to-the-right operation) to the overall coding interval size value (e.g. R), wherein a number of bits by which the overall coding interval size value is shifted, is determined by a shift count value (e.g. $g_{LPS}$)) in a second mode; and wherein the arithmetic encoder is configured to obtain one or more first initialization values (e.g. $a_t$ and/or $b_t$) (e.g. an initial source statistic value), which are used for in the determination of the interval size using the first interval size determination method, on the basis of one or more initialization parameters (e.g. slope and offset, represented by slopeIdx and offsetIdx, respectively) (e.g. using a first initialization value determination method), and wherein the arithmetic encoder is configured to obtain one or more second initialization values (e.g. $g_{LPS}$), which are used for the determination of the interval size using the second interval size determination method, on the basis of the one or more initialization parameters (e.g. using a second initialization value determination method, which is different from the first initialization value determination method).

According to an embodiment, the first interval size determination method ("first estimator for interval size") comprises a first accuracy (e.g. a comparatively higher resolution), wherein the second interval size determination method ("second estimator for interval size") comprises a second accuracy (e.g. a comparatively lower resolution), wherein the first accuracy is different from the second accuracy; and/or wherein the first interval size determination method comprises a first computational complexity (e.g. a comparatively higher computational complexity), wherein the second interval size determination method comprises a second computational complexity (e.g. a comparatively lower computational complexity), wherein the first computational complexity is different from the second computational complexity. A high accuracy for determining the interval size may provide for a high compression rate. Using a low accuracy for determining the interval size may allow for using a low number of bits for a presenting the interval size, thus allowing for a high throughput. A high computational complexity may allow to determine the interval size accurately, so that a high compression rate may be achieved. A low computational complexity may provide for a hot high throughput. Thus, having the two modes with different accuracies and/or computational complexities, allows for choosing between a high compression rate and a high throughput. Thus, the operation of the encoder or decoder may be adapted to bitstream requirements and/or encoder or decoder capabilities.

According to an embodiment, the arithmetic encoder is configured to multiply an overall coding interval size value, or a bit-shifted version thereof, (e.g. R) with an interval size information value, or a bit-shifted version thereof, (e.g. $p_{LPS}$ or $P_{LPS}$) (which is has a resolution of two or more bits having different bit weight and/or which can take values that are different from a potency of 2), in order to obtain an interval size (e.g. $R_{LPS}$) associated with a symbol value out of a plurality of possible symbol values, in the first mode; and wherein the arithmetic encoder is configured to obtain an interval size (e.g. $R_{LPS}$) associated with a symbol value out of a plurality of possible symbol values by applying a bit shift operation (e.g. a shift-to-the-right operation) to the overall coding interval size value (e.g. R), wherein number of bits by which the overall coding interval size value is shifted, is determined by the interval size information (e.g. $g_{LPS}$), in the second mode.

According to an embodiment, the arithmetic encoder is configured to determine one or more source statistic values (e.g. $a_t$, $b_t$) as the one or more first initialization values; and/or wherein the arithmetic encoder is configured to determine a shift count value (e.g. $g_{LPS}$), which determines a number of bits by which the overall coding interval size value is to be shifted in order to obtain an interval size (e.g. $R_{LPS}$) associated with a symbol value out of a plurality of possible symbol, as the second initialization value.

According to an embodiment, the arithmetic encoder is configured to determine the one or more first initialization values using a first mapping (e.g. a first initialization value determination method), which linearly maps, except for one or more clipping operations and one or more rounding operations, an intermediate probability value (e.g. $P_{clip}$) obtained on the basis of one or more initialization parameters (slope, offset) onto one or more first initialization values (e.g. $a_t$, $b_t$). A mapping is an operation with a low computational effort, increasing the throughput for determining the interval size.

According to an embodiment, the arithmetic encoder is configured to determine the one or more second initialization values using a logarithmic compression of an operand value (e.g. $P_{LPS}+(P_{LPS}>>2)$) which is equal to the intermediate probability value (e.g. $P_{clip}$) or which is based on the intermediate probability value (e.g. $P_{clip}$), to a reduced range of (e.g. integer) values (e.g. $g_{LPS}$) (e.g. a second initialization value determination method); or wherein the arithmetic encoder is configured to determine the one or more second initialization values using a quantization to a grid in a logarithmized domain of an operand value (e.g. $P_{LPS}+(P_{LPS}>>2)$) which is equal to the intermediate probability value (e.g. $P_{clip}$) or which is based on the intermediate probability value (e.g. $P_{clip}$) (e.g. to obtain $g_{LPS}$) (e.g. a second initialization value determination method).

According to an embodiment, the arithmetic encoder is configured to determine the one or more second initialization values (e.g. $g_{LPS}$) using a second mapping, which comprises a computation of a logarithm (e.g. $\log_2$) of an operand value (e.g. $P_{LPS}+(P_{LPS}>>2)$), which is equal to the intermediate probability value (e.g. $P_{clip}$) or which is based on the intermediate probability value (e.g. $P_{clip}$), and a rounding of a result of the computation of the logarithm to an integer value.

According to an embodiment, the arithmetic encoder is configured to obtain one or more first initialization values $a_t$ and/or $b_t$ according to $$a_t = P_{clip} << (BITS_a - \text{const}64)$$

$$b_t = P_{clip} << (BITS_b - \text{const}64)$$

wherein the arithmetic encoder is configured to obtain the intermediate probability value $P_{clip}$ according to $$P_{clip} = \min(\text{const}60, \max(\text{const}61, P_{init}))$$

$$P_{init} = ((\text{slope} \cdot (qp - \text{const}62)) >> \text{const}63) + \text{offset}$$

wherein slope is a first initialization parameter; wherein offset is a second initialization parameter; wherein qp is a third initialization parameter; wherein const60 is a predetermined value (e.g. 127); wherein const61 is a predetermined value (e.g. 1); wherein const62 is a predetermined value (e.g. 16); wherein const63 is a predetermined value (e.g. 1); wherein const64 is a predetermined value (e.g. 7); wherein $BITS_a$ is a number of bits used for a representation of the first source statistic value $a_i$; wherein $BITS_b$ is a number of bits used for a representation of the first source statistic value $b_i$.

According to an embodiment, the arithmetic encoder is configured to obtain a second initialization value $g_{LPS}$ according to $$g_{LPS} = const1 - \lceil \log_2(P_{LPS} + (P_{LPS} >> const2) + const3) \rceil$$

or according to $$g_{LPS} = \min(g_{MAX}, const1 - \lceil \log_2(P_{LPS} + (P_{LPS} >> const2) + const3) \rceil)$$

or according to $$g_{LPS} = const1 - \lceil \log_2(const2'* P_{LPS} + const3) \rceil$$

or according to $$g_{LPS} = \min(g_{MAX}, const1 - \lceil \log_2(const2'* P_{LPS} + const3) \rceil)$$

wherein $P_{LPS}$ is equal to $P_{clip}$ or based on $P_{clip}$ (e.g. derived from Pclip using a least-probable-symbol probability determination), wherein $P_{clip}$ is obtained according to $$P_{clip} = \min(const60, \max(const61, P_{init}))$$

$$P_{init} = ((slope \cdot (qp - const62)) >> const63) + offset$$

wherein slope is a first initialization parameter; wherein offset is a second initialization parameter; wherein qp is a third initialization parameter; wherein const60 is a predetermined value (e.g. 127); wherein const61 is a predetermined value (e.g. 1); wherein const62 is a predetermined value (e.g. 16); wherein const63 is a predetermined value (e.g. 1); wherein const 1 is a predetermined value (e.g. BITS–1) (advantageously an integer value); wherein const 2 is a predetermined value (e.g. 2) (advantageously an integer value); wherein const 2' is a predetermined value (advantageously a value which is different from 1); wherein const3 is a predetermined value (advantageously an integer value); wherein $g_{MAX}$ is a predetermined value; wherein ">>" is a shift-to-the-right operator; wherein log 2 is a logarithm operator to base 2; wherein $\lceil \ldots \rceil$ is a ceiling operator.

A fifth aspect of the invention relies on the idea to implement two or more operation modes for an encoding or a decoding of a symbol value so that for each of the operation modes, the trade-off between compression rate and computational effort may be chosen individually. According to the fifth aspect, an interval size associated with a symbol value out of a plurality of possible symbol values is determined on the basis of an overall coding interval size value. The encoder or decoder may be switched between a usage of a first number of bits and a usage of a second number of bits for representing the overall coding interval size value. While a high number of bits may provide for a higher accuracy of the overall coding interval size value, a low number of bits may provide for a high throughput. A higher accuracy of the coding interval size value may provide for a high compression rate. Thus, being capable of switching between the first number and the second number of bits allows to adjust the trade-off between a high compression rate and a high throughput of the encoding or decoding. For example, the capability of switching between the first number of bits and the second number of bits for the overall coding interval size value allows for using a high number of bits when operating in an operation mode which is to achieve a high compression rate, for example in a high efficiency mode, for example the first mode. For example, in a high throughput mode, for example the second mode, a low number of bits may be used.

An aspect provides arithmetic encoder for encoding a plurality of symbols having symbol values (e.g. binary values) (e.g. in order to provide a bitstream comprising an arithmetically encoded representation of the symbols, and a side information), wherein the arithmetic encoder is configured to determine (e.g. derive) an interval size information (e.g. a probability value $p_{t+1}$ or a probability value $P_{t+1}$ or $P_{LPS}$ or a shift operation count value $g_{LPS}$) for an arithmetic encoding of one or more symbol values to be encoded ($x_{t+1}$); wherein the arithmetic encoder is configured to derive an interval size (e.g. size of an interval associated with a given symbol value; e.g. $R_{LPS}$) on the basis of the interval size information; wherein the arithmetic encoder is configured to obtain an interval size (e.g. $R_{LPS}$) associated with a symbol value out of a plurality of possible symbol values (e.g. using a first interval size determination method) on the basis of an overall coding interval size value (e.g. R) in a first mode; and wherein the arithmetic encoder is configured to obtain an interval size (e.g. $R_{LPS}$) associated with a symbol value out of a plurality of possible symbol values (using a second interval size determination method) (e.g. by applying a bit shift operation (e.g. a shift-to-the-right operation) to the overall coding interval size value (e.g. R), wherein a number of bits by which the overall coding interval size value is shifted, is determined by a shift count value (e.g. $g_{LPS}$)) on the basis of the overall coding interval size value (e.g. R) in a second mode; and wherein the arithmetic encoder is configured to switch between a usage of a first bit number (or first bit resolution) and a usage of a second bit number (or second bit resolution) for the for the representation of the overall coding interval size value (e.g. R) (such that, for example, the first bit number is used when operating in the first mode, and such that, for example, the second bit number is used when operating in the second mode).

According to an embodiment, the arithmetic encoder is configured to determine (and update, e.g. re-normalize) the overall coding interval size value such that the overall coding interval size value is in an interval $$(1<<(BITS_{R1}-1), (1<<BITS_{R1})-1)$$

before an encoding of a symbol value (e.g. after a re-normalization), (and such that the overall coding interval size value is in an interval $(1, (1<<BITS_{R1})-2)$ after an encoding of a symbol value and before a possible re-normalization) wherein the arithmetic encoder is configured to represent the coding interval size with $BITS_{R1}$ bits in the first mode, and wherein the arithmetic encoder is configured to represent the coding interval size with $BITS_{R2}$ bits in the second mode, wherein $BITS_{R2} < BITS_{R1}$.

According to an embodiment, the arithmetic encoder is configured to multiply an overall coding interval size value, or a bit-shifted version thereof, (e.g. R) with an interval size information value, or a bit-shifted version thereof, (e.g. $p_{LPS}$ or $P_{LPS}$) (which is has a resolution of two or more bits having different bit weight and/or which can take values that are different from a potency of 2), in order to obtain an interval size (e.g. $R_{LPS}$) associated with a symbol value out of a plurality of possible symbol values, in the first mode (in which, for example, the comparatively higher first bit number or first resolution may be used).

According to an embodiment, the arithmetic encoder is configured to obtain an interval size (e.g. $R_{LPS}$) associated with a symbol value out of a plurality of possible symbol values by applying a bit shift operation (e.g. a shift-to-the-right operation) to the overall coding interval size value (e.g. R), wherein a number of bits by which the overall coding interval size value is shifted, is determined by the interval size information (e.g. $g_{LPS}$), in the second mode (in which, for example, the comparatively lower second bit number or second resolution may be used).

According to an embodiment, the arithmetic encoder is configured to derive a shift count value (e.g. $g_{LPS}$) describing by how many bits the overall coding interval size value is shifted when operating in the second mode.

According to an embodiment, the arithmetic encoder is configured to limit the shift count value (e.g. $g_{LPS}$) to a maximum value $g_{MAX}$, and wherein the first bit number (e.g. $BITS_{R1}$) is larger than the second bit number, and wherein the second bit number (e.g. $BITS_{R2}$) is larger than the maximum value $g_{MAX}$ (wherein, for example, $BITS_{R2}=g_{MAX}+ADD_{MAX}$, wherein $ADD_{MAX}$ is a positive integer value).

According to an embodiment, the arithmetic encoder is configured to switch between a usage of a first bit number (or first bit resolution) and a usage of a second bit number (or second bit resolution) for the for the representation of the overall coding interval size value (e.g. R), such that the first bit number is used when operating in the first mode, and such that the second bit number is used when operating in the second mode, wherein the first bit number is larger than the second bit number, and wherein the arithmetic encoder is configured to obtain an interval size (e.g. $R_{LPS}$) associated with a symbol value out of a plurality of possible symbol values by applying a bit shift operation (e.g. a shift-to-the-right operation) to the overall coding interval size value (e.g. R), wherein a number of bits by which the overall coding interval size value is shifted, is determined by a shift count value (e.g. $g_{LPS}$) in a second mode; and wherein the shift count value is limited to a first maximum value in the first mode (e.g. to $g_{MAX}$(mode1)), and wherein the shift count value is limited to a second maximum value in the second mode (e.g. to $g_{MAX}$(mode2)), wherein the first maximum value is larger than the second maximum value. As the shift count value is limited to a maximum value, there may be a maximum number of bits which are that may be used for representing the interval size at a maximum accuracy, the maximum number of bits that may be used for representing the interval size being related to the maximum value of the shift count value. As the shift count value is limited to a first maximum value in the first mode, and is limited to a second maximum value in the second mode, using a first number of bits for representing the overall coding interval size value in the first mode and using a second number of bits for representing the overall coding interval size value in the second mode may allow for representing the overall coding interval size value in both the first and the second modes so that the representation of the overall coding interval size values has the lowest number of bits with which the maximum accuracy of the overall coding interval size value may be represented. Thus, for both modes a high trade-off between accuracy and throughput may be achieved.

According to an embodiment, the first bit number is adapted to the first maximum value, such that a shifting of the overall coding size value, represented by a number of bits defined by the first bit number, results in a non-zero value, and wherein the second bit number is adapted to the second maximum value, such that a shifting of the overall coding size value, represented by a number of bits defined by the second bit number, results in a non-zero value.

An embodiment according to the first aspect provides an arithmetic decoder for decoding a plurality of symbols having symbol values (e.g. binary values), wherein the arithmetic decoder is configured to derive an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$) on the basis of one or more state variable values ($a_{t+1}, b_{t+1}$, also designated as source statistic values) (which are, for example, associated with a given context model), which represent statistics of a plurality of previously decoded symbol values (e.g. a sequence of binary values 0 and 1, e.g. $x_t, x_{t-1}, x_{t-2}$, etc.) in a first mode of operation and to update the one or more state variable values and/or the interval size information for an decoding of one or more subsequent symbol values to be decoded in the first mode (e.g. in a normal throughput operation mode); wherein the arithmetic decoder is configured to disable an update of the one or more state variable values and/or of the interval size information in a second mode (e.g. in a high throughput operation mode) (e.g. such that one or more state variable values which have already been used for an decoding of one or more symbol values and/or an interval size information which has already been used for an decoding of one or more symbol values is/are reused for an decoding of one or more subsequent symbol values), wherein the arithmetic decoder is configured to receive a side information (e.g. a dedicated bit or flag, or a side information describing a profile) indicating whether the first mode, in which the update of the one or more state variable values and/or of the interval size information is enabled, or the second mode, in which the update of the one or more state variable values and/or of the interval size information is disabled, is used.

According to an embodiment, the arithmetic decoder is configured to receive the side information (e.g. a dedicated bit or flag, or a side information describing a profile) indicating whether the first mode, in which the update of the one or more state variable values and/or of the interval size information is enabled, or the second mode, in which the update of the one or more state variable values and/or of the interval size information is disabled, is used, on a per frame basis (e.g. once per frame), or on a per-slice-basis (e.g. once per slice), or on a per-group-of-pictures basis (e.g. once per group of pictures) or on a per-sequence basis (e.g. once per sequence).

According to an embodiment, the arithmetic decoder is configured to receive the side information (e.g. a dedicated bit or flag, or a side information describing a profile) indicating whether the first mode, in which the update of the one or more state variable values and/or of the interval size information is enabled, or the second mode, in which the update of the one or more state variable values and/or of the interval size information is disabled, is used, on a per profile basis (wherein, for example, an each profile may have associated a mode out of the first mode and the second mode, such that selection of a profile, which is signaled by a side information, may, for example, decide whether the first mode or the second mode is used).

According to an embodiment, the arithmetic decoder is configured to receive a dedicated side information (e.g. a dedicated bit or flag, which is specifically dedicated to indicating whether the first mode or the second mode is used) indicating whether the first mode, in which the update of the one or more state variable values and/or of the interval size information is enabled, or the second mode, in which the update of the one or more state variable values and/or of the interval size information is disabled, is used.

An embodiment according to the first aspect provides an arithmetic decoder for decoding a plurality of symbols having symbol values (e.g. binary values), wherein the arithmetic decoder is configured to derive an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$) on the basis of one or more state variable values ($a_{t+1}, b_{t+1}$, also designated as source statistic values) (which are, for example, associated with a given context model), which represent statistics of a plurality of previously decoded symbol values (e.g. a sequence of binary values 0 and 1, e.g. $x_t$, $x_{t-1}$, $x_{t-2}$, etc.) in a first mode of operation and to update the one or more state variable values and/or the interval size information for an decoding of one or more subsequent symbol values to be decoded in the first mode (e.g. in a normal throughput operation mode); wherein the arithmetic decoder is configured to disable an update of the one or more state variable values and/or of the interval size information in a second mode (e.g. in a high throughput operation mode) (e.g. such that one or more state variable values which have already been used for an decoding of one or more symbol values and/or an interval size information which has already been used for an decoding of one or more symbol values is/are reused for an decoding of one or more subsequent symbol values), wherein the arithmetic decoder is configured to provide a side information (e.g. a dedicated bit or flag, or a side information describing a profile) indicating whether the first mode, in which the update of the one or more state variable values and/or of the interval size information is enabled, or the second mode, in which the update of the one or more state variable values and/or of the interval size information is disabled, is used.

According to an embodiment, the arithmetic decoder is configured to provide the side information (e.g. a dedicated bit or flag, or a side information describing a profile) indicating whether the first mode, in which the update of the one or more state variable values and/or of the interval size information is enabled, or the second mode, in which the update of the one or more state variable values and/or of the interval size information is disabled, is used, on a per frame basis (e.g. once per frame), or on a per-slice-basis (e.g. once per slice), or on a per-group-of-pictures basis (e.g. once per group of pictures) or on a per-sequence basis (e.g. once per sequence).

According to an embodiment, the arithmetic decoder is configured to provide a dedicated side information (e.g. a dedicated bit or flag, which is specifically dedicated to indicating whether the first mode or the second mode is used) indicating whether the first mode, in which the update of the one or more state variable values and/or of the interval size information is enabled, or the second mode, in which the update of the one or more state variable values and/or of the interval size information is disabled, is used.

The following embodiments may refer to any of the decoders according to the first aspect of the invention.

According to an embodiment, the arithmetic decoder is configured to re-use one or more previously determined state variable values and/or a previously determined interval size information (e.g. for an decoding of one or more subsequent symbol values to be decoded) when using the second mode (such that, for example, when using the second mode, the same one or more previously determined state variable values or the same previously determined interval size information is used for the decoding of a plurality of subsequent symbol value to be decoded, which would be decoded using different, updated interval size information when using the first mode)

According to an embodiment, the arithmetic decoder is configured to obtain an interval size (e.g. $R_{LPS}$) associated with a symbol value out of a plurality of possible symbol values on the basis of an overall coding interval size value (e.g. R) and on the basis of the interval size information ((e.g. a probability value $p_{t+1}$ or a probability value $P_{t+1}$ or a shift operation count value $g_{LPS}$) (such that, for example, due to a change of the overall coding interval size value, a different interval size is obtained for the decoding of subsequent symbol values to be decoded).

According to an embodiment, the arithmetic decoder is configured to obtain an interval size (e.g. $R_{LPS}$) associated with a symbol value out of a plurality of possible symbol values on the basis of an overall coding interval size value (e.g. R) and on the basis of the interval size information using a first computation rule when operating in the first mode and using a second computation rule when operating in the second mode (wherein, for example, the first computation rule comprises a higher accuracy than the second computation rule, and/or wherein the first computation rule comprises a higher complexity than the second computation rule).

According to an embodiment, the arithmetic decoder is configured to obtain an interval size (e.g. $R_{LPS}$) associated with a symbol value out of a plurality of possible symbol values on the basis of an overall coding interval size value (e.g. R) and on the basis of the interval size information using a multiplication of the overall coding interval size value, or of a bit-shifted version thereof, (e.g. R) with an interval size information value, or with a bit-shifted version thereof when operating in the first mode; and using an application of a bit shift operation (or by an application of a bit shift operation) (e.g. a shift-to-the-right operation) to the overall coding interval size value (e.g. R), wherein a number of bits by which the overall coding interval size value is shifted, is determined by the interval size information (e.g. $g_{LPS}$), when operating in the second mode.

According to an embodiment, the arithmetic decoder is configured to determine a shift count value (e.g. $g_{LPS}$), which describes a number of bits by which the overall coding interval size value is shifted, on the basis of an integer value representation (e.g. $P_{LPS}$) of the probability value comprising (or using) a number BITS of bits using a determination of a bit position of a most significant non-zero bit of an operand value (x, $P_{LPS}+(P_{LPS}>>2)$) which is increased or decreased with respect to the integer value representation of the probability value (for example, by a scaling operation, and/or by an addition or subtraction of a value which is dependent on the integer value representation of the probability value, and/or by an addition of a predetermined, e.g. constant, value).

According to an embodiment, the arithmetic decoder is configured to determine a shift count value (e.g. $g_{LPS}$), which describes a number of bits by which the overall coding interval size value is shifted, on the basis of one or more initialization parameters (e.g. slopeIdx and/or qp and/or offsetIdx) (e.g. without determining an interval size information on the basis of one or more source statistic values).

According to an embodiment, the arithmetic decoder is configured to obtain an updated version $a_{t+1}$ of the first state value according to $$a_{t+1}=a_t+x_t \cdot (ONE_a>>n_a)-(a_t>>n_a)$$

wherein $a_t$ is a current version of the first state value, wherein $x_t$ is a current decoded symbol (e.g. binary symbol taking values of 0 or 1), wherein $n_a$ is a window size information (e.g. having integer values), wherein $$ONE_a = (1 << BITS_a) - k_a$$

wherein BITSa is a number of bits used to represent the first state value, wherein $k_a$ is a predetermined number (e.g. an integer number, e.g. 0 or 1); and/or wherein the arithmetic decoder is configured to obtain an updated version $b_{t+1}$ of the first state value according to $$b_{t+1} = b_t + x_t \cdot (ONE_b >> n_b) - (b_t >> n_b)$$

wherein $b_t$ is a current version of the first state value, wherein $x_t$ is a current decoded symbol (e.g. binary symbol taking values of 0 or 1), wherein $n_b$ is a window size information (e.g. having integer values), wherein $$ONE_b = (1 << BITS_b) - k_b$$

wherein $BITS_b$ is a number of bits used to represent the first state value, wherein $k_b$ is a predetermined number (e.g. an integer number, e.g. 0 or 1).

According to an embodiment, the arithmetic decoder is configured to perform a weighted combination of the first state variable value ($a_t$) and of the second state variable value ($b_t$), in order to obtain the interval size information.

According to an embodiment, the arithmetic decoder is configured to derive a probability estimate $P_t$ according to $$P_t = ((a_t >> (BITS_a - BITS_{min})) + (b_t >> (BITS_b - BITS_{min}))) >> 1$$

where $$BITS_{min} = \min(BITS_a, BITS_b)$$

wherein $a_t$ is the first state variable value, wherein $b_t$ is the second state variable value, wherein $BITS_a$ is a number of bits used for a representation of $a_t$; wherein $BITS_b$ is a number of bits used for a representation of $b_t$. (wherein a probability value may be derived by dividing $P_t$ by $1 << BITS_{min}$).

An embodiment according to the second aspect provides an arithmetic decoder for decoding a plurality of symbols having symbol values (e.g. binary values) (e.g. in order to provide a bitstream comprising an arithmetically decoded representation of the symbols, and a side information), wherein the arithmetic decoder is configured to determine (e.g. derive) an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$); wherein the arithmetic decoder is configured to derive an interval size (e.g. size of an interval associated with a given symbol value; e.g. $R_{LPS}$) on the basis of the interval size information; wherein the arithmetic decoder is configured to multiply an overall coding interval size value, or a bit-shifted version thereof, (e.g. R) with an interval size information value, or a bit-shifted version thereof, (e.g. $p_{LPS}$ or $P_{LPS}$) (which has a resolution of two or more bits having different bit weight and/or which can take values that are different from a potency of 2), in order to obtain (directly or indirectly, e.g. using an additional addition) an interval size (e.g. $R_{LPS}$) associated with a symbol value out of a plurality of possible symbol values, in a first mode; and wherein the arithmetic decoder is configured to obtain an interval size (e.g. $R_{LPS}$) associated with a symbol value out of a plurality of possible symbol values by applying a bit shift operation (e.g. a shift-to-the-right operation) to the overall coding interval size value (e.g. R), wherein number of bits by which the overall coding interval size value is shifted, is determined by the interval size information (e.g. $g_{LPS}$), in a second mode; and wherein the arithmetic decoder is configured to receive a side information (e.g. a dedicated bit or flag, or a side information describing a profile) indicating whether the first mode, in which the multiplication between the overall coding size value and the interval size information value is performed, or the second mode, in which the interval size is obtained by a bit shift, is used.

Another embodiment according to the second aspect provides an arithmetic decoder for decoding a plurality of symbols having symbol values (e.g. binary values) (e.g. in order to provide a bitstream comprising an arithmetically decoded representation of the symbols, and a side information), wherein the arithmetic decoder is configured to determine (e.g. derive) an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$); wherein the arithmetic decoder is configured to derive an interval size (e.g. size of an interval associated with a given symbol value; e.g. $R_{LPS}$) on the basis of the interval size information; wherein the arithmetic decoder is configured to multiply an overall coding interval size value, or a bit-shifted version thereof, (e.g. R) with an interval size information value, or a bit-shifted version thereof, (e.g. $p_{LPS}$ or $P_{LPS}$) (which has a resolution of two or more bits having different bit weight and/or which can take values that are different from a potency of 2), in order to obtain (directly or indirectly, e.g. using an additional addition) an interval size (e.g. $R_{LPS}$) associated with a symbol value out of a plurality of possible symbol values, in a first mode; and wherein the arithmetic decoder is configured to obtain an interval size (e.g. $R_{LPS}$) associated with a symbol value out of a plurality of possible symbol values by applying a bit shift operation (e.g. a shift-to-the-right operation) to the overall coding interval size value (e.g. R), wherein number of bits by which the overall coding interval size value is shifted, is determined by the interval size information (e.g. $g_{LPS}$), in a second mode; and wherein the arithmetic decoder is configured to provide a side information (e.g. a dedicated bit or flag, or a side information describing a profile) indicating whether the first mode, in which the multiplication between the overall coding size value and the interval size information value is performed, or the second mode, in which the interval size is obtained by a bit shift, is used.

The following embodiments may refer to any of the decoders according to the second aspect of the invention.

According to an embodiment, the arithmetic decoder is configured to derive a shift count value (e.g. $g_{LPS}$) describing by how many bits the overall coding interval size value is shifted.

According to an embodiment, the arithmetic decoder is configured to derive a shift count value (e.g. $g_{LPS}$) describing by how many bits the overall coding interval size value is shifted on the basis of a probability value (e.g. $P_{LPS}$) describing a probability of a symbol value out of a plurality of possible symbol values.

According to an embodiment, the arithmetic decoder is configured to derive the shift count value (e.g. $g_{LPS}$) on the basis of an integer value representation (e.g. $P_{LPS}$) of the probability value comprising (or using) a number BITS of bits using a determination of a bit position of a most significant non-zero bit of an operand value (x, $P_{LPS}$ + ($P_{LPS} >> 2$)) which is increased or decreased with respect to the integer value representation of the probability value (for example, by a scaling operation, and/or by an addition or subtraction of a value which is dependent on the integer value representation of the probability value, and/or by an addition of a predetermined, e.g. constant, value).

According to an embodiment, the arithmetic decoder is configured to derive the shift count value using a determination of a bit position of a most significant non-zero bit of an operand value (x, $P_{LPS}+(P_{LPS}>>2)$) which is increased or decreased with respect to the integer value representation of the probability value by an addition or subtraction of a value ($P_{LPS}>>2$) which is dependent on the integer value representation of the probability value.

According to an embodiment, the arithmetic decoder is configured to derive the shift count value using a determination of a bit position of a most significant non-zero bit of an operand value (x, $P_{LPS}+(P_{LPS}>>2)$) which is increased or decreased with respect to the integer value representation of the probability value by an addition or subtraction of a value ($P_{LPS}>>2$) which is a right-shifted version of the integer value representation of the probability value.

According to an embodiment, the arithmetic decoder is configured to derive the shift count value $g_{LPS}$ according to $$g_{LPS}=\text{const1}-\lfloor \log_2(P_{LPS}+(P_{LPS}>>\text{const2})+\text{const3})\rfloor$$

or according to $$g_{LPS}=\min(g_{MAX},\text{const1}-\lfloor \log_2(P_{LPS}+(P_{LPS}>>\text{const2})+\text{const3})\rfloor)$$

or according to $$g_{LPS}=\text{const1}-\lfloor \log_2(\text{const2'}*P_{LPS}+\text{const3})\rfloor$$

or according to $$g_{LPS}=\min(g_{MAX},\text{const1}-\lfloor \log_2(\text{const2'}*P_{LPS}+\text{const3})\rfloor)$$

wherein $P_{LPS}$ is is the integer value representation of the probability value; wherein const1 is a predetermined value (e.g. BITS−1) (advantageously an integer value); wherein const2 is a predetermined value (e.g. 2) (advantageously an integer value); wherein const 2' is a predetermined value (advantageously a value which is different from 1); wherein const3 is a predetermined value (advantageously an integer value; e.g. equal to zero); wherein $g_{MAX}$ is a predetermined value; wherein ">>" is a shift-to-the-right operator; wherein log 2 is a logarithm operator to base 2; wherein $\lfloor \ldots \rfloor$ is a ceiling operator.

According to an embodiment, the arithmetic decoder is configured to derive the shift count value $g_{LPS}$ according to $$g_{LPS}=\min(g_{MAX},\text{BITS}-1-\lfloor \log_2(P_{LPS}+(P_{LPS}>>2))\rfloor)$$

wherein BITS−1 is a number of bits used for a number representation of $P_{LPS}$ (wherein a number representation of $P_{LPS}$ advantageously comprises one bit less than a number representation of $P_t$); wherein $P_{LPS}$ is the integer value representation of the probability value; wherein $g_{MAX}$ is a predetermined number; wherein >> is a shift-to-the-right operator; wherein $\log_2$ is a logarithm operator to base 2; wherein $\lfloor \ldots \rfloor$ is a ceiling operator.

According to an embodiment, the arithmetic decoder is configured to derive the shift count value on the basis of an (range-restricted) integer value representation (Pclip) of an initial probability value ($p_{init}$), which is obtained on the basis of one or more context model initialization parameters (e.g. slope, qp and offset) (e.g. at least in case that an update of the one or more state variable values and/or of the interval size information is disabled).

According to an embodiment, the arithmetic decoder is configured to initialize one or more source statistic values (e.g. $a_t$, $b_t$) in dependence on the (e.g. range-restricted) integer value representation (e.g. $P_{clip}$) of an initial probability value (e.g. $p_{init}$), which is obtained on the basis of one or more context model initialization parameters (e.g. at least in case that an update of the one or more state variable values and/or of the interval size information is used).

According to an embodiment, the arithmetic decoder is configured to initialize one or more source statistic values (e.g. $a_t$, $b_t$) in dependence on the range-restricted integer value representation (e.g. $P_{clip}$) of an initial probability value (e.g. $P_{init}$, $p_{init}$) using a bit shift operation.

According to an embodiment, the arithmetic decoder is configured to initialize one or more source statistic values (e.g. $a_t$, $b_t$) in dependence on the range-restricted integer value representation (e.g. $P_{clip}$) of an initial probability value (e.g. $P_{init}$, $p_{init}$) according to $$a_t=P_{clip}<<(\text{BITS}_a-\text{const31})$$

and/or according to $$b_t=P_{clip}<<(\text{BITS}_b-\text{const31})$$

wherein $\text{BITS}_a$ is a number of bits used for a number representation of the source statistic value $a_t$; wherein $\text{BITS}_b$ is a number of bits used for a number representation of the source statistic value $b_t$; wherein const31 is a predetermined value (e.g. 7); and wherein << is a shift-to-the-left operator.

According to an embodiment, the arithmetic decoder is configured to derive the (range-restricted) integer value representation (e.g. $P_{clip}$) of the initial probability value (e.g. $P_{init}$, $p_{init}$) according to $$P_{clip}=\min(\text{const11},\max(\text{const12},P_{init}))$$

$$P_{init}=((\text{slope}\cdot(qp-\text{const13}))>>\text{const14})+\text{offset}$$

wherein const 11 is a predetermined value (e.g. 127); wherein const 12 is a predetermined value (e.g. 1); wherein const 13 is a predetermined value (e.g. 16); wherein const 14 is a predetermined value (e.g. 1); wherein slope is an initialization parameter value (e.g. an integer value, e.g. in a range between −4 and 3) (which may be represented by an initialization parameter, e.g. slopeIdx); wherein qp is a quality parameter value (e.g. an integer value, e.g. in a range between 0 and 51) (e.g. a quantization parameter describing quantization steps used for a quantization of symbol values); wherein offset is an initialization parameter value (e.g. an integer value, e.g. in a range between 1 and 127) (which may be represented by a initialization parameter, e.g. offsetIdx).

According to an embodiment, the arithmetic decoder is configured to determine initial values of one or more source statistic values (e.g. $a_t$, $b_t$), which are used for the derivation of the interval size information value (e.g. $p_{LPS}$ or $P_{LPS}$) in the first mode, and an initial value of the shift count value (e.g. $g_{LPS}$), which is used in the second mode, on the basis of the same one or more initialization parameters (e.g. slopeIdx, offsetIdx).

According to an embodiment, the arithmetic decoder is configured to obtain the interval size $R_{LPS}$ according to $$R_{LPS}=(((R>>SHIFT_R)\cdot(P_{LPS}>>SHIFT_P))>> SHIFT_{MUL})+\text{add}_{LPS}$$

in the first mode, wherein R is the overall coding interval size value; wherein $SHIFT_R$ is a predetermined value; wherein $P_{LPS}$ is an integer valued interval size information value; wherein $SHIFT_P$ is a predetermined value; wherein $SHIFT_{MUL}$ is a predetermined value; wherein $\text{add}_{LPS}$ is a predetermined value (advantageously larger than zero).

According to an embodiment, the arithmetic decoder is configured to obtain the integer valued interval size information value $P_{LPS}$ according to $$\text{val}_{MPS}=P_t>>(BITS_{min}-1)$$

$$P_{LPS}=(\text{val}_{MPS}?(1<<BITS_{min})-1-P_t:P_t)$$

wherein Pt is an integer-valued probability value; wherein BITSmin is a number of bits used for a representation of Pt; wherein (cond? A:B) is an operator providing value A if the condition cond is non-zero, and providing B otherwise.

An embodiment according to the third aspect provides an arithmetic decoder for decoding a plurality of symbols having symbol values (e.g. binary values) (e.g. in order to provide a bitstream comprising an arithmetically decoded representation of the symbols, and a side information), wherein the arithmetic decoder is configured to determine (e.g. derive) an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$); wherein the arithmetic decoder is configured to derive an interval size (e.g. size of an interval associated with a given symbol value; e.g. $R_{LPS}$) on the basis of the interval size information; wherein the arithmetic decoder is configured to obtain an interval size (e.g. $R_{LPS}$) associated with a symbol value out of a plurality of possible symbol values by applying a bit shift operation (e.g. a shift-to-the-right operation) to the overall coding interval size value (e.g. R), wherein a number of bits by which the overall coding interval size value is shifted, is determined by a shift count value (e.g. $g_{LPS}$); and wherein the arithmetic decoder is configured to derive the shift count value (e.g. $g_{LPS}$) on the basis of an integer value representation (e.g. $P_{LPS}$) of the probability value (e.g. comprising (or using) a number BITS of bits) using a determination of a bit position of a most significant non-zero bit of an operand value (x, $P_{LPS}+(P_{LPS}>>2)$) which is increased or decreased with respect to the integer value representation of the probability value (for example, by a scaling operation, and/or by an addition or subtraction of a value which is dependent on the integer value representation of the probability value, and/or by an addition or subtraction of a predetermined, e.g. constant, value).

According to an embodiment, the arithmetic decoder is configured to derive the shift count value using a determination of a bit position of a most significant non-zero bit of an operand value (x, $P_{LPS}+(P_{LPS}>>2)$) which is increased or decreased with respect to the integer value representation of the probability value by an addition or subtraction of a value ($P_{LPS}>>2$) which is dependent on the integer value representation of the probability value.

According to an embodiment, the arithmetic decoder is configured to derive the shift count value using a determination of a bit position of a most significant non-zero bit of an operand value (x, $P_{LPS}+(P_{LPS}>>2)$) which is increased or decreased with respect to the integer value representation of the probability value by an addition or subtraction of a value ($P_{LPS}>>2$) which is a right-shifted version of the integer value representation of the probability value.

According to an embodiment, the arithmetic decoder is configured to derive the shift count value $g_{LPS}$ according to $$g_{LPS}=\text{const1}-\lfloor \log_2(P_{LPS}+(P_{LPS}>>\text{const2})+\text{const3})\rfloor$$

or according to $$g_{LPS}=\min(g_{MAX},\text{const1}-\lfloor \log_2(P_{LPS}+(P_{LPS}>>\text{const2})+\text{const3})\rfloor)$$

or according to $$g_{LPS}=\text{const1}-\lfloor \log_2(\text{const2'}*P_{LPS}+\text{const3})\rfloor$$

or according to $$g_{LPS}=\min(g_{MAX},\text{const1}-\lfloor \log_2(\text{const2'}*P_{LPS}+\text{const3})\rfloor)$$

wherein $P_{LPS}$ is is the integer value representation of the probability value; wherein const 1 is a predetermined value (e.g. BITS−1) (advantageously an integer value); wherein const 2 is a predetermined value (e.g. 2) (advantageously an integer value); wherein const 2' is a predetermined value (advantageously a value which is different from 1); wherein const3 is a predetermined value (advantageously an integer value); wherein $g_{MAX}$ is a predetermined value; wherein ">>" is a shift-to-the-right operator; wherein log 2 is a logarithm operator to base 2; wherein $\lfloor \ldots \rfloor$ is a ceiling operator.

According to an embodiment, the arithmetic decoder is configured to derive the shift count value $g_{LPS}$ according to $$g_{LPS}=\min(g_{MAX},BITS-1-\lfloor \log_2(P_{LPS}+(P_{LPS}>>2))\rfloor)$$

wherein BITS−1 is a number of bits used for a number representation of $P_{LPS}$; wherein $P_{LPS}$ is the integer value representation of the probability value; wherein $g_{MAX}$ is a predetermined number; wherein >> is a shift-to-the-right operator; wherein $\log_2$ is a logarithm operator to base 2; wherein $\lfloor \ldots \rfloor$ is a ceiling operator.

According to an embodiment, the arithmetic decoder is configured to derive the shift count value on the basis of a (e.g. range-restricted) integer value representation (e.g. $P_{clip}$) of an initial probability value (e.g. $P_{init}$, $p_{init}$), which is obtained on the basis of one or more context model initialization parameters (e.g. slope, qp and offset) (e.g. at least in case that an update of the one or more state variable values and/or of the interval size information is disabled).

According to an embodiment, the arithmetic decoder is configured to initialize one or more source statistic values (e.g. $a_t$, $b_t$) in dependence on the (range-restricted) integer value representation (e.g. $P_{clip}$) of an initial probability value (e.g. $P_{init}$, $p_{init}$), which is obtained on the basis of one or more context model initialization parameters (e.g. at least in case that an update of the one or more state variable values and/or of the interval size information is used)

According to an embodiment, the arithmetic decoder is configured to initialize one or more source statistic values (e.g. $a_t$, $b_t$) in dependence on the range-restricted integer value representation (e.g. $P_{clip}$) of an initial probability value (e.g. $P_{init}$, $p_{init}$) using a bit shift operation.

According to an embodiment, the arithmetic decoder is configured to initialize one or more source statistic values $a_t$, $b_t$ in dependence on the range-restricted integer value representation $P_{clip}$ of an initial probability value (e.g. $P_{init}$, $p_{init}$) according to $$a_t = P_{clip} << (BITS_a - const31)$$

and/or according to $$b_t = P_{clip} << (BITS_b - const31)$$

wherein $BITS_a$ is a number of bits used for a number representation of the source statistic value $a_t$; wherein $BITS_b$ is a number of bits used for a number representation of the source statistic value $b_t$; wherein const31 is a predetermined value (e.g. 7); and wherein << is a shift-to-the-left operator.

According to an embodiment, the arithmetic decoder is configured to derive the (range-restricted) integer value representation $P_{clip}$ of the initial probability value $P_{init}$ according to $$P_{clip} = \min(const11, \max(const12, P_{init}))$$

$$P_{init} = ((slope \cdot (qp - const13)) >> const14) + offset$$

wherein const 11 is a predetermined value (e.g. 127); wherein const 12 is a predetermined value (e.g. 1); wherein const 13 is a predetermined value (e.g. 16); wherein const 14 is a predetermined value (e.g. 1); wherein slope is an initialization parameter value (e.g. an integer value, e.g. in a range between −4 and 3) (which may be represented by an initialization parameter, e.g. slopeIdx); wherein qp is a quality parameter value (e.g. an integer value, e.g. in a range between 0 and 51) (e.g. a quantization parameter describing quantization steps used for a quantization of symbol values); wherein offset is an initialization parameter value (e.g. an integer value, e.g. in a range between 1 and 127) (which may be represented by a initialization parameter, e.g. offsetIdx).

According to an embodiment, the arithmetic decoder is configured to determine initial values of one or more source statistic values (e.g. $a_t$, $b_t$), which are used for the derivation of the interval size information value (e.g. $p_{LPS}$ or $P_{LPS}$) in the first mode, and an initial value of the shift count value (e.g. $g_{LPS}$), which is used in the second mode, on the basis of the same one or more initialization parameters (e.g. slopeIdx, offsetIdx).

An embodiment according to the fourth aspect provides an arithmetic decoder for decoding a plurality of symbols having symbol values (e.g. binary values) (e.g. in order to provide a bitstream comprising an arithmetically decoded representation of the symbols, and a side information), wherein the arithmetic decoder is configured to determine (e.g. derive) an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$); wherein the arithmetic decoder is configured to derive an interval size (e.g. size of an interval associated with a given symbol value; e.g. $R_{LPS}$) on the basis of the interval size information; wherein the arithmetic decoder is configured to obtain an interval size (e.g. $R_{LPS}$) associated with a symbol value out of a plurality of possible symbol values using a first interval size determination method in a first mode; and wherein the arithmetic decoder is configured to obtain an interval size (e.g. $R_{LPS}$) associated with a symbol value out of a plurality of possible symbol values using a second interval size determination method (e.g. by applying a bit shift operation (e.g. a shift-to-the-right operation) to the overall coding interval size value (e.g. R), wherein a number of bits by which the overall coding interval size value is shifted, is determined by a shift count value (e.g. $g_{LPS}$)) in a second mode; and wherein the arithmetic decoder is configured to obtain one or more first initialization values (e.g. $a_t$ and/or $b_t$) (e.g. an initial source statistic value), which are used for in the determination of the interval size using the first interval size determination method, on the basis of one or more initialization parameters (e.g. slope and offset, represented by slopeIdx and offsetIdx, respectively) (e.g. using a first initialization value determination method), and wherein the arithmetic decoder is configured to obtain one or more second initialization values (e.g. $g_{LPS}$), which are used for the determination of the interval size using the second interval size determination method, on the basis of the one or more initialization parameters (e.g. using a second initialization value determination method, which is different from the first initialization value determination method).

According to an embodiment, the first interval size determination method ("first estimator for interval size") comprises a first accuracy (e.g. a comparatively higher resolution), wherein the second interval size determination method ("second estimator for interval size") comprises a second accuracy (e.g. a comparatively lower resolution), wherein the first accuracy is different from the second accuracy; and/or wherein the first interval size determination method comprises a first computational complexity (e.g. a comparatively higher computational complexity), wherein the second interval size determination method comprises a second computational complexity (e.g. a comparatively lower computational complexity), wherein the first computational complexity is different from the second computational complexity.

According to an embodiment, the arithmetic decoder is configured to multiply an overall coding interval size value, or a bit-shifted version thereof, (e.g. R) with an interval size information value, or a bit-shifted version thereof, (e.g. $p_{LPS}$ or $P_{LPS}$) (which is has a resolution of two or more bits having different bit weight and/or which can take values that are different from a potency of 2), in order to obtain an interval size (e.g. $R_{LPS}$) associated with a symbol value out of a plurality of possible symbol values, in the first mode; and wherein the arithmetic decoder is configured to obtain an interval size (e.g. $R_{LPS}$) associated with a symbol value out of a plurality of possible symbol values by applying a bit shift operation (e.g. a shift-to-the-right operation) to the overall coding interval size value (e.g. R), wherein number of bits by which the overall coding interval size value is shifted, is determined by the interval size information (e.g. $g_{LPS}$), in the second mode.

According to an embodiment, the arithmetic decoder is configured to determine one or more source statistic values (e.g. $a_t$, $b_t$) as the one or more first initialization values; and/or wherein the arithmetic decoder is configured to determine a shift count value (e.g. $g_{LPS}$), which determines a number of bits by which the overall coding interval size value is to be shifted in order to obtain an interval size (e.g. $R_{LPS}$) associated with a symbol value out of a plurality of possible symbol, as the second initialization value.

According to an embodiment, the arithmetic decoder is configured to determine the one or more first initialization values using a first mapping (e.g. a first initialization value determination method), which linearly maps, except for one or more clipping operations and one or more rounding operations, an intermediate probability value (e.g. $P_{clip}$)

obtained on the basis of one or more initialization parameters (slope, offset) onto one or more first initialization values (e.g. $a_t$, $b_t$).

According to an embodiment, the arithmetic decoder is configured to determine the one or more second initialization values using a logarithmic compression of an operand value (e.g. $P_{LPS}+(P_{LPS}>>2)$) which is equal to the intermediate probability value (e.g. $P_{clip}$) or which is based on the intermediate probability value (e.g. $P_{clip}$), to a reduced range of (e.g. integer) values (e.g. $g_{LPS}$) (e.g. a second initialization value determination method); or wherein the arithmetic decoder is configured to determine the one or more second initialization values using a quantization to a grid in a logarithmized domain of an operand value (e.g. $P_{LPS}+(P_{LPS}>>2)$) which is equal to the intermediate probability value (e.g. $P_{clip}$) or which is based on the intermediate probability value (e.g. $P_{clip}$) (e.g. to obtain $g_{LPS}$) (e.g. a second initialization value determination method).

According to an embodiment, the arithmetic decoder is configured to determine the one or more second initialization values (e.g. $g_{LPS}$) using a second mapping, which comprises a computation of a logarithm (e.g. $\log_2$) of an operand value (e.g. $P_{LPS}+(P_{LPS}>>2)$), which is equal to the intermediate probability value (e.g. $P_{clip}$) or which is based on the intermediate probability value (e.g. $P_{clip}$), and a rounding of a result of the computation of the logarithm to an integer value.

According to an embodiment, the arithmetic decoder is configured to obtain one or more first initialization values $a_t$ and/or $b_t$ according to $$a_t = P_{clip} << (BITS_a - const64)$$

$$b_t = P_{clip} << (BITS_b - const64)$$

wherein the arithmetic decoder is configured to obtain the intermediate probability value $P_{clip}$ according to $$P_{clip} = \min(const60, \max(const61, P_{init}))$$

$$P_{init} = ((slope \cdot (qp - const62)) >> const63) + offset$$

wherein slope is a first initialization parameter; wherein offset is a second initialization parameter; wherein qp is a third initialization parameter; wherein const60 is a predetermined value (e.g. 127); wherein const61 is a predetermined value (e.g. 1); wherein const62 is a predetermined value (e.g. 16); wherein const63 is a predetermined value (e.g. 1); wherein const64 is a predetermined value (e.g. 7); wherein $BITS_a$ is a number of bits used for a representation of the first source statistic value $a_t$; wherein $BITS_b$ is a number of bits used for a representation of the first source statistic value $b_t$.

According to an embodiment, the arithmetic decoder is configured to obtain a second initialization value $g_{LPS}$ according to $$g_{LPS} = const1 - \lfloor \log_2(P_{LPS} + (P_{LPS} >> const2) + const3) \rfloor$$

or according to $$g_{LPS} = \min(g_{MAX}, const1 - \lfloor \log_2(P_{LPS} + (P_{LPS} >> const2) + const3) \rfloor)$$

or according to $$g_{LPS} = const1 - \lfloor \log_2(const2' \cdot P_{LPS} + const3) \rfloor$$

or according to $$g_{LPS} = \min(g_{MAX}, const1 - \lfloor \log_2(const2' \cdot P_{LPS} + const3) \rfloor)$$

wherein $P_{LPS}$ is equal to $P_{clip}$ or based on $P_{clip}$ (e.g. derived from $P_{clip}$ using a least-probable-symbol probability determination), wherein $P_{clip}$ is obtained according to $$P_{clip} = \min(const60, \max(const61, P_{init}))$$

$$P_{init} = ((slope \cdot (qp - const62)) >> const63) + offset$$

wherein slope is a first initialization parameter; wherein offset is a second initialization parameter; wherein qp is a third initialization parameter; wherein const60 is a predetermined value (e.g. 127); wherein const61 is a predetermined value (e.g. 1); wherein const62 is a predetermined value (e.g. 16); wherein const63 is a predetermined value (e.g. 1); wherein const 1 is a predetermined value (e.g. BITS−1) (advantageously an integer value); wherein const 2 is a predetermined value (e.g. 2) (advantageously an integer value); wherein const 2' is a predetermined value (advantageously a value which is different from 1); wherein const3 is a predetermined value (advantageously an integer value); wherein $g_{MAX}$ is a predetermined value; wherein ">>" is a shift-to-the-right operator; wherein log 2 is a logarithm operator to base 2; wherein $\lfloor \ldots \rfloor$ is a ceiling operator.

An embodiment according to the fifth aspect provides an arithmetic decoder for decoding a plurality of symbols having symbol values (e.g. binary values) (e.g. in order to provide a bitstream comprising an arithmetically decoded representation of the symbols, and a side information), wherein the arithmetic decoder is configured to determine (e.g. derive) an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$); wherein the arithmetic decoder is configured to derive an interval size (e.g. size of an interval associated with a given symbol value; e.g. $R_{LPS}$) on the basis of the interval size information; wherein the arithmetic decoder is configured to obtain an interval size (e.g. $R_{LPS}$) associated with a symbol value out of a plurality of possible symbol values (e.g. using a first interval size determination method) on the basis of an overall coding interval size value (e.g. R) in a first mode; and wherein the arithmetic decoder is configured to obtain an interval size (e.g. $R_{LPS}$) associated with a symbol value out of a plurality of possible symbol values (using a second interval size determination method) (e.g. by applying a bit shift operation (e.g. a shift-to-the-right operation) to the overall coding interval size value (e.g. R), wherein a number of bits by which the overall coding interval size value is shifted, is determined by a shift count value (e.g. $g_{LPS}$)) on the basis of the overall coding interval size value (e.g. R) in a second mode; and wherein the arithmetic decoder is configured to switch between a usage of a first bit number (or first bit resolution) and a usage of a second bit number (or second bit resolution) for the for the representation of the overall coding interval size value (e.g. R) (such that, for example, the first bit number is used when operating in the first mode, and such that, for example, the second bit number is used when operating in the second mode).

According to an embodiment, the arithmetic decoder is configured to determine (and update, e.g. re-normalize) the overall coding interval size value such that the overall coding interval size value is in an interval $$(1<<(BITS_{R1}-1),(1<<BITS_{R1})-1)$$

before an decoding of a symbol value (e.g. after a re-normalization), (and such that the overall coding interval size value is in an interval $(1, (1<<BITS_{R1})-2)$ after an decoding of a symbol value and before a possible re-normalization) wherein the arithmetic decoder is configured to represent the coding interval size with $BITS_{R1}$ bits in the first mode, and wherein the arithmetic decoder is configured to represent the coding interval size with $BITS_{R2}$ bits in the second mode, wherein $BITS_{R2}<BITS_{R1}$.

According to an embodiment, the arithmetic decoder is configured to multiply an overall coding interval size value, or a bit-shifted version thereof, (e.g. R) with an interval size information value, or a bit-shifted version thereof, (e.g. $p_{LPS}$ or $P_{LPS}$) (which is has a resolution of two or more bits having different bit weight and/or which can take values that are different from a potency of 2), in order to obtain an interval size (e.g. $R_{LPS}$) associated with a symbol value out of a plurality of possible symbol values, in the first mode (in which, for example, the comparatively higher first bit number or first resolution may be used).

According to an embodiment, the arithmetic decoder is configured to obtain an interval size (e.g. $R_{LPS}$) associated with a symbol value out of a plurality of possible symbol values by applying a bit shift operation (e.g. a shift-to-the-right operation) to the overall coding interval size value (e.g. R), wherein a number of bits by which the overall coding interval size value is shifted, is determined by the interval size information (e.g. $g_{LPS}$), in the second mode (in which, for example, the comparatively lower second bit number or second resolution may be used).

According to an embodiment, the arithmetic decoder is configured to derive a shift count value (e.g. $g_{LPS}$) describing by how many bits the overall coding interval size value is shifted when operating in the second mode.

According to an embodiment, the arithmetic decoder is configured to limit the shift count value (e.g. $g_{LPS}$) to a maximum value $g_{MAX}$, and wherein the first bit number (e.g. $BITS_{R1}$) is larger than the second bit number, and wherein the second bit number (e.g. $BITS_{R2}$) is larger than the maximum value $g_{MAX}$ (wherein, for example, $BITS_{R2}=g_{MAX}+ADD_{MAX}$, wherein $ADD_{MAX}$ is a positive integer value).

According to an embodiment, the arithmetic decoder is configured to switch between a usage of a first bit number (or first bit resolution) and a usage of a second bit number (or second bit resolution) for the for the representation of the overall coding interval size value (e.g. R), such that the first bit number is used when operating in the first mode, and such that the second bit number is used when operating in the second mode, wherein the first bit number is larger than the second bit number, and wherein the arithmetic decoder is configured to obtain an interval size (e.g. $R_{LPS}$) associated with a symbol value out of a plurality of possible symbol values by applying a bit shift operation (e.g. a shift-to-the-right operation) to the overall coding interval size value (e.g. R), wherein a number of bits by which the overall coding interval size value is shifted, is determined by a shift count value (e.g. $g_{LPS}$)) in a second mode; and wherein the shift count value is limited to a first maximum value in the first mode (e.g. to gmax(mode1)), and wherein the shift count value is limited to a second maximum value in the second mode (e.g. to gmax(mode2)), wherein the first maximum value is larger than the second maximum value.

According to an embodiment, the first bit number is adapted to the first maximum value, such that a shifting of the overall coding size value, represented by a number of bits defined by the first bit number, results in a non-zero value, and wherein the second bit number is adapted to the second maximum value, such that a shifting of the overall coding size value, represented by a number of bits defined by the second bit number, results in a non-zero value.

An embodiment according to the first aspect provides a method for encoding a plurality of symbols having symbol values (e.g. binary values) (e.g. in order to provide a bitstream comprising an arithmetically encoded representation of the symbols, and a side information), wherein the method comprises deriving an interval size information (e.g. a probability value $p_{t+1}$ or a probability value $P_{t+1}$ or $P_{LPS}$ or a shift operation count value $g_{LPS}$) for an arithmetic encoding of one or more symbol values to be encoded ($x_{t+1}$) on the basis of one or more state variable values ($a_{t+1}, b_{t+1}$, also designated as source statistic values) (which are, for example, associated with a given context model), which represent statistics of a plurality of previously encoded symbol values (e.g. a sequence of binary values 0 and 1, e.g. $x_t, x_{t-1}, x_{t-2}$, etc.) in a first mode of operation and to update the one or more state variable values and/or the interval size information for an encoding of one or more subsequent symbol values to be encoded in the first mode (e.g. in a normal throughput operation mode); wherein the method comprises disabling an update of the one or more state variable values and/or of the interval size information in a second mode (e.g. in a high throughput operation mode) (e.g. such that one or more state variable values which have already been used for an encoding of one or more symbol values and/or an interval size information which has already been used for an encoding of one or more symbol values is/are reused for an encoding of one or more subsequent symbol values); wherein the method comprises providing a side information (e.g. a dedicated bit or flag, or a side information describing a profile) indicating whether the first mode, in which the update of the one or more state variable values and/or of the interval size information is enabled, or the second mode, in which the update of the one or more state variable values and/or of the interval size information is disabled, is used.

An embodiment according to the second aspect provides a method for encoding a plurality of symbols having symbol values (e.g. binary values) (e.g. in order to provide a bitstream comprising an arithmetically encoded representation of the symbols, and a side information), wherein the method comprises determining (e.g. derive) an interval size information (e.g. a probability value $p_{t+1}$ or a probability value $P_{t+1}$ or $P_{LPS}$ or a shift operation count value $g_{LPS}$) for an arithmetic encoding of one or more symbol values to be encoded ($x_{t+1}$); wherein the method comprises deriving an interval size (e.g. size of an interval associated with a given symbol value; e.g. $R_{LPS}$) on the basis of the interval size information; wherein the method comprises multiplying an overall coding interval size value, or a bit-shifted version thereof, (e.g. R) with an interval size information value, or a bit-shifted version thereof, (e.g. $p_{LPS}$ or $P_{LPS}$) (which has a resolution of two or more bits having different bit weight and/or which can take values that are different from a potency of 2), in order to obtain (directly or indirectly, e.g.

using an additional addition) an interval size (e.g. $R_{LPS}$) associated with a symbol value out of a plurality of possible symbol values, in a first mode; and wherein the method comprises obtaining an interval size (e.g. $R_{LPS}$) associated with a symbol value out of a plurality of possible symbol values by applying a bit shift operation (e.g. a shift-to-the-right operation) to the overall coding interval size value (e.g. R), wherein number of bits by which the overall coding interval size value is shifted, is determined by the interval size information (e.g. $g_{LPS}$), in a second mode; and wherein the method comprises providing a side information (e.g. a dedicated bit or flag, or a side information describing a profile) indicating whether the first mode, in which the multiplication between the overall coding size value and the interval size information value is performed, or the second mode, in which the interval size is obtained by a bit shift, is used.

An embodiment according to the third aspect provides a method for encoding a plurality of symbols having symbol values (e.g. binary values) (e.g. in order to provide a bitstream comprising an arithmetically encoded representation of the symbols, and a side information), wherein the method comprises determining (e.g. derive) an interval size information (e.g. a probability value $p_{t+1}$ or a probability value $P_{t+1}$ or $P_{LPS}$ or a shift operation count value $g_{LPS}$) for an arithmetic encoding of one or more symbol values to be encoded ($x_{t+1}$); wherein the method comprises deriving an interval size (e.g. size of an interval associated with a given symbol value; e.g. $R_{LPS}$) on the basis of the interval size information; wherein the method comprises obtaining an interval size (e.g. $R_{LPS}$) associated with a symbol value out of a plurality of possible symbol values by applying a bit shift operation (e.g. a shift-to-the-right operation) to the overall coding interval size value (e.g. R), wherein a number of bits by which the overall coding interval size value is shifted, is determined by a shift count value (e.g. $g_{LPS}$); and wherein the method comprises deriving the shift count value (e.g. $g_{LPS}$) on the basis of an integer value representation (e.g. $P_{LPS}$) of the probability value (e.g. comprising (or using) a number BITS of bits) using a determination of a bit position of a most significant non-zero bit of an operand value (x, $P_{LPS}+(P_{LPS}>>2)$) which is increased or decreased with respect to the integer value representation of the probability value (for example, by a scaling operation, and/or by an addition or subtraction of a value which is dependent on the integer value representation of the probability value, and/or by an addition or subtraction of a predetermined, e.g. constant, value).

An embodiment according to the fourth aspect provides a method for encoding a plurality of symbols having symbol values (e.g. binary values) (e.g. in order to provide a bitstream comprising an arithmetically encoded representation of the symbols, and a side information), wherein the method comprises determining (e.g. derive) an interval size information (e.g. a probability value $p_{t+1}$ or a probability value $P_{t+1}$ or $P_{LPS}$ or a shift operation count value $g_{LPS}$) for an arithmetic encoding of one or more symbol values to be encoded ($x_{t+1}$); wherein the method comprises deriving an interval size (e.g. size of an interval associated with a given symbol value; e.g. $R_{LPS}$) on the basis of the interval size information; wherein the method comprises obtaining an interval size (e.g. $R_{LPS}$) associated with a symbol value out of a plurality of possible symbol values using a first interval size determination method in a first mode; and wherein the method comprises obtaining an interval size (e.g. $R_{LPS}$) associated with a symbol value out of a plurality of possible symbol values using a second interval size determination method (e.g. by applying a bit shift operation (e.g. a shift-to-the-right operation) to the overall coding interval size value (e.g. R), wherein a number of bits by which the overall coding interval size value is shifted, is determined by a shift count value (e.g. $g_{LPS}$)) in a second mode; and wherein the method comprises obtaining one or more first initialization values (e.g. $a_t$ and/or $b_t$) (e.g. an initial source statistic value), which are used for in the determination of the interval size using the first interval size determination method, on the basis of one or more initialization parameters (e.g. slope and offset, represented by slopeIdx and offsetIdx, respectively) (e.g. using a first initialization value determination method), and wherein the method comprises obtaining one or more second initialization values (e.g. $g_{LPS}$), which are used for the determination of the interval size using the second interval size determination method, on the basis of the one or more initialization parameters (e.g. using a second initialization value determination method, which is different from the first initialization value determination method).

An embodiment according to the fifth aspect provides a method for encoding a plurality of symbols having symbol values (e.g. binary values) (e.g. in order to provide a bitstream comprising an arithmetically encoded representation of the symbols, and a side information), wherein the method comprises determining (e.g. derive) an interval size information (e.g. a probability value $p_{t+1}$ or a probability value $P_{t+1}$ or $P_{LPS}$ or a shift operation count value $g_{LPS}$) for an arithmetic encoding of one or more symbol values to be encoded ($x_{t+1}$); wherein the method comprises deriving an interval size (e.g. size of an interval associated with a given symbol value; e.g. $R_{LPS}$) on the basis of the interval size information; wherein the method comprises obtaining an interval size (e.g. $R_{LPS}$) associated with a symbol value out of a plurality of possible symbol values (e.g. using a first interval size determination method) on the basis of an overall coding interval size value (e.g. R) in a first mode; and wherein the method comprises obtaining an interval size (e.g. $R_{LPS}$) associated with a symbol value out of a plurality of possible symbol values (using a second interval size determination method) (e.g. by applying a bit shift operation (e.g. a shift-to-the-right operation) to the overall coding interval size value (e.g. R), wherein a number of bits by which the overall coding interval size value is shifted, is determined by a shift count value (e.g. $g_{LPS}$)) on the basis of the overall coding interval size value (e.g. R) in a second mode; and wherein the method comprises switching between a usage of a first bit number (or first bit resolution) and a usage of a second bit number (or second bit resolution) for the for the representation of the overall coding interval size value (e.g. R) (such that, for example, the first bit number is used when operating in the first mode, and such that, for example, the second bit number is used when operating in the second mode).

An embodiment according to the first aspect provides a method for decoding a plurality of symbols having symbol values (e.g. binary values), wherein the method comprises deriving an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$) on the basis of one or more state variable values ($a_{t+1}, b_{t+1}$, also designated as source statistic values) (which are, for example, associated with a given context model), which represent statistics of a plurality of previously decoded symbol values (e.g. a sequence of binary values 0 and 1, e.g. $x_t, x_{t-1}, x_{t-2}$, etc.) in a first mode of operation and to update the one or more state variable values and/or the interval size information for an decoding of one or more subsequent symbol values to be decoded in the first mode (e.g. in a normal throughput operation mode); wherein the method comprises disabling an update of the one or more state variable values and/or of the interval size information in a second mode (e.g. in a high throughput operation mode) (e.g. such that one or more state variable values which have already been used for an decoding of one or more symbol values and/or an interval size information which has already been used for an decoding of one or more symbol values is/are reused for an decoding of one or more subsequent symbol values); wherein the method comprises receiving a side information (e.g. a dedicated bit or flag, or a side information describing a profile) indicating whether the first mode, in which the update of the one or more state variable values and/or of the interval size information is enabled, or the second mode, in which the update of the one or more state variable values and/or of the interval size information is disabled, is used.

An embodiment according to the first aspect provides a method for decoding a plurality of symbols having symbol values (e.g. binary values), wherein the method comprises deriving an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$) on the basis of one or more state variable values ($a_{t+1}, b_{t+1}$, also designated as source statistic values) (which are, for example, associated with a given context model), which represent statistics of a plurality of previously decoded symbol values (e.g. a sequence of binary values 0 and 1, e.g. $x_t$, $x_{t-1}$, $x_{t-2}$, etc.) in a first mode of operation and to update the one or more state variable values and/or the interval size information for an decoding of one or more subsequent symbol values to be decoded in the first mode (e.g. in a normal throughput operation mode); wherein the method comprises disabling an update of the one or more state variable values and/or of the interval size information in a second mode (e.g. in a high throughput operation mode) (e.g. such that one or more state variable values which have already been used for an decoding of one or more symbol values and/or an interval size information which has already been used for an decoding of one or more symbol values is/are reused for an decoding of one or more subsequent symbol values); wherein the method comprises providing a side information (e.g. a dedicated bit or flag, or a side information describing a profile) indicating whether the first mode, in which the update of the one or more state variable values and/or of the interval size information is enabled, or the second mode, in which the update of the one or more state variable values and/or of the interval size information is disabled, is used.

An embodiment according to the second aspect provides a method for decoding a plurality of symbols having symbol values (e.g. binary values) (e.g. in order to provide a bitstream comprising an arithmetically decoded representation of the symbols, and a side information), wherein the method comprises determining (e.g. derive) an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$); wherein the method comprises deriving an interval size (e.g. size of an interval associated with a given symbol value; e.g. $R_{LPS}$) on the basis of the interval size information; wherein the method comprises multiplying an overall coding interval size value, or a bit-shifted version thereof, (e.g. R) with an interval size information value, or a bit-shifted version thereof, (e.g. $p_{LPS}$ or $P_{LPS}$) (which has a resolution of two or more bits having different bit weight and/or which can take values that are different from a potency of 2), in order to obtain (directly or indirectly, e.g. using an additional addition) an interval size (e.g. $R_{LPS}$) associated with a symbol value out of a plurality of possible symbol values, in a first mode; and wherein the method comprises obtaining an interval size (e.g. $R_{LPS}$) associated with a symbol value out of a plurality of possible symbol values by applying a bit shift operation (e.g. a shift-to-the-right operation) to the overall coding interval size value (e.g. R), wherein number of bits by which the overall coding interval size value is shifted, is determined by the interval size information (e.g. $g_{LPS}$), in a second mode; and wherein the method comprises receiving a side information (e.g. a dedicated bit or flag, or a side information describing a profile) indicating whether the first mode, in which the multiplication between the overall coding size value and the interval size information value is performed, or the second mode, in which the interval size is obtained by a bit shift, is used.

An embodiment according to the second aspect provides a method for decoding a plurality of symbols having symbol values (e.g. binary values) (e.g. in order to provide a bitstream comprising an arithmetically decoded representation of the symbols, and a side information), wherein the method comprises determining (e.g. derive) an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$); wherein the method comprises deriving an interval size (e.g. size of an interval associated with a given symbol value; e.g. $R_{LPS}$) on the basis of the interval size information; wherein the method comprises multiplying an overall coding interval size value, or a bit-shifted version thereof, (e.g. R) with an interval size information value, or a bit-shifted version thereof, (e.g. $p_{LPS}$ or $P_{LPS}$) (which has a resolution of two or more bits having different bit weight and/or which can take values that are different from a potency of 2), in order to obtain (directly or indirectly, e.g. using an additional addition) an interval size (e.g. $R_{LPS}$) associated with a symbol value out of a plurality of possible symbol values, in a first mode; and wherein the method comprises obtaining an interval size (e.g. $R_{LPS}$) associated with a symbol value out of a plurality of possible symbol values by applying a bit shift operation (e.g. a shift-to-the-right operation) to the overall coding interval size value (e.g. R), wherein number of bits by which the overall coding interval size value is shifted, is determined by the interval size information (e.g. $g_{LPS}$), in a second mode; and wherein the method comprises providing a side information (e.g. a dedicated bit or flag, or a side information describing a profile) indicating whether the first mode, in which the multiplication between the overall coding size value and the interval size information value is performed, or the second mode, in which the interval size is obtained by a bit shift, is used.

An embodiment according to the third aspect provides a method for decoding a plurality of symbols having symbol values (e.g. binary values) (e.g. in order to provide a bitstream comprising an arithmetically decoded representation of the symbols, and a side information), wherein the method comprises determining (e.g. derive) an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$); wherein the method comprises deriving an interval size (e.g. size of an interval associated with a given symbol value; e.g. $R_{LPS}$) on the basis of the interval size information; wherein the method comprises obtaining an interval size (e.g. $R_{LPS}$) associated with a symbol value out of a plurality of possible symbol values by applying a bit shift operation (e.g. a shift-to-the-right operation) to the overall coding interval size value (e.g. R), wherein a number of bits by which the overall coding interval size value is shifted, is determined by a shift count value (e.g. $g_{LPS}$); and wherein the method comprises deriving the shift count value (e.g. $g_{LPS}$) on the basis of an integer value representation (e.g. $P_{LPS}$) of the probability value (e.g. comprising (or using) a number BITS of bits) using a determination of a bit position of a most significant non-zero bit of an operand value (x, $P_{LPS}+(P_{LPS}>>2)$) which is increased or decreased with respect to the integer value representation of the probability value (for example, by a scaling operation, and/or by an addition or subtraction of a value which is dependent on the integer value representation of the probability value, and/or by an addition or subtraction of a predetermined, e.g. constant, value).

An embodiment according to the fourth aspect provides a method for decoding a plurality of symbols having symbol values (e.g. binary values) (e.g. in order to provide a bitstream comprising an arithmetically decoded representation of the symbols, and a side information), wherein the method comprises determining (e.g. derive) an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$); wherein the method comprises deriving an interval size (e.g. size of an interval associated with a given symbol value; e.g. $R_{LPS}$) on the basis of the interval size information; wherein the method comprises obtaining an interval size (e.g. $R_{LPS}$) associated with a symbol value out of a plurality of possible symbol values using a first interval size determination method in a first mode; and wherein the method comprises obtaining an interval size (e.g. $R_{LPS}$) associated with a symbol value out of a plurality of possible symbol values using a second interval size determination method (e.g. by applying a bit shift operation (e.g. a shift-to-the-right operation) to the overall coding interval size value (e.g. R), wherein a number of bits by which the overall coding interval size value is shifted, is determined by a shift count value (e.g. $g_{LPS}$)) in a second mode; and wherein the method comprises obtaining one or more first initialization values (e.g. $a_t$ and/or $b_t$) (e.g. an initial source statistic value), which are used for in the determination of the interval size using the first interval size determination method, on the basis of one or more initialization parameters (e.g. slope and offset, represented by slopeIdx and offsetIdx, respectively) (e.g. using a first initialization value determination method), and wherein the method comprises obtaining one or more second initialization values (e.g. $g_{LPS}$), which are used for the determination of the interval size using the second interval size determination method, on the basis of the one or more initialization parameters (e.g. using a second initialization value determination method, which is different from the first initialization value determination method).

An embodiment according to the fifth aspect provides a method for decoding a plurality of symbols having symbol values (e.g. binary values) (e.g. in order to provide a bitstream comprising an arithmetically decoded representation of the symbols, and a side information), wherein the method comprises determining (e.g. derive) an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$); wherein the method comprises deriving an interval size (e.g. size of an interval associated with a given symbol value; e.g. $R_{LPS}$) on the basis of the interval size information; wherein the method comprises obtaining an interval size (e.g. $R_{LPS}$) associated with a symbol value out of a plurality of possible symbol values (e.g. using a first interval size determination method) on the basis of an overall coding interval size value (e.g. R) in a first mode; and wherein the method comprises obtaining an interval size (e.g. $R_{LPS}$) associated with a symbol value out of a plurality of possible symbol values (using a second interval size determination method) (e.g. by applying a bit shift operation (e.g. a shift-to-the-right operation) to the overall coding interval size value (e.g. R), wherein a number of bits by which the overall coding interval size value is shifted, is determined by a shift count value (e.g. $g_{LPS}$)) on the basis of the overall coding interval size value (e.g. R) in a second mode; and wherein the method comprises switching between a usage of a first bit number (or first bit resolution) and a usage of a second bit number (or second bit resolution) for the for the representation of the overall coding interval size value (e.g. R) (such that, for example, the first bit number is used when operating in the first mode, and such that, for example, the second bit number is used when operating in the second mode).

A sixth aspect of the invention relies on the idea to use a count value for determining an interval size for an encoding or decoding of a symbol, the interval size being associated to a symbol value. The idea includes to derive the count value on the basis of an integer value representation of an interval size information, which may, for example, describe a probability for the associated symbol value. Deriving the count value uses a determination of a bit position of a most significant non-zero bit of an operand value which is increased or decreased with respect to the integer value representation of the interval size information. For example, determining the bit position of the most significant non-zero bit of the operand value is an efficient operation for rounding the operand value to a power of two. By increasing or decreasing the operand value with respect to the integer value representation of the interval size information, may, for example, result in an up-rounding or an off-rounding of the interval size information, for example to the next closest power of two. Thus, the rounding may be accurate, for example, more accurate as without increasing or decreasing the integer value representation of the interval size information. Further, the determination of a position of a most significant bit may involve little computational effort. Consequently, determining the count value according to the described process may, for example, represent a very efficient way for an accurate rounding of the integer value representation of the interval size value to a bit position of a non-zero bit, that is, e.g., to a power of two. A power of two may be represented with a low number of bits, for example, by indicating the power instead of the value. Thus, using the count value for determining the interval size may involve low number of bits for the count value and therefore allows for an efficient and fast implementation. For example, the count value may be used as an input for a mapping function, or for a bit shift operation. As the count value may represent the integer value of the interval size value in form of a power of two, it may be directly mapped onto a position of entries in a table without further processing, so that a mapping may be implemented very efficiently. Similarly, the form of the count value may enable an efficient implementation of a bit shift operation, in which the count value is used to indicate the number of bits by which a operand value, for example an overall coding interval size value, is to be shifted, for example for obtaining the interval size. It is noted, that in some of the aspects described herein, a shift count value may be derived similarly, or equivalently, as the count value, or the shift count value may correspond to the count value, so that the functionality and advantages described with respect to the count value may also apply to the shift count value.

An embodiment according to the sixth aspect provides a arithmetic encoder for encoding a plurality of symbols having symbol values (e.g. binary values) (e.g. in order to provide a bitstream comprising an arithmetically encoded representation of the symbols, and a side information), wherein the arithmetic encoder is configured to determine (e.g. derive) an interval size information (e.g. a probability value $p_{t+1}$ or a probability value $P_{t+1}$ or $P_{LPS}$ or a shift operation count value $g_{LPS}$) for an arithmetic encoding of one or more symbol values to be encoded (e.g. $x_{t+1}$); wherein the arithmetic encoder is configured to derive an interval size (e.g. size of an interval associated with a given symbol value; e.g. $R_{LPS}$) on the basis of the interval size information; wherein the arithmetic encoder is configured to derive a count value ($g_{LPS}$; also designated as a shift count value or as a shift parameter) on the basis of an integer value representation (e.g. $P_{LPS}$) of the probability value (e.g. comprising (or using) a number BITS of bits) using a determination of a bit position of a most significant non-zero bit of an operand value (e.g. x, $P_{LPS}+(P_{LPS}>>2)$) which is increased or decreased with respect to the integer value representation of the probability value (for example, by a scaling operation, and/or by an addition or subtraction of a value which is dependent on the integer value representation of the probability value, and/or by an addition or subtraction of a predetermined, e.g. constant, value); and wherein the arithmetic encoder is configured to obtain an interval size (e.g. $R_{LPS}$) associated with a symbol value out of a plurality of possible symbol values using the count value.

According to an embodiment, the arithmetic encoder is configured to apply a bit shift operation (e.g. a shift-to-the-right operation) to a predetermined value (e.g. R'; e.g. 384) (which, for example, lies within a range of allowable overall coding interval size values, and which may lie at a middle of a range (or interval) of allowable overall coding interval size values within a tolerance of +/−10 percent with respect to a width of the range (or interval)), in order to obtain the interval size (e.g. $R_{LPS}$), wherein a number of bits by which the predetermined value is shifted, is determined by the count value (e.g. $g_{LPS}$). Using the predetermined value for determining the interval size is a way to determine the interval size with little computational effort, for example, less effort as compared to determining the interval size based on an overall coding interval size aware value which is adapted continuously. Consequently, this implementation allows for a particularly high throughput.

According to an embodiment, the arithmetic encoder is configured to map the count value (e.g. $g_{LPS}$) onto the interval size (e.g. onto $R_{LPS}$) (e.g. using a mapping table) (at least over a subrange of a possible range of values of the count value). A mapping operation may be performed fast and with little effort, providing for a high throughput.

According to an embodiment, the arithmetic encoder is configured to determine the interval size independent from a current overall coding interval size (e.g. R) (e.g. using an application of a bit shift operation to a predetermined value (e.g. R'), or using a mapping table) if the count value lies in a first range of values (e.g. if the count value is larger than 1, or if the count value is larger than a (predetermined) threshold value) and wherein the arithmetic encoder is configured to determine the interval size in dependence on the current overall coding interval size value (e.g. R) if the count value lies in a second range of values which is different from the first range of values (e.g. if the count value is smaller than or equal to 1, or if the count value is smaller than or equal to a (predetermined) threshold value, or if the count value takes a predetermined value (e.g. 1)). Thus, the determination of the interval size may be adapted to the count value, which is based on the interval size information, which, for example, represent a probability of a symbol value associated to the interval size. For example, the first range of values for the count value may represent values for which the probability for the associated symbol value is higher than the probability for the other one of binary symbol values or higher than a threshold value, while the second range of values may represent values for which the probability of the binary symbol values is equal or similar or for which the probability of the associated symbol value is lower than a threshold value. For example, for equal or similar probabilities of binary symbol values, it may be computationally efficient to determine the interval size and based on the overall coding interval size value, for example to reuse the overall coding interval size value as the interval size. Otherwise, a determination of the interval size independent from the overall coding interval size value may provide for an accurate determination of the interval size and thus for a high compression rate. In other words, adapting the way of obtaining the interval size based on the count value may provide for a good trade-off between computational efficiency and compression rate.

According to an embodiment, the arithmetic encoder is configured to take over the current overall coding interval size value (e.g. R) as the interval size (e.g. $R_{LPS}$) (and to skip an interval size renormalization) if the count value lies in the second range of values (i.e. to use a bypass mode) (wherein, for example, the overall coding interval size is limited to a range between $2^N$ and $2^{N+1}-1$). Taking over the current coding interval size value saves computational power and provides for high throughput. As in the second range of values, for example, the count value may represent a probability for the symbol value associated to the interval size which is equal or similar to the probability for the other one of binary values, reusing the current overall coding interval size value may nevertheless provide for a high compression rate, as, for example, a renormalization of the overall coding interval size value may be omitted. Thus, further computation power may be saved, for example, without a loss of accuracy.

According to an embodiment, the arithmetic encoder is configured to apply a shift operation (e.g. a shift-to-the-right operation) to the current overall coding interval size value (e.g. R), in order to obtain the interval size (e.g. $R_{LPS}$), if the count value lies in the second range of values (wherein a number of bits by which the current overall coding interval size value is shifted, is determined by the count value (e.g. $g_{LPS}$), or is predetermined). Determining the interval size based on the overall coding interval size value, if the count value is in the second range of values, provides for a particularly accurate determination of the interval size.

According to an embodiment, the arithmetic encoder is configured to apply a shift operation (e.g. a shift-to-the-right operation) to the current overall coding interval size value (e.g. R), in order to obtain the interval size (e.g. $R_{LPS}$), if the count value lies in a first range of values (e.g. for count values larger than 1) (wherein a number of bits by which the current overall coding interval size value is shifted, is determined by the count value (e.g. $g_{LPS}$), or is predetermined), and wherein the arithmetic encoder is configured to take over the current overall coding interval size value (e.g. R) as the interval size (e.g. $R_{LPS}$) (and to skip an interval size renormalization) if the count value lies in a second range of values (e.g. for a count value of 1) (i.e. to use a bypass mode) (wherein, for example, the overall coding interval size is limited to a range between $2^N$ and $2^{N+1}-1$).

A seventh aspect of the invention relies on the idea to implement two or more operation modes for an encoding or a decoding of a symbol value so that for each of the operation modes, the trade-off between compression rate and computational effort may be chosen individually. The idea includes to determine an interval size for an encoding or decoding of a symbol value with a first granularity or a first resolution than operating in the first mode, and a second granularity or resolution when operating in the second mode. Determining the interval size with a high granularity or resolution may allow for a high compression rate of an encoded bitstream into which the symbol value to be encoded is encoded or from which the symbol value to be decoded is decoded. In contrast, a low resolution or granularity may allow for a particularly fast determination of the interval size and may further allow for a representation of the interval size using a low number of bits. Thus, a low resolution of granularity of the interval size may allow for a computationally efficient encoding or decoding process. Having two operation modes with different resolutions or granularities therefore allows to adapt the encoding or decoding to a current bitstream requirement or decoder or encoder capabilities, while allowing for a good trade-off between a high compression rate and computational effort.

An embodiment according to the seventh aspect provides an arithmetic encoder for encoding a plurality of symbols having symbol values (e.g. binary values) (e.g. in order to provide a bitstream comprising an arithmetically encoded representation of the symbols, and a side information), wherein the arithmetic encoder is configured to determine (e.g. derive) an interval size information (e.g. a probability value $p_{t+1}$ or a probability value $P_{t+1}$ or $P_{LPS}$ or a shift operation count value $g_{LPS}$) for an arithmetic encoding of one or more symbol values to be encoded ($x_{t+1}$); wherein the arithmetic encoder is configured to derive an interval size (e.g. size of an interval associated with a given symbol value; e.g. $R_{LPS}$) on the basis of the interval size information; wherein the arithmetical encoder is configured to be switchable between a first mode (high throughput mode) and a second mode (normal mode), wherein the arithmetic encoder is configured to determine the interval size (e.g. $R_{LPS}$) associated with a symbol value out of a plurality of possible symbol values with a first granularity or a first resolution (e.g. a granularity of 8) when operating in the first mode, and to determine the interval size (e.g. $R_{LPS}$) associated with a symbol value out of a plurality of possible symbol values with a second granularity or resolution (e.g. a granularity of 1) when operating in the second mode, wherein the first granularity or the first resolution is coarser than the second granularity or the second resolution.

It is noted, that the first operation mode described with respect to aspect seven may, for example, be a high throughput operation mode and may correspond to the second operation mode described with respect to the other aspects. Further, the second operation mode described with respect to aspect seven may, for example, be a normal mode or a high efficiency mode and may correspond to the first operation mode described with respect to the other aspects.

According to an embodiment, the arithmetic encoder is configured to use a representation of the interval size (e.g. $R_{LPS}$) comprising a first number of bits when operating in the first mode, and wherein the arithmetic encoder is configured to use a representation of the interval size (e.g. $R_{LPS}$) comprising a second number of bits when operating in the second mode, wherein the second number of bits (e.g. 9 bits) is larger than the first number of bits (e.g. 6 bits); or wherein the arithmetic encoder is configured to leave a plurality of bits (e.g. the least significant 3 bits) of the representation of the interval size (e.g. $R_{LPS}$) at a predetermined bit value (e.g. 0) when operating in the first mode (such that the bits which are left at the predetermined value do not carry meaningful information), and to use all bits of the representation of the interval size (e.g. $R_{LPS}$) as information-carrying bits when operating in the first mode. For example, the number of signal bits or used bits may be adapted to the resolution or the granularity with which the interval size is determined. Thus, using the first number of bits in the first mode and the second number of bits in the second mode allows for an efficient implementation, or a fast coding process, for example, without loss of accuracy.

According to an embodiment, the arithmetic encoder is configured to use a representation of the overall coding interval size (R) comprising a third number of bits when operating in the first mode, and wherein the arithmetic encoder is configured to use a representation of the overall coding interval size (R) comprising a fourth number of bits when operating in the second mode, wherein the fourth number of bits (e.g. 9 bits) is larger than the third number of bits (e.g. 5 bits); or wherein the arithmetic encoder is configured to leave a plurality of bits (e.g. the least significant 3 bits) of the representation of the overall coding interval size (e.g. R) at a predetermined bit value (e.g. 0) when operating in the first mode (such that the bits which are left at the predetermined value do not carry meaningful information), and to use all bits of the representation of the overall coding interval size (e.g. R) as information carrying bits when operating in the first mode. Adapting the number of bits used for the representation of the overall coding interval size value in accordance with the current operation mode allows for an efficient implementation, for example, without a loss in accuracy, as also explained with respect to aspect five. Combining the adaption of the number of bits for the representation of the interval size with the adaption of the number of bits for the overall coding interval size value is particularly beneficial, as, for example, the determination of the interval size based on the overall coding interval size value may be implemented particularly easy and the determination of the interval size may, for example, have to handle only as many bits as may be used for the accuracy with which the interval size is determined.

According to an embodiment, the arithmetic encoder is configured to determine the interval size such that the interval size is dependent on the overall coding interval size (R) when operating in the second mode (normal mode).

According to an embodiment, the arithmetic encoder is configured to determine the interval size such that the interval size is independent from the overall coding interval size (R) at least over a range of values of the interval size information when operating in the first mode (high throughput mode).

According to an embodiment, the arithmetic encoder is configured to perform a Multiplication-based overall coding interval subdivision when operating in the second mode (normal mode).

According to an embodiment, the arithmetic encoder is configured to multiply an overall coding interval size value, or a bit-shifted version thereof, (e.g. R) with an interval size information value, or a bit-shifted version thereof, (e.g. $p_{LPS}$ or $P_{LPS}$) (which has a resolution of two or more bits having different bit weight and/or which can take values that are different from a potency of 2), in order to obtain (directly or indirectly, e.g. using an additional addition) an interval size (e.g. $R_{LPS}$) associated with a symbol value out of a plurality of possible symbol values, when operating in the second mode (normal mode).

According to an embodiment, the arithmetic encoder is configured to perform a bitshift-based overall coding interval subdivision when operating in the second mode (normal mode). A bit-shift based subdivision may be performed fast and with little computational effort. For example, when choosing a high number for representing the interval size, a high accuracy for the interval size and consequently a high compression rate may be achieved. Therefore, in combination with adapting the number of bits for representing the interval size in dependence on the operation mode, a first operation mode with a high throughput and a second operation mode with a high compression rate may be implemented with a high computational efficiency by determining the interval size in the second mode, and optionally also in the first mode, by a bit shift operation.

According to an embodiment, the arithmetic encoder is configured to obtain an interval size (e.g. $R_{LPS}$) associated with a symbol value out of a plurality of possible symbol values by applying a bit shift operation (e.g. a shift-to-the-right operation) to the overall coding interval size value (e.g. R), wherein number of bits by which the overall coding interval size value is shifted, is determined by the interval size information (e.g. $g_{LPS}$), when operating in the second mode (normal mode).

According to an embodiment, the arithmetic encoder is configured to initialize the overall coding interval size (R) to be a multiple of a predetermined power of 2 when operating in the first mode (high throughput mode). By initializing the overall coding interval size value as a predetermined multiple of two, and, for example, determining the interval size based on the overall coding interval size value by using a bit shift operation, may result in interval sizes which are multiples of a predetermined power of 2. Thus, the interval size may be represented by a low number of bits, for example, without loss of accuracy.

According to an embodiment, the arithmetic encoder is configured to provide the interval size such that the interval size (e.g. $R_{LPS}$) (and advantageously also a complimentary symbol interval size (associated with a symbol value which is different from the given symbol value, e.g. associated with a most probable symbol value), e.g. $R_{MPS}=R-R_{LPS}$, which is obtained by subtracting the interval size (associated with a given symbol value, e.g. with the least probable symbol value), e.g. $R_{LPS}$, from the overall coding interval size) is a multiple of the predetermined power of two (e.g. 8) when operating in the high throughput mode. Thus, the interval size may be represented with a low number of bits, or a low number of bits carrying information, allowing for an efficient signaling and a fast processing.

According to an embodiment, the arithmetic encoder is configured to provide the interval size using a table lookup, wherein entries of a lookup table are multiples of the predetermined power of two (e.g. 8) (and optionally using a bypass mode in which the current overall coding interval size value (e.g. R) is taken over as the interval size (e.g. $R_{LPS}$) and in which an interval size renormalization is skipped for one or more values of the interval size information). As the entries are multiples of the predetermined power of two, the interval size may be signaled using a low number of bits, or a low number of bits carrying information.

According to an embodiment, the arithmetic encoder is configured to provide the interval size using an application of a bit shift operation to a predetermined value (e.g. R'), which is chosen such that bit-shifted versions of the predetermined value are multiples of the predetermined power of 2 (e.g. 8) (e.g. R'=384decimal=110000000binary).

An embodiment of the sixth aspect provides an arithmetic decoder for decoding a plurality of symbols having symbol values (e.g. binary values), wherein the arithmetic decoder is configured to determine (e.g. derive) an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$); wherein the arithmetic decoder is configured to derive an interval size (e.g. size of an interval associated with a given symbol value; e.g. $R_{LPS}$) on the basis of the interval size information; wherein the arithmetic decoder is configured to derive a count value ($g_{LPS}$; also designated as a shift count value or as a shift parameter) on the basis of an integer value representation (e.g. $P_{LPS}$) of the probability value (e.g. comprising (or using) a number BITS of bits) using a determination of a bit position of a most significant non-zero bit of an operand value (x, $P_{LPS}+(P_{LPS}>>2)$)) which is increased or decreased with respect to the integer value representation of the probability value (for example, by a scaling operation, and/or by an addition or subtraction of a value which is dependent on the integer value representation of the probability value, and/or by an addition or subtraction of a predetermined, e.g. constant, value); and wherein the arithmetic decoder is configured to obtain an interval size (e.g. $R_{LPS}$) associated with a symbol value out of a plurality of possible symbol values using the count value.

According to an embodiment, the arithmetic decoder is configured to apply a bit shift operation (e.g. a shift-to-the-right operation) to a predetermined value (e.g. R'; e.g. 384) (which, for example, lies within a range of allowable overall coding interval size values, and which may lie at a middle of a range (or interval) of allowable overall coding interval size values within a tolerance of +/−10 percent with respect to a width of the range (or interval)), in order to obtain the interval size (e.g. $R_{LPS}$), wherein a number of bits by which the predetermined value is shifted, is determined by the count value (e.g. $g_{LPS}$).

According to an embodiment, the arithmetic decoder is configured to map the count value (e.g. $g_{LPS}$) onto the interval size (e.g. onto $R_{LPS}$) (e.g. using a mapping table) (at least over a subrange of a possible range of values of the count value).

According to an embodiment, the arithmetic decoder is configured to determine the interval size independent from a current overall coding interval size (e.g. R) (e.g. using an application of a bit shift operation to a predetermined value (e.g. R'), or using a mapping table) if the count value lies in a first range of values (e.g. if the count value is larger than 1, or if the count value is larger than a (predetermined) threshold value) and wherein the arithmetic decoder is configured to determine the interval size in dependence on the current overall coding interval size value (e.g. R) if the count value lies in a second range of values which is different from the first range of values (e.g. if the count value is smaller than or equal to 1, or if the count value is smaller than or equal to a (predetermined) threshold value, or if the count value takes a predetermined value (e.g. 1)).

According to an embodiment, the arithmetic decoder is configured to take over the current overall coding interval size value (e.g. R) as the interval size (e.g. $R_{LPS}$) (and to skip an interval size renormalization) if the count value lies in the second range of values (i.e. to use a bypass mode) (wherein, for example, the overall coding interval size is limited to a range between $2^N$ and $2^{N+1}-1$).

According to an embodiment, the arithmetic decoder is configured to apply a shift operation (e.g. a shift-to-the-right operation) to the current overall coding interval size value (e.g. R), in order to obtain the interval size (e.g. $R_{LPS}$), if the count value lies in the second range of values (wherein a number of bits by which the current overall coding interval size value is shifted, is determined by the count value (e.g. $g_{LPS}$), or is predetermined).

According to an embodiment, the arithmetic decoder is configured to apply a shift operation (e.g. a shift-to-the-right operation) to the current overall coding interval size value (e.g. R), in order to obtain the interval size (e.g. $R_{LPS}$), if the count value lies in a first range of values (e.g. for count values larger than 1) (wherein a number of bits by which the current overall coding interval size value is shifted, is determined by the count value (e.g. $g_{LPS}$), or is predetermined), and wherein the arithmetic decoder is configured to take over the current overall coding interval size value (e.g. R) as the interval size (e.g. $R_{LPS}$) (and to skip an interval size renormalization) if the count value lies in a second range of values (e.g. for a count value of 1) (i.e. to use a bypass mode) (wherein, for example, the overall coding interval size is limited to a range between $2^N$ and $2^{N+1}-1$).

An embodiment according to the seventh aspect provides an arithmetic decoder for decoding a plurality of symbols having symbol values (e.g. binary values), wherein the arithmetic decoder is configured to determine (e.g. derive) an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$); wherein the arithmetic decoder is configured to derive an interval size (e.g. size of an interval associated with a given symbol value; e.g. $R_{LPS}$) on the basis of the interval size information; wherein the arithmetical decoder is configured to be switchable between a first mode (high throughput mode) and a second mode (normal mode), wherein the arithmetic decoder is configured to determine the interval size (e.g. $R_{LPS}$) associated with a symbol value out of a plurality of possible symbol values with a first granularity or a first resolution (e.g. a granularity of 8) when operating in the first mode, and to determine the interval size (e.g. $R_{LPS}$) associated with a symbol value out of a plurality of possible symbol values with a second granularity or resolution (e.g. a granularity of 1) when operating in the second mode, wherein the first granularity or the first resolution is coarser than the second granularity or the second resolution.

According to an embodiment, the arithmetic decoder is configured to use a representation of the interval size (e.g. $R_{LPS}$) comprising a first number of bits when operating in the first mode, and wherein the arithmetic decoder is configured to use a representation of the interval size (e.g. $R_{LPS}$) comprising a second number of bits when operating in the second mode, wherein the second number of bits (e.g. 9 bits) is larger than the first number of bits (e.g. 6 bits); or wherein the arithmetic decoder is configured to leave a plurality of bits (e.g. the least significant 3 bits) of the representation of the interval size (e.g. $R_{LPS}$) at a predetermined bit value (e.g. 0) when operating in the first mode (such that the bits which are left at the predetermined value do not carry meaningful information), and to use all bits of the representation of the interval size (e.g. $R_{LPS}$) as information-carrying bits when operating in the first mode.

According to an embodiment, the arithmetic decoder is configured to use a representation of the overall coding interval size (R) comprising a third number of bits when operating in the first mode, and wherein the arithmetic decoder is configured to use a representation of the overall coding interval size (R) comprising a fourth number of bits when operating in the second mode, wherein the fourth number of bits (e.g. 9 bits) is larger than the third number of bits (e.g. 5 bits); or wherein the arithmetic decoder is configured to leave a plurality of bits (e.g. the least significant 3 bits) of the representation of the overall coding interval size (e.g. R) at a predetermined bit value (e.g. 0) when operating in the first mode (such that the bits which are left at the predetermined value do not carry meaningful information), and to use all bits of the representation of the overall coding interval size (e.g. R) as information carrying bits when operating in the first mode.

According to an embodiment, the arithmetic decoder is configured to determine the interval size such that the interval size is dependent on the overall coding interval size (R) when operating in the second mode (normal mode).

According to an embodiment, the arithmetic decoder is configured to determine the interval size such that the interval size is independent from the overall coding interval size (R) at least over a range of values of the interval size information when operating in the first mode (high throughput mode).

According to an embodiment, the arithmetic decoder is configured to perform a Multiplication-based overall coding interval subdivision when operating in the second mode (normal mode).

According to an embodiment, the arithmetic decoder is configured to multiply an overall coding interval size value, or a bit-shifted version thereof, (e.g. R) with an interval size information value, or a bit-shifted version thereof, (e.g. $p_{LPS}$ or $P_{LPS}$) (which has a resolution of two or more bits having different bit weight and/or which can take values that are different from a potency of 2), in order to obtain (directly or indirectly, e.g. using an additional addition) an interval size (e.g. $R_{LPS}$) associated with a symbol value out of a plurality of possible symbol values, when operating in the second mode (normal mode).

According to an embodiment, the arithmetic decoder is configured to perform a bitshift-based overall coding interval subdivision when operating in the second mode (normal mode).

According to an embodiment, the arithmetic decoder is configured to obtain an interval size (e.g. $R_{LPS}$) associated with a symbol value out of a plurality of possible symbol values by applying a bit shift operation (e.g. a shift-to-the-right operation) to the overall coding interval size value (e.g. R), wherein number of bits by which the overall coding interval size value is shifted, is determined by the interval size information (e.g. $g_{LPS}$), when operating in the second mode (e.g. normal mode).

According to an embodiment, the arithmetic decoder is configured to initialize the overall coding interval size (R) to be a multiple of a predetermined power of 2 when operating in the first mode (high throughput mode).

According to an embodiment, the arithmetic decoder is configured to Provide the interval size such that the interval size (e.g. $R_{LPS}$) (and advantageously also a complimentary symbol interval size (associated with a symbol value which is different from the given symbol value, e.g. associated with a most probable symbol value), e.g. $R_{MPS}=R-R_{LPS}$, which is obtained by subtracting the interval size (associated with a given symbol value, e.g. with the least probable symbol value), e.g. $R_{LPS}$, from the overall coding interval size) is a multiple of the predetermined power of two (e.g. 8) when operating in the high throughput mode.

According to an embodiment, the arithmetic decoder is configured to provide the interval size using a table lookup, wherein entries of a lookup table are multiples of the predetermined power of two (e.g. 8) (and optionally using a bypass mode in which the current overall coding interval size value (e.g. R) is taken over as the interval size (e.g. $R_{LPS}$) and in which an interval size renormalization is skipped for one or more values of the interval size information).

According to an embodiment, the arithmetic decoder is configured to provide the interval size using an application of a bit shift operation to a predetermined value (e.g. R'), which is chosen such that bit-shifted versions of the predetermined value are multiples of the predetermined power of 2 (e.g. 8) (e.g. R'=384decimal=110000000binary).

An embodiment according to the sixth aspect provides a method for encoding a plurality of symbols having symbol values (e.g. binary values) (e.g. in order to provide a bitstream comprising an arithmetically encoded representation of the symbols, and a side information), wherein the method comprises determining (e.g. derive) an interval size information (e.g. a probability value $p_{t+1}$ or a probability value $P_{t+1}$ or $P_{LPS}$ or a shift operation count value $g_{LPS}$) for an arithmetic encoding of one or more symbol values to be encoded ($x_{t+1}$); wherein the method comprises deriving an interval size (e.g. size of an interval associated with a given symbol value; e.g. $R_{LPS}$) on the basis of the interval size information; wherein the method comprises deriving a count value ($g_{LPS}$; also designated as a shift count value or as a shift parameter) on the basis of an integer value representation (e.g. $P_{LPS}$) of the probability value (e.g. comprising (or using) a number BITS of bits) using a determination of a bit position of a most significant non-zero bit of an operand value (x, $P_{LPS}+(P_{LPS}>>2)$) which is increased or decreased with respect to the integer value representation of the probability value (for example, by a scaling operation, and/or by an addition or subtraction of a value which is dependent on the integer value representation of the probability value, and/or by an addition or subtraction of a predetermined, e.g. constant, value); and wherein the method comprises obtaining an interval size (e.g. $R_{LPS}$) associated with a symbol value out of a plurality of possible symbol values using the count value.

An embodiment according to the seventh aspect provides a method for encoding a plurality of symbols having symbol values (e.g. binary values) (e.g. in order to provide a bitstream comprising an arithmetically encoded representation of the symbols, and a side information), wherein the method comprises determining (e.g. derive) an interval size information (e.g. a probability value $p_{t+1}$ or a probability value $P_{t+1}$ or $P_{LPS}$ or a shift operation count value $g_{LPS}$) for an arithmetic encoding of one or more symbol values to be encoded ($x_{t+1}$); wherein the method comprises deriving an interval size (e.g. size of an interval associated with a given symbol value; e.g. $R_{LPS}$) on the basis of the interval size information; wherein the method comprises switching between a first mode (high throughput mode) and a second mode (normal mode), wherein the method comprises determining the interval size (e.g. $R_{LPS}$) associated with a symbol value out of a plurality of possible symbol values with a first granularity or a first resolution (e.g. a granularity of 8) when operating in the first mode, and determining the interval size (e.g. $R_{LPS}$) associated with a symbol value out of a plurality of possible symbol values with a second granularity or resolution (e.g. a granularity of 1) when operating in the second mode, wherein the first granularity or the first resolution is coarser than the second granularity or the second resolution.

An embodiment according to the sixth aspect provides a method for decoding a plurality of symbols having symbol values (e.g. binary values), wherein the method comprises determining (e.g. derive) an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$); wherein the method comprises deriving an interval size (e.g. size of an interval associated with a given symbol value; e.g. $R_{LPS}$) on the basis of the interval size information; wherein the method comprises deriving a count value ($g_{LPS}$; also designated as a shift count value or as a shift parameter) on the basis of an integer value representation (e.g. $P_{LPS}$) of the probability value (e.g. comprising (or using) a number BITS of bits) using a determination of a bit position of a most significant non-zero bit of an operand value (x, $P_{LPS}+(P_{LPS}>>2)$) which is increased or decreased with respect to the integer value representation of the probability value (for example, by a scaling operation, and/or by an addition or subtraction of a value which is dependent on the integer value representation of the probability value, and/or by an addition or subtraction of a predetermined, e.g. constant, value); and wherein the arithmetic method comprises obtaining an interval size (e.g. $R_{LPS}$) associated with a symbol value out of a plurality of possible symbol values using the count value.

An embodiment according to the seventh aspect provides a method for decoding a plurality of symbols having symbol values (e.g. binary values), wherein the method comprises determining (e.g. derive) an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$); wherein the method comprises deriving an interval size (e.g. size of an interval associated with a given symbol value; e.g. $R_{LPS}$) on the basis of the interval size information; wherein the method comprises switching between a first mode (high throughput mode) and a second mode (normal mode), wherein the method comprises determining the interval size (e.g. $R_{LPS}$) associated with a symbol value out of a plurality of possible symbol values with a first granularity or a first resolution (e.g. a granularity of 8) when operating in the first mode, and determining the interval size (e.g. $R_{LPS}$) associated with a symbol value out of a plurality of possible symbol values with a second granularity or resolution (e.g. a granularity of 1) when operating in the second mode, wherein the first granularity or the first resolution is coarser than the second granularity or the second resolution.

According to an eighth aspect of the invention, an interval size information, which is used for deriving an interval size for an arithmetic encoding or decoding of a symbol value, is determined based on a low complexity context model selected for the encoding or decoding of the symbol value. The eighth aspect relies on the idea to initialize one or more parameters of a plurality of low complex context models such that one or more parameter values of two or more low complexity context models, which are associated with a same syntax element to be encoded or decoded but different environments of one or more previously encoded or decoded symbols or different encoder or decoder states, are identical.

As the parameter values of the two or more low complexity context models are identical, and a variation of the corresponding parameter may be omitted, so that computational effort is saved. In other words, the determination of the interval size value based on the low complexity context model may be independent from said parameter of the two or more low complexity context models, providing for an easy determination of the interval size information. Therefore, a high throughput of the encoding or decoding may be achieved.

An embodiment according to the eighth aspect provides an arithmetic encoder for encoding a plurality of symbols having symbol values (e.g. binary values) (e.g. in order to provide a bitstream comprising an arithmetically encoded representation of the symbols, and a side information), wherein the arithmetic encoder is configured to determine (e.g. derive) an interval size information (e.g. a probability value $p_{t+1}$ or a probability value $P_{t+1}$ or $P_{LPS}$ or a shift operation count value $g_{LPS}$) for an arithmetic encoding of one or more symbol values to be encoded ($x_{t+1}$); wherein the arithmetic encoder is configured to derive an interval size (e.g. size of an interval associated with a given symbol value; e.g. $R_{LPS}$) on the basis of the interval size information (e.g. a probability value $p_{t+1}$ or a probability value $P_{t+1}$ or $P_{LPS}$ or a shift operation count value $g_{LPS}$); wherein the arithmetic encoder is configured to select a low complexity context model (e.g. a high throughput context model; e.g. a context model according to which one or more state variable values which have already been used for an encoding of one or more symbol values and/or an interval size information which has already been used for an encoding of one or more symbol values is/are reused for an encoding of one or more subsequent symbol values; e.g. a context model according to which no update of source statistic values is performed) out of a plurality of low complexity context models in dependence on one or more previously encoded symbols or in dependence on an encoder state, in order to determine the interval size information (e.g. a shift operation count value $g_{LPS}$); wherein the arithmetic encoder is configured to initialize the one or more parameters (e.g. $g_{LPS}$ and $val_{MPS}$) of a plurality of low complexity context models (e.g. using context initialization values $g_{LPS}$ and $val_{MPS}$) (e.g. using respective (second) sets of initialization parameters associated with the low complexity context models, comprising values $g_{LPS}$ and $val_{MPS}$), such that one or more (initial) parameter values of two or more low complexity context models (which may be left unchanged when encoding symbols), which are associated with a same syntax element to be encoded (e.g. a flag having a certain meaning, a transform coefficient, or the like; e.g. a certain type of syntax element out of a set of different syntax elements used to encode a video information) and different environments (or sets) of one or more previously encoded symbols or different encoder states, are identical.

According to an embodiment, the arithmetic encoder is configured to switch between a high efficiency mode, in which a plurality of high complexity context models are used (according to which one or more respective state variable values, e.g $a_t$ and $b_t$, and/or the interval size information is updated), and a high throughput mode, in which the low complexity context models are used (which, for example, do not comprise an update of one or more respective state variable values, e.g. $g_{LPS}$ and $val_{MPS}$). Being able to switch between the high efficiency mode and the high throughput mode allows to adjust the trade-off between a high compression rate and a high throughput to the current requirements for the bit stream and/or encoder or decoder capabilities.

According to an embodiment, the arithmetic encoder is configured to select a high complexity context model out of a plurality of high complexity context models in dependence on one or more previously encoded symbols or in dependence on an encoder state when operating in the high efficiency mode (wherein an update of one or more respective state variable values, e.g $a_t$ and $b_t$, and/or of the interval size information is enabled when operating in the high efficiency mode, while the update of one or more respective state variable values, e.g. $g_{LPS}$ and $val_{MPS}$, is disabled when operating in the high throughput mode), in order to determine the interval size information. Considering the encoder state and/or the one or more previously encoded or decoded symbols allows for a precise prediction or determination of the interval size value, so that a high compression rate may be achieved.

According to an embodiment, the arithmetic encoder is configured to initialize the one or more parameters (e.g. $a_t$ and $b_t$, or slopeIdx and offsetIdx, from which $a_t$ and $b_t$ are derived) of a plurality of high complexity context models (e.g. of a plurality of high complexity context models associated with different environments or sets of previously encoded symbols) (e.g. using respective (first) sets of initialization parameters associated with the different high complexity context models, comprising, for example, parameters slope Idx and offsetIdx), such that (e.g. initial) parameter values or sets of parameter values of two or more high complexity context models (which may be left unchanged when encoding symbols), which are associated with a same syntax element to be encoded (e.g. a flag having a certain meaning, a transform coefficient, or the like; e.g. a certain type of syntax element out of a set of different syntax elements used to encode a video information) and different environments (or sets) of one or more previously encoded symbols or different encoder states, are different. Thus, for example, respective parameter values of high complexity context models depend on the environment of one or more previously encoded or decoded symbols or the encoder or decoder state. By considering the environment and/or the encoder or decoder state, the interval size information may be determined very accurately, so that a high compression ratio may be achieved.

According to an embodiment, the arithmetic encoder is configured to determine whether parameter values of two or more low complexity context models (which may be left unchanged when encoding symbols), which are associated with a same syntax element to be encoded (e.g. a flag having a certain meaning, a transform coefficient, or the like; e.g. a certain type of syntax element out of a set of different syntax elements used to encode a video information) and different environments (or sets) of one or more previously encoded symbols or different encoder states, are identical, and wherein the arithmetic encoder is configured to selectively disable a distinction between different environments (or sets) of one or more previously encoded symbols or different encoder states in response to a finding that parameter values of two or more low complexity context models which are associated with a same syntax element to be encoded (e.g. a flag having a certain meaning, a transform coefficient, or the like; e.g. a certain type of syntax element out of a set of different syntax elements used to encode a video information; e.g. a certain "binary decision") and different environments (or sets) of one or more previously encoded symbols (or binary decisions) or different encoder states, are identical. By disabling the distinction between different environments or encoder or decoder states, computations steps may save, decreasing the processing time for determining the interval size information.

According to an embodiment, the arithmetic encoder is configured to distinguish between independently encoded image portions (e.g. video frames or video slices or I-slices or I-frames or intra-coded slices or intra-coded frames), one-direction-predicted image portions (e.g video frames or video slices or P-slices P-frames or predictive coded slices or predictive coded frames) and two-direction-predicted image portions (e.g. video frames or video slices or B-slices or B frames or bidirectional coded slices or bidirectional coded frames) when operating in the high efficiency mode (and to use different context models when encoding one or more symbols associated with the independently encoded image portions, when encoding one or more symbols associated with the one-direction-predicted image portions and when encoding one or more symbols associated with the two-direction-predicted image portions). For example, the probability for a symbol value depends on the type of the image portion (independent, one direction predicted, two direction predicted), so that distinguishing between the types of image portions in determining the interval size information may increase the accuracy for the interval size information.

According to an embodiment, the arithmetic encoder is configured to use identical interval size information independent from a type of image portion (e.g. independently encoded image portion, one.direction-predicted image portion or two-direction.predicted image portion) when operating in the low complexity mode. Determining the interval size information independent from the type of image portion, provides for a low processing time in the high throughput.

According to an embodiment, the arithmetic encoder is configured to initialize the one or more parameters (e.g. $a_t$ and $b_t$, or slopeIdx and offsetIdx, from which $a_t$ and $b_t$ are derived) of a plurality of high complexity context models (e.g. of a plurality of high complexity context models associated with a given environment or set of previously encoded symbols) (e.g. using respective (first) sets of initialization parameters associated with the different high complexity context models, comprising, for example, parameters slope Idx and offsetIdx), such that (initial) parameter values or sets of parameter values of two or more high complexity context models (which may be updated when encoding symbols), which are associated with a same syntax element to be encoded (e.g. a flag having a certain meaning, a transform coefficient, or the like; e.g. a certain type of syntax element out of a set of different syntax elements used to encode a video information) and different types of image portions (e.g. independently encoded image portion, one.direction-predicted image portion or two-direction.predicted image portion), are different (e.g. dependent from the type of image portion).

According to an embodiment, the arithmetic encoder is configured to initialize the one or more parameters (e.g. $g_{LPS}$ and $val_{MPS}$) of a plurality of high throughput context models (e.g. of a plurality of high throughput context models associated with a given environment or set of previously encoded symbols) (e.g. using respective (second) sets of initialization parameters associated with the different high throughput context models, comprising, for example, parameters $g_{LPS}$ and $val_{MPS}$), such that (initial) parameter values or sets of parameter values of two or more high throughput context models (which may be left unchanged when encoding symbols), which are associated with a same syntax element to be encoded (e.g. a flag having a certain meaning, a transform coefficient, or the like; e.g. a certain type of syntax element out of a set of different syntax elements used to encode a video information) and different types of image portions (e.g. independently encoded image portion, one-direction-predicted image portion or two-direction.predicted image portion), are identical (e.g. independent from the type of image portion).

According to an embodiment, the arithmetic encoder is configured to initialize the one or more parameters (e.g. $a_t$ and $b_t$, or slopeIdx and offsetIdx, from which $a_t$ and $b_t$ are derived) of a plurality of high complexity context models (e.g. of a plurality of high complexity context models associated with a given environment or set of previously encoded symbols) (e.g. using respective (first) sets of initialization parameters associated with the different high complexity context models, comprising, for example, parameters slope Idx and offsetIdx), in dependence on an encoding quality parameter (e.g. a picture quality parameter) (such that (initial) parameter values or sets of parameter values of two or more high complexity context models (which may be updated when encoding symbols), which are associated with a same syntax element to be encoded (e.g. a flag having a certain meaning, a transform coefficient, or the like; e.g. a certain type of syntax element out of a set of different syntax elements used to encode a video information) and different types values of the quality parameter, are different (e.g. dependent from the quality parameter)). By considering the encoding quality parameter, the one or more parameters may be adapted to a value of the encoding quality parameter, allowing for a precise determination of the interval size information based on the high quality context models.

According to an embodiment, the arithmetic encoder is configured to initialize the one or more parameters (e.g. $g_{LPS}$ and $val_{MPS}$) of a plurality of high throughput context models (e.g. of a plurality of high throughput context models (which, e.g., may correspond to the low complexity context models) associated with a given environment or set of previously encoded symbols) (e.g. using respective (second) sets of initialization parameters associated with the different high throughput context models, comprising, for example, parameters $g_{LPS}$ and $val_{MPS}$), independent from the encoding quality parameter (e.g. $q_p$) (such that (initial) parameter values or sets of parameter values of two or more high throughput context models (which may be left unchanged when encoding symbols), which are associated with a same syntax element to be encoded (e.g. a flag having a certain meaning, a transform coefficient, or the like; e.g. a certain type of syntax element out of a set of different syntax elements used to encode a video information) and different quality parameters, are identical (e.g. independent from the quality parameter)). Initializing the one or more parameters independent of the encoding quality parameter, allows for a fast initialization.

According to an embodiment, the arithmetic encoder is configured to select a context model out of a plurality of candidate context models (e.g. both high efficiency candidate context models and high throughput candidate context models) for the determination of the interval size information (e.g. for the encoding of a symbol to be encoded), wherein the arithmetic encoder is configured to initialize each of the high efficiency candidate context models (which, for example, correspond to the high complexity context models) using an individual set of context model initialization parameters (e.g. individual slopeIdx and an individual offsetIdx, to therefrom derive individual $a_t$ and $b_t$), and wherein the arithmetic encoder is configured to initialize two or more of the high throughput candidate context models using a common (same) set of context model initialization parameters (e.g. common $g_{LPS}$ and $val_{MPS}$). Initializing the two or more of the high throughput candidate context models using a common set of context model initialization parameters, allows for fast initialization, and at the same time, allows for an easy implementation, which, for example, is compatible with an implementation of the high efficiency candidate context models. Further, initializing the two or more of the high throughput candidate context models using a common set of context model initialization parameters, allows to omit an evaluation of the context model for the determination of the interval size information.

An embodiment according to the eight aspect provides an arithmetic decoder for decoding a plurality of symbols having symbol values (e.g. binary values) (e.g. on the basis of a bitstream comprising an arithmetically encoded representation of the symbols, and a side information), wherein the arithmetic decoder is configured to determine (e.g. derive) an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$); wherein the arithmetic decoder is configured to derive an interval size (e.g. size of an interval associated with a given symbol value; e.g. $R_{LPS}$) on the basis of the interval size information (e.g. a probability value $p_{t+1}$ or a probability value $P_{t+1}$ or $P_{LPS}$ or a shift operation count value $g_{LPS}$); wherein the arithmetic decoder is configured to select a low complexity context model (e.g. a high throughput context model; e.g. a context model according to which one or more state variable values which have already been used for an decoding of one or more symbol values and/or an interval size information which has already been used for an decoding of one or more symbol values is/are reused for an decoding of one or more subsequent symbol values; e.g. a context model according to which no update of source statistic values is performed) out of a plurality of low complexity context models in dependence on one or more previously decoded symbols or in dependence on an decoder state, in order to determine the interval size information (e.g. a shift operation count value $g_{LPS}$); wherein the arithmetic decoder is configured to initialize the one or more parameters (e.g. $g_{LPS}$ and $val_{MPS}$) of a plurality of low complexity context models (e.g. using context initialization values $g_{LPS}$ and $val_{MPS}$) (e.g. using respective (second) sets of initialization parameters associated with the low complexity context models, comprising values $g_{LPS}$ and $val_{MPS}$), such that one or more (initial) parameter values of two or more low complexity context models (which may be left unchanged when decoding symbols), which are associated with a same syntax element to be decoded (e.g. a flag having a certain meaning, a transform coefficient, or the like; e.g. a certain type of syntax element out of a set of different syntax elements used to decode a video information) and different environments (or sets) of one or more previously decoded symbols or different decoder states, are identical.

According to an embodiment, the arithmetic decoder is configured to switch between a high efficiency mode, in which a plurality of high complexity context models are used (according to which one or more respective state variable values, e.g $a_t$ and $b_t$, and/or the interval size information is updated), and a high throughput mode, in which the low complexity context models are used (which, for example, do not comprise an update of one or more respective state variable values, e.g. $g_{LPS}$ and $val_{MPS}$).

According to an embodiment, the arithmetic decoder is configured to select a high complexity context model out of a plurality of high complexity context models in dependence on one or more previously decoded symbols or in dependence on an decoder state when operating in the high efficiency mode (wherein an update of one or more respective state variable values, e.g $a_t$ and $b_t$, and/or of the interval size information is enabled when operating in the high efficiency mode, while the update of one or more respective state variable values, e.g. $g_{LPS}$ and $val_{MPS}$, is disabled when operating in the high throughput mode), in order to determine the interval size information.

According to an embodiment, the arithmetic decoder is configured to initialize the one or more parameters (e.g. $a_t$ and $b_t$, or slopeIdx and offsetIdx, from which $a_t$ and $b_t$ are derived) of a plurality of high complexity context models (e.g. of a plurality of high complexity context models associated with different environments or sets of previously decoded symbols) (e.g. using respective (first) sets of initialization parameters associated with the different high complexity context models, comprising, for example, parameters slope Idx and offsetIdx), such that (initial) parameter values or sets of parameter values of two or more high complexity context models (which may be left unchanged when decoding symbols), which are associated with a same syntax element to be decoded (e.g. a flag having a certain meaning, a transform coefficient, or the like; e.g. a certain type of syntax element out of a set of different syntax elements used to decode a video information) and different environments (or sets) of one or more previously decoded symbols or different decoder states, are different.

According to an embodiment, the arithmetic decoder is configured to determine whether parameter values of two or more low complexity context models (which may be left unchanged when decoding symbols), which are associated with a same syntax element to be decoded (e.g. a flag having a certain meaning, a transform coefficient, or the like; e.g. a certain type of syntax element out of a set of different syntax elements used to decode a video information) and different environments (or sets) of one or more previously decoded symbols or different decoder states, are identical, and wherein the arithmetic decoder is configured to selectively disable a distinction between different environments (or sets) of one or more previously decoded symbols or different decoder states in response to a finding that parameter values of two or more low complexity context models which are associated with a same syntax element to be decoded (e.g. a flag having a certain meaning, a transform coefficient, or the like; e.g. a certain type of syntax element out of a set of different syntax elements used to decode a video information; e.g. a certain "binary decision") and different environments (or sets) of one or more previously decoded symbols (or binary decisions) or different decoder states, are identical.

According to an embodiment, the arithmetic decoder is configured to distinguish between independently decoded image portions (e.g. video frames or video slices or I-slices or I-frames or intra-coded slices or intra-coded frames), one-direction-predicted image portions (e.g video frames or video slices or P-slices P-frames or predictive coded slices or predictive coded frames) and two-direction-predicted image portions (e.g. video frames or video slices or B-slices or B frames or bidirectional coded slices or bidirectional coded frames) when operating in the high efficiency mode (and to use different context models when decoding one or more symbols associated with the independently decoded image portions, when decoding one or more symbols associated with the one-direction-predicted image portions and when decoding one or more symbols associated with the two-direction-predicted image portions).

According to an embodiment, the arithmetic decoder is configured to use identical interval size information independent from a type of image portion (e.g. independently decoded image portion, one.direction-predicted image portion or two-direction.predicted image portion) when operating in the low complexity mode.

According to an embodiment, the arithmetic decoder is configured to initialize the one or more parameters (e.g. $a_t$ and $b_t$, or slopeIdx and offsetIdx, from which $a_t$ and $b_t$ are derived) of a plurality of high complexity context models (e.g. of a plurality of high complexity context models associated with a given environment or set of previously decoded symbols) (e.g. using respective (first) sets of initialization parameters associated with the different high complexity context models, comprising, for example, parameters slope Idx and offsetIdx), such that (initial) parameter values or sets of parameter values of two or more high complexity context models (which may be updated when decoding symbols), which are associated with a same syntax element to be encoded (e.g. a flag having a certain meaning, a transform coefficient, or the like; e.g. a certain type of syntax element out of a set of different syntax elements used to decode a video information) and different types of image portions (e.g. independently decoded image portion, one.direction-predicted image portion or two-direction.predicted image portion), are different (e.g. dependent from the type of image portion).

According to an embodiment, the arithmetic decoder is configured to initialize the one or more parameters (e.g. $g_{LPS}$ and $val_{MPS}$) of a plurality of high throughput context models (e.g. of a plurality of high throughput context models associated with a given environment or set of previously decoded symbols) (e.g. using respective (second) sets of initialization parameters associated with the different high throughput context models, comprising, for example, parameters $g_{LPS}$ and $val_{MPS}$), such that (initial) parameter values or sets of parameter values of two or more high throughput context models (which may be left unchanged when decoding symbols), which are associated with a same syntax element to be decoded (e.g. a flag having a certain meaning, a transform coefficient, or the like; e.g. a certain type of syntax element out of a set of different syntax elements used to decode a video information) and different types of image portions (e.g. independently decoded image portion, one-direction-predicted image portion or two-direction.predicted image portion), are identical (e.g. independent from the type of image portion).

According to an embodiment, the arithmetic decoder is configured to initialize the one or more parameters (e.g. $a_t$ and $b_t$, or slopeIdx and offsetIdx, from which $a_t$ and $b_t$ are derived) of a plurality of high complexity context models (e.g. of a plurality of high complexity context models associated with a given environment or set of previously decoded symbols) (e.g. using respective (first) sets of initialization parameters associated with the different high complexity context models, comprising, for example, parameters slope Idx and offsetIdx), in dependence on an decoding quality parameter (e.g. a picture quality parameter) (such that (initial) parameter values or sets of parameter values of two or more high complexity context models (which may be updated when decoding symbols), which are associated with a same syntax element to be decoded (e.g. a flag having a certain meaning, a transform coefficient, or the like; e.g. a certain type of syntax element out of a set of different syntax elements used to decode a video information) and different types values of the quality parameter, are different (e.g. dependent from the quality parameter)).

According to an embodiment, the arithmetic decoder is configured to initialize the one or more parameters (e.g. $g_{LPS}$ and $val_{MPS}$) of a plurality of high throughput context models (e.g. of a plurality of high throughput context models associated with a given environment or set of previously decoded symbols) (e.g. using respective (second) sets of initialization parameters associated with the different high throughput context models, comprising, for example, parameters $g_{LPS}$ and $val_{MPS}$), independent from the decoding quality parameter (e.g. $q_p$) (such that (initial) parameter values or sets of parameter values of two or more high throughput context models (which may be left unchanged when decoding symbols), which are associated with a same syntax element to be decoded (e.g. a flag having a certain meaning, a transform coefficient, or the like; e.g. a certain type of syntax element out of a set of different syntax elements used to decode a video information) and different quality parameters, are identical (e.g. independent from the quality parameter)).

According to an embodiment, the arithmetic decoder is configured to select a context model out of a plurality of candidate context models (e.g. both high efficiency candidate context models and high throughput candidate context models) for the determination of the interval size information (e.g. for the decoding of a symbol to be decoded), wherein the arithmetic decoder is configured to initialize each of the high efficiency candidate context models using an individual set of context model initialization parameters (e.g. individual slopeIdx and an individual offsetIdx, to therefrom derive individual $a_t$ and $b_t$), and wherein the arithmetic decoder is configured to initialize two or more of the high throughput candidate context models using a common (same) set of context model initialization parameters (e.g. common $g_{LPS}$ and $val_{MPS}$).

An embodiment according to the eight aspect provides a method for encoding a plurality of symbols having symbol values (e.g. binary values) (e.g. in order to provide a bitstream comprising an arithmetically encoded representation of the symbols, and a side information), wherein the method comprises determining (e.g. derive) an interval size information (e.g. a probability value $p_{t+1}$ or a probability value $P_{t+1}$ or $P_{LPS}$ or a shift operation count value $g_{LPS}$) for an arithmetic encoding of one or more symbol values to be encoded ($x_{t+1}$); wherein the method comprises deriving an interval size (e.g. size of an interval associated with a given symbol value; e.g. $R_{LPS}$) on the basis of the interval size information (e.g. a probability value $p_{t+1}$ or a probability value $P_{t+1}$ or $P_{LPS}$ or a shift operation count value $g_{LPS}$); wherein the method comprises selecting a low complexity context model (e.g. a high throughput context model; e.g. a context model according to which one or more state variable values which have already been used for an encoding of one or more symbol values and/or an interval size information which has already been used for an encoding of one or more symbol values is/are reused for an encoding of one or more subsequent symbol values; e.g. a context model according to which no update of source statistic values is performed) out of a plurality of low complexity context models in dependence on one or more previously encoded symbols or in dependence on an encoding state, in order to determine the interval size information (e.g. a shift operation count value $g_{LPS}$); wherein the method comprises initializing the one or more parameters (e.g. $g_{LPS}$ and $val_{MPS}$) of a plurality of low complexity context models (e.g. using context initialization values $g_{LPS}$ and $val_{MPS}$) (e.g. using respective (second) sets of initialization parameters associated with the low complexity context models, comprising values $g_{LPS}$ and $val_{MPS}$), such that one or more (initial) parameter values of two or more low complexity context models (which may be left unchanged when encoding symbols), which are associated with a same syntax element to be encoded (e.g. a flag having a certain meaning, a transform coefficient, or the like; e.g. a certain type of syntax element out of a set of different syntax elements used to encode a video information) and different environments (or sets) of one or more previously encoded symbols or different encoding states, are identical.

An embodiment according to the eighth aspect provides a method for decoding a plurality of symbols having symbol values (e.g. binary values) (e.g. on the basis of a bitstream comprising an arithmetically encoded representation of the symbols, and a side information), wherein the method comprises determining (e.g. derive) an interval size information (e.g. a probability value $p_{t+1}$ or a probability value $P_{t+1}$ or $P_{LPS}$ or a shift operation count value $g_{LPS}$) for an arithmetic decoding of one or more symbol values to be decoded ($x_{t+1}$); wherein the method comprises deriving an interval size (e.g. size of an interval associated with a given symbol value; e.g. $R_{LPS}$) on the basis of the interval size information (e.g. a probability value $p_{t+1}$ or a probability value $P_{t+1}$ or $P_{LPS}$ or a shift operation count value $g_{LPS}$); wherein the method comprises selecting a low complexity context model (e.g. a high throughput context model; e.g. a context model according to which one or more state variable values which have already been used for an decoding of one or more symbol values and/or an interval size information which has already been used for an decoding of one or more symbol values is/are reused for an decoding of one or more subsequent symbol values; e.g. a context model according to which no update of source statistic values is performed) out of a plurality of low complexity context models in dependence on one or more previously decoded symbols or in dependence on an decoding state, in order to determine the interval size information (e.g. a shift operation count value $g_{LPS}$); wherein the method comprises initializing the one or more parameters (e.g. $g_{LPS}$ and $val_{MPS}$) of a plurality of low complexity context models (e.g. using context initialization values $g_{LPS}$ and $val_{MPS}$) (e.g. using respective (second) sets of initialization parameters associated with the low complexity context models, comprising values $g_{LPS}$ and $val_{MPS}$), such that one or more (initial) parameter values of two or more low complexity context models (which may be left unchanged when decoding symbols), which are associated with a same syntax element to be decoded (e.g. a flag having a certain meaning, a transform coefficient, or the like; e.g. a certain type of syntax element out of a set of different syntax elements used to decode a video information) and different environments (or sets) of one or more previously decoded symbols or different decoding states, are identical.

An embodiment provides a method for encoding a video content, wherein the method comprises encoding a plurality of video frames, wherein the method comprises performing an arithmetic encoding according to any of the first to eighth aspects, for providing an encoded binary sequence on the basis of a sequence of binary values representing a video content.

An aspect provides a method for decoding a video content, wherein the method comprises decoding a plurality of video frames, wherein the method comprises performing an arithmetic decoding according to any of the first to eighth aspects, for providing a decoded binary sequence (for example, on the basis of decoded symbol values) on the basis of an encoded representation of the binary sequence.

The methods are based on the same considerations as the corresponding user devices. Moreover, the methods can be supplemented by any of the features, functionalities and details which are described herein with respect to the user devices, both individually and taken in combination.

An aspect provides a computer program for performing any of the previously described methods when the computer program runs on a computer.

An aspect provides a video encoder, wherein the video encoder is configured to encode a plurality of video frames, wherein the video encoder comprises an arithmetic encoder for providing an encoded binary sequence on the basis of a sequence of binary values representing a video content, according to any of the first to eighth aspects.

An aspect provides a video decoder, wherein the video decoder is configured to decode a plurality of video frames, wherein the video decoder comprises an arithmetic decoder for providing a decoded binary sequence (for example, on the basis of decoded symbol values) on the basis of an encoded representation of the binary sequence, according to any of the first to eighth aspects.

BRIEF DESCRIPTION OF THE DRAWINGS

Embodiments of the present invention will be detailed subsequently referring to the appended drawings, in which.

DETAILED DESCRIPTION OF THE INVENTION

In the following, different inventive embodiments and aspects will be described. Also, further embodiments will be defined by the enclosed claims.

It should be noted that any embodiments as defined by the claims can be supplemented by any of the details (features and functionalities) described herein. Also, the embodiments described herein can be used individually, and can also optionally be supplemented by any of the details (features and functionalities) included in the claims. Also, it should be noted that individual aspects described herein can be used individually or in combination. Thus, details can be added to each of said individual aspects without adding details to another one of said aspects. It should also be noted that the present disclosure describes explicitly or implicitly features usable in arithmetic coding. Thus, any of the features described herein can be used in the context of arithmetic coding. It should also be noted that the present disclosure describes, explicitly or implicitly, features usable in a video encoder (apparatus for providing an encoded representation of an input video signal) and in a video decoder (apparatus for providing a decoded representation of a video signal on the basis of an encoded representation). Thus, any of the features described herein can be used in the context of a video encoder and in the context of a video decoder.

The invention will be understood more fully from the detailed description given below and from the accompanying drawings of embodiments of the invention, which, however, should not be taken to limit the invention to the specific embodiments described, but are for explanation and understanding only.

Moreover, features and functionalities disclosed herein relating to a method can also be used in an apparatus (configured to perform such functionality). Furthermore, any features and functionalities disclosed herein with respect to an apparatus can also be used in a corresponding method. In other words, the methods disclosed herein can be supplemented by any of the features and functionalities described with respect to the apparatuses.

Figure 1:
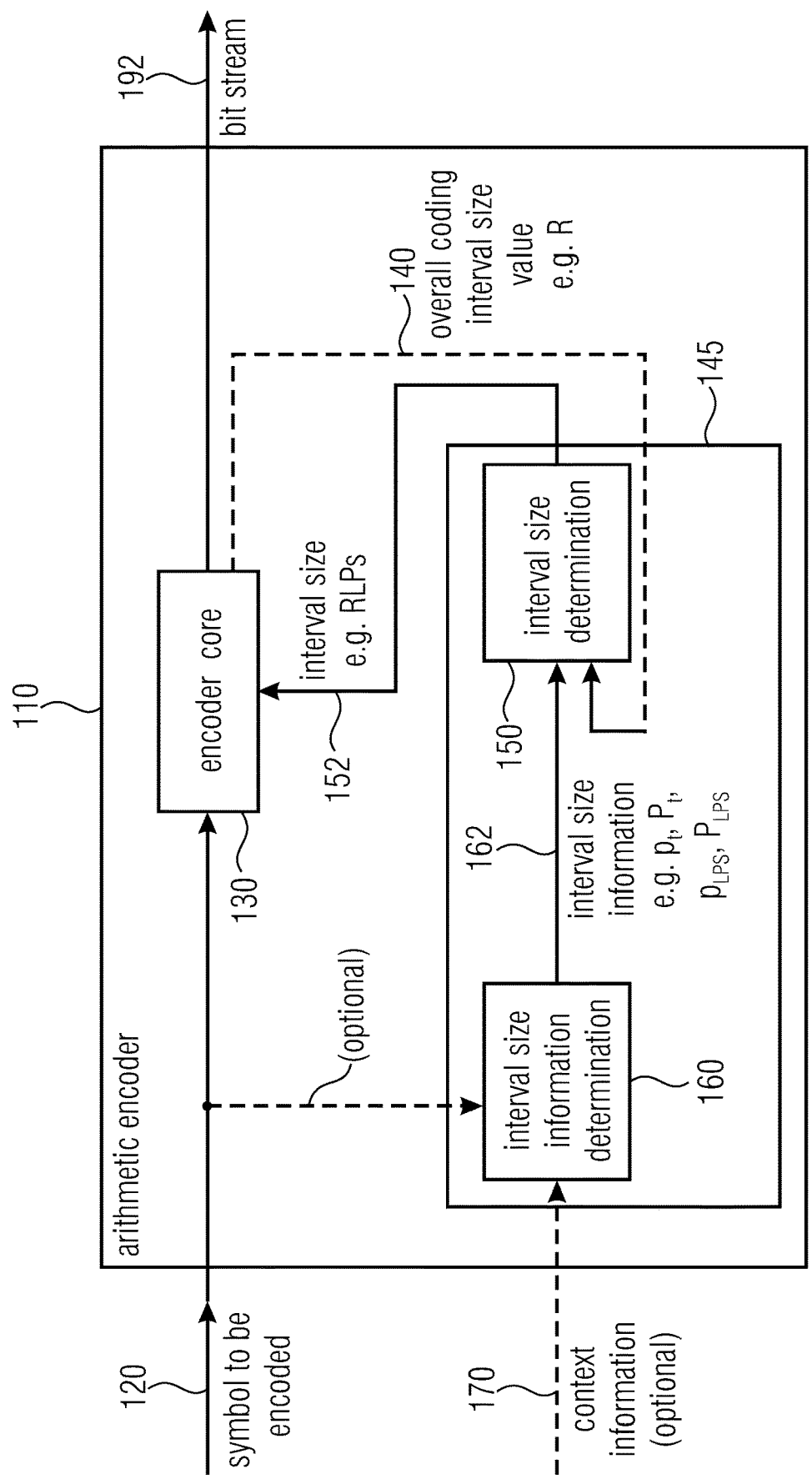
FIG. 1 illustrates an arithmetic encoder according to an embodiment.
Figure 2:
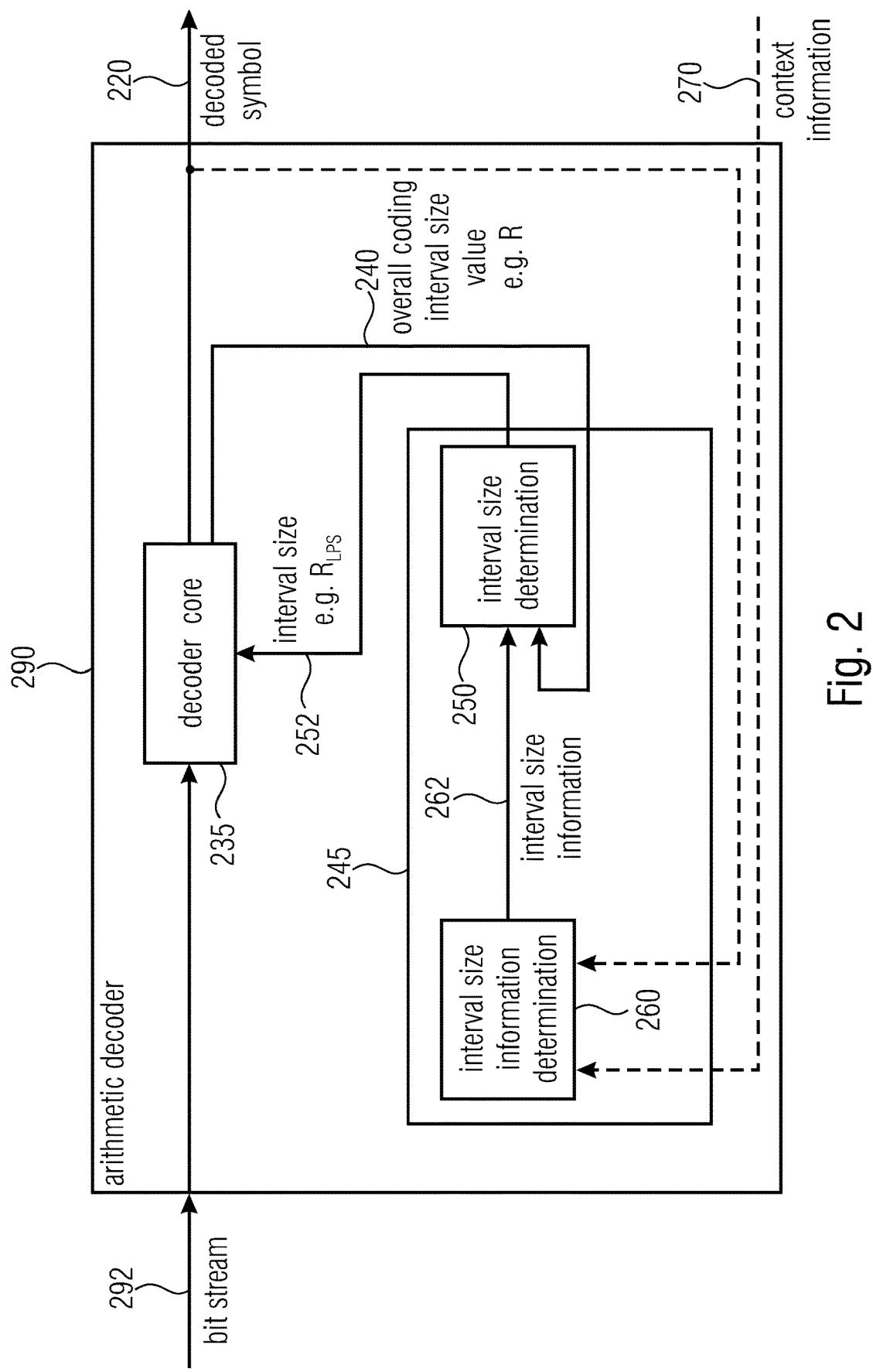
FIG. 2 illustrates an arithmetic decoder according to an embodiment.

The following description of the figures starts with the presentation of an arithmetic encoder (FIG. 1) and an arithmetic decoder (FIG. 2). Subsequently, the description of embodiments of the concepts of the present application is presented along with a description as to how such concepts could be built into the arithmetic encoder and the arithmetic decoder of FIGS. 1 and 2. Nevertheless, the embodiments described with the subsequent FIG. 3 and following may also be used to form encoder and decoders according to FIGS. 1 and 2.

1.1. Arithmetic Encoder 110 and Arithmetic Decoder 290 According to FIG. 1 and FIG. 2

FIG. 1 illustrates an example of an arithmetic encoder 110 according to an embodiment of the invention, e.g. according to any of the first to eighth aspect.

The arithmetic encoder 110 according to FIG. 1 may, for example, be used in a video encoder. Optionally, the arithmetic encoder 110 may also be used in an audio encoder, an image encoder, an encoder for encoding coefficients of a neural network, etc.

The arithmetic encoder 110 is configured to receive a symbol 120 to be encoded. The symbol 120 to be encoded. The symbol 120 to be encoded may be represented by a symbol value. The arithmetic encoder 110 is to provide a bit stream 192 on the basis of one or more symbols 120 to be encoded. For example, the bit stream 192 represents a sequence of symbols 120 to be encoded.

The arithmetic encoder 110 comprises an encoder core 130, which receives the symbol 120 to be encoded and provides the bit stream 192. The encoder core 130 further receives an interval size 152, which may be represented by an interval size value, and may, for example, be denoted as $R_{LPS}$. For example, the interval size 152 may indicate a size of an interval associated with a symbol value. The interval size 152 may, for example, represent a portion of an overall coding interval size value 140 which may also be denoted as current coding interval. The encoder core 130 may decide, if the symbol 120 to be encoded corresponds to the symbol value to which the interval size 152 is associated, and if so, the encoder core 130 may provide the interval size 152 as the new overall coding interval size value 140. Otherwise, the encoder core 130 may, for example, provide another portion of the current coding interval as the new overall coding interval size value 140, for example a portion which is complementary to the portion represented by the interval size. Thus, for example, the arithmetic encoder 110 may perform one iteration for each symbol 120 to be encoded. In some examples, the encoder core 130 may re-determine (but not necessarily change) the overall coding interval size value 140 in each iteration, and provide the overall coding interval for the interval size determination of the subsequent symbol to be encoded. In other examples, the overall coding interval size value 140 may not be re-determined and/or provided by the encoder core 130. The encoder core 130 may, for example, re-normalize the overall coding interval size value 140 in case that the overall coding interval size value, or the interval selected by the encoder core based on the interval size and the symbol to be encoded, is within (or outside of) a predetermined range. For example, the encoder core 130 may provide one or more bits for the bit stream 192 in case of a re-normalization of the overall coding interval size value 140, or in case of the finding that the interval selected based on the interval size 152 and the symbol value 120 to be encoded is within, or outside of, the predetermined range.

For example, the symbol 120 to be encoded is a binary symbol, e.g. the symbol 120 may take symbol values 0 or 1. The arithmetic encoder 110 may decide whether the symbol 120 to be encoded represents the less probable symbol (LPS) or the more probable symbol (MPS) of the two binary symbols. For example, the decision whether the symbol 120 to be encoded is the LPS or the MPS may be in accordance with an interval size information 162. For example, the interval size 152 may be associated to the LPS or the MPS. For example, if the interval size is associated to the LPS is may be denoted as $R_{LPS}$. In other words, the symbol value, e.g. 0 or 1, which is associated with the interval size 152 or the interval size information 162 may depend on the value of the interval size information 162. Additionally or alternatively, the symbol value to which the interval size information 162 refers, or is associated, may depend on the probabilities of the individual symbol values. E.g., the interval size information may refer to the LPS and may be denoted as $p_{LPS}$ or $P_{LPS}$.

For example, the encoder core 130 may provide the interval size 152, e.g., $R_{LPS}$, as the overall coding interval size 140, if the symbol 120 to be encoded corresponds to the symbol of the two binary symbols, which is associated with the interval size 152, and may provide the difference of the current overall coding interval size value and the interval size 152 as the new overall coding interval size value 140, if the symbol 120 to be encoded corresponds to the other one of the two binary values.

The interval size 152 is provided by an interval size determination block 145 on the basis of the overall coding interval size value 145. The interval size determination block 145 comprises an interval size determination 150. The interval size determination 150 receives the overall coding interval size value 140 and the interval size information 162. The interval size information 162 may also be denoted as probability estimate, e.g., $p_t$, $P_t$. For example, the interval size information 162 may refer to the LPS of binary symbol values and may be denoted as $p_{LPS}$, $P_{LPS}$. The interval size information 162 may be an estimate for the probability that the symbol 120 to be encoded corresponds to a specific symbol value or a specific symbol type. For example, the interval size information 162, e.g., $p_{LPS}$, $P_{LPS}$ may refer to the probability that the symbol 120 to be encoded corresponds to the LPS.

The interval size determination 150 determines the interval size 152 on the basis of the overall coding interval size value 140 and the interval size information 162. Examples of the interval size determination 150 are described with respect to the following embodiments.

The interval size information 162 is provided by an interval size information determination 160 of the interval size determination block 145. The interval size information determination 160 may optionally obtain context information 170. For example, the arithmetic encoder 110 may receive the context information or may initialize the context information. For example, the interval size information determination 160 may select one or more context models for the symbol 120 to be encoded and may determine the interval size information 162 on the basis of or according to the context model selected for the symbol 120. Additionally or alternatively, the interval size information determination 160 may consider the values of a plurality of previously encoded symbols and/or a current encoder state, which may, for example comprise an operation mode. For example, the interval size information determination 160 may determine a first source statistic value, e.g., $a_t$, and a second source statistic value, e.g., $b_t$, based on respective pluralities of previously encoded symbols and/or the encoder state. The interval size information determination 160 may determine the interval size information 162 based on the first source statistic value and the second source statistic value. Optionally, the arithmetic encoder 110 may provide the symbol 120 to be encoded to the interval size information determination 162, so that the interval size information determination may consider the symbol 120 to be encoded for the determination of the interval size information 162 of a subsequent symbol to be encoded.

FIG. 2 illustrates an arithmetic decoder 290 according to an embodiment of the invention, e.g. according to any of the first to eighth aspect.

The arithmetic decoder 290 may, for example, be used in a video decoder, but may also be used in an audio encoder, an image encoder and an encoder for encoding coefficients for a neural network, etc.

The arithmetic decoder 290 is configured to receive a bit stream 292, which may correspond to the bit stream 192 as provided by the encoder 110. The arithmetic decoder provides a decoded symbol 220 based on the bit stream 192. For example, the arithmetic decoder 290 provides a sequence of decoded symbols 220. The arithmetic decoder comprises a decoder core 230. The decoder core 230 receives the bit stream 292 and an interval size 250, and provides the decoded symbol 220 and an overall coding interval size value 240. The arithmetic decoder 290 comprises an interval size determination 250. The interval size determination 250 provides the interval size 252 on the basis of the overall coding interval size value 240 and an interval size information 262. The interval size determination 250 may be implemented equivalently to the interval size determination 150 of FIG. 1. Accordingly, the description of the interval size 152 may equivalently apply to the interval size 252.

For example, the decoder core 230 may compare a value represented by a currently considered portion of the bit stream 292 to the interval size 252. The decoder core 230 may provide a symbol value associated to the interval size 252 as the decoded symbol 220, if the value of the currently considered bit stream portion is within the interval represented by the interval size 252. In this case, the decoder core 230 may, in some examples, provide the interval size 252 as the overall coding interval size value 240, and may otherwise provide another symbol value or symbol type as the decoded symbol 220 and may provide a complementary portion of a current coding interval, complementary with respect to the interval size 252, as the new overall coding interval size value 240. For example, the decoded symbols 220 may be binary symbols, the interval size 252 may be associated with one of the two binary symbols, e.g., the LPS, and the decoder core 230 may provide, as the overall coding interval size value 240, either the interval size 252 or the difference between the current coding interval and the interval size 252. In other examples, the encoder core 230 may not provide the overall coding interval size value 240, or may provide the overall coding interval size value independent from the decoded symbol value, e.g. as a predetermined value.

The arithmetic decoder 290 comprises an interval size determination block 245 for providing the interval size information 262. The interval size determination block 245 comprises by an interval size information determination 260, which may correspond to the interval size information determination 160 according to FIG. 1. Accordingly, the description of the interval size information 162 may equivalently apply to the interval size information 262. The interval size information determination 260 may optionally receive the decoded symbol 220 to update a plurality of previously decoded symbols. The plurality of previously decoded symbols may be used for determination of the interval size information 262, for example, equivalently as described for a determination of the interval size information 162 based on the plurality of the plurality of previously encoded symbols 120. The interval size information determination 260 may further receive context information 270, which may, for example, be derived based on the decoded symbols 220. For example, the interval size determination block 245 may correspond to the interval size determination block 145, wherein previously decoded symbols 220 may replace the function of previously encoded symbols, the symbol to be decoded replaces the symbol to be encoded, and a decoder state may replace an encoder state.

The arithmetic encoder 110 and the arithmetic decoder 290 may optionally be supplemented by or combined with any of the features, functionalities and details described herein with respect to the following embodiments, both individually or in combination.

It is further noted, that the encoder 110 and the decoder 290 illustrate a general operation scheme of arithmetic encoding and decoding. However, the following embodiments may optionally be implemented differently from or equivalently to the encoder 110 and the decoder 290.

It is further noted, that features, functionalities and details described with respect to the following embodiments may optionally be combined with each other. For example, some aspects of the invention may refer to one or more of context initialization, e.g. an initialization of the context information 170, the determination of the interval size information 162, the determination of the interval size 152, and an implementation of operation modes. The encoder 110 and the decoder 290 may, for example, provide a framework for combining embodiments of multiple of these steps.

1.2. Arithmetic Encoder 310 and Arithmetic Decoder 490 According to FIG. 3 and FIG. 4

Figure 3:
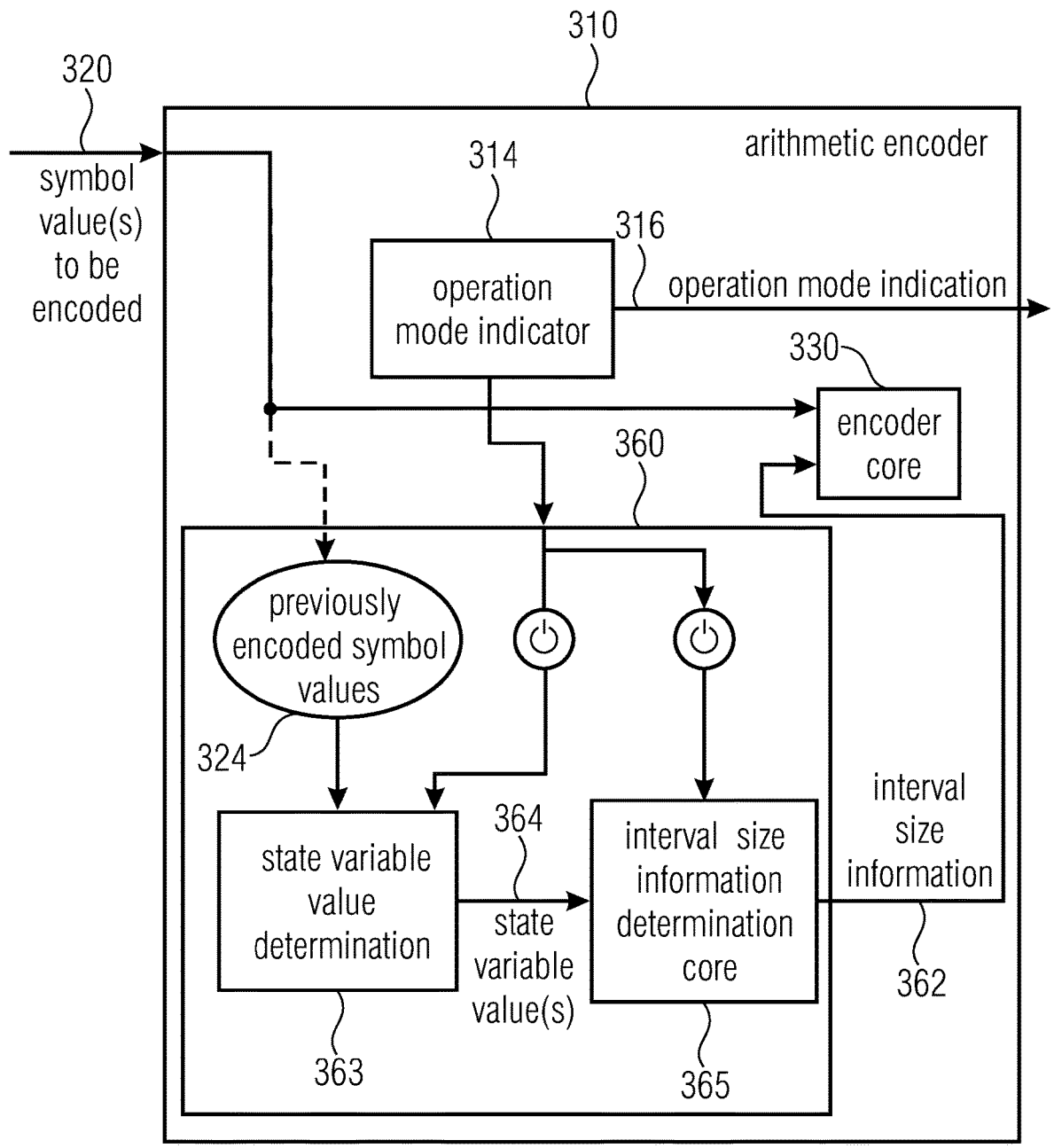
FIG. 3 illustrates an arithmetic encoder according to an embodiment.

FIG. 3 illustrates an arithmetic encoder 310 according to an embodiment of the invention, e.g. according to the first aspect. For example, the arithmetic encoder 310 may correspond to the arithmetic encoder 110. The arithmetic encoder 310 receives one or more symbol values 320 to be encoded, which may correspond to the symbol value 120 to be encoded. For example, the arithmetic encoder 310 comprises an encoder core 330, e.g. the encoder core 130, for encoding the symbol value 320.

The arithmetic encoder 310 comprises an interval size information determination 360, which may correspond to the interval size information determination 160 of FIG. 1. The interval size information determination 360 is to provide an interval size information 362, which may correspond to the interval size information 162.

The interval size determination 360 is to derive the interval size information 360 for an arithmetic encoding of the one or more symbol values 320 to be encoded. The interval size information determination 360 comprises an interval size information determination core 365, which is to derive the interval size information 362 on the basis of one or more state variable values 364. For example, the interval size information determination 360 comprises a state variable value determination 363 for providing the state variable values 364. The state variable values 364 represent a plurality of previously encoded symbol values 320.

The arithmetic encoder 310 may operate in one of the first operation mode (e.g. a high efficiency mode or a normal mode) and a second operation mode (e.g. a high throughput mode). The arithmetic encoder 310 comprises an operational indicator 314 for indicating whether the arithmetic encoder 310 is operating in the first operation mode or in the second operation mode. When operating in the first operation mode, the interval size information determination 360 may update the one or more state variable values 364 and/or the interval size information 362 for an encoding of one or more subsequent symbol values to be encoded. When operating the second operation mode, the interval size information determination 360 may disable the update of the one or more state variable values 364 and/or the interval size information 362.

The arithmetic encoder 310 is configured to provide the operation mode indication 316 as a side information indicating whether the first mode, in which the update of the one or more state variable values 364 and/or of the interval size information 362 is enabled, or the second mode, in which the update of the one or more state variable values 364 and/or of the interval size information 362 is disabled, is used.

For example, the state variable values 364 comprise a first source statistic value, e.g., $a_t$, and a second source statistic value, e.g., $b_t$, which may represent a frequency or account of previously encoded symbol values, for example, binary symbol values. For example, the first source statistic value and the second source statistic value each consider previously encoded symbol values within a respective window, e.g., $w_a$ and $w_b$. The state variable value determination 363 may use the symbol value 320 to be encoded to update one or more of the one or more state variable values 364 for the encoding of a subsequent symbol value.

The interval size information determination core 365 determines the interval size information 362 based on the one or more state variable values 365. For example, the interval size information 362 may represent a size of an interval, wherein the interval to which the interval size information refers may be associated with a specific symbol value or symbol type. For example, the size of the interval indicated by the interval size information may represent an estimate for a probability that the symbol value 320 to be encoded corresponds to the symbol value or the symbol type associated with the interval described by the interval size information 362. For example, the interval size information 362 may represent an estimate for the probability that the symbol 120 to be encoded corresponds to the LPS of two binary symbol values. The interval size information 362 may be represented as a decimal value in the range from 0 to 1, e.g., $p_t$, or may be represented as an integer, e.g., $P_t$.

The interval size information determination core 365 may determine the interval size information 362 based on a context information, for example, the context information 170, which is selected for the symbol value 320 to be encoded. Thus, the interval size information determination core 365 may determine the interval size information 362 based on the state variable values 364 and optionally based on further information such as context information.

In the second operation mode, the update of the state variable values 364 may be disabled. In this case, the interval size information determination core 365 may, for example, use a default value for the state variable values 365, or may use the last updated value of the state variable values 364. Nevertheless, the interval size information determination core 365 may optionally update the interval size information 362, for example, in dependence on context information. In further examples, in the second operation mode, the interval size information determination core 365 is disabled. In this case, the arithmetic encoder 310 may use a default value of the interval size information 362, or may use the last updated value of the interval size information 362.

In examples, the symbol values 320 to be decoded may represent pictures of a video sequence. For example, a plurality of pictures may form a sequence, and multiple pictures of one sequence may form a group of pictures. One or more pictures belonging to the same point in time may form a frame. One picture may comprise one or more slices, into which the respective picture may be subdivided. For example, the operation mode of the arithmetic encoder 310 may be selected on a per-frame basis, or on a per-slice basis, or on a pre-group of pictures basis, or on a per-sequence basis. Accordingly, the operation mode indication 360 provided by the arithmetic encoder 310 may refer to a frame, or to a slice, or to a group of pictures, or to a sequence. For example, the operation mode indicator 314 may provide one indication of the operation mode per frame, or one per slice, or one per group of pictures, or one per sequence.

The arithmetic encoder 310 may operate according to a profile selected for the encoding of the symbol values 320. The profile may have associated therewith an operation mode for the arithmetic encoder 310, for example, the first or the second operation mode. For example, the arithmetic encoder may provide, as the operation mode indication 360, an indication of the profile. In other words, for example, the operation mode indication 360 may be signaling implicitly by signaling a profile.

Alternatively or additionally, the operation mode indication 360 is signaled as a dedicated side information, that is, for example, the operation mode indication 360 may be represented by an explicit signaling, for example, a dedicated bit or flag, which is specifically dedicated to indicating whether the first mode or the second mode is used.

For example, the arithmetic encoder 310 may comprise an interval size determination, for example, the interval size determination 150 of FIG. 1, for determining an interval size, for example, the interval size 152, associated with a symbol value or a symbol type out of a plurality of possible symbol values or symbol types on the basis of an overall coding interval size value, for example, the overall coding interval size value 140, and on the basis of the interval size information 362. The interval size determination may use a first computation rule when operating in the first operation mode and use a second computation rule when operating at a second operation mode. The first and the second computation rules may, for example, differ in accuracy and/or a complexity. The arithmetic encoder 310 may, for example, perform the interval size determination as described with respect to the arithmetic encoder 110 or as described with respect to further embodiments in the following.

In some examples, the interval size information 362 may be represented by, or may comprise, a shift count value, e.g., $g_{LPS}$. For example, when operating in the first operation mode, the interval size information 362 may be represented by, or may comprise, a probability estimate, e.g., $p_t$, $P_t$, and in the second operational mode, the interval size information 362 may be represented by, or comprise, the shift count value. For example, the interval size information determination core 365 may determine the shift count value based on initialization parameters.

In examples, the state variable value determination 363 may, in case that updating the state variable values 364 is enabled, update the first source statistic value $a_t$ according to $$a_{t+1} = a_t + x_t \cdot (ONE_a >> n_a) - (a_t >> n_a)$$

wherein $a_t$ is a current version of the first state value, wherein $x_t$ is a current encoded symbol, wherein $n_a$ is a window size information, wherein $$ONE_a = (1 << BITS_a) - k_a$$

wherein $BITS_a$ is a number of bits used to represent the first state value, and wherein $k_a$ is a predetermined number.

Accordingly, the state variable determination 363 may update the second source statistic value $v_t$ according to $$b_{t+1} = b_t + x_t \cdot (ONE_b >> n_b) - (b_t >> n_b)$$

wherein $b_t$ is a current version of the first state value, wherein $x_t$ is a current encoded symbol, wherein $n_b$ is a window size information, wherein $$ONE_b = (1 << BITS_b) - k_b$$

wherein $BITS_b$ is a number of bits used to represent the first state value, and wherein $k_b$ is a predetermined number.

For example, $a_{t+1}$ and $b_{t+1}$ may represent updated versions updated versions of state variable values 364 for use in the state variable value determination for a subsequent symbol to be encoded.

For example, the interval size information determination core 365 may combine the first source statistic value and the second source statistic value for obtaining the interval size information 362. For example, the interval size information determination core 365 may derive a weighted sum of the first source statistic value and the second source statistic value, $a_t$ and $b_t$, in order to obtain the interval size information 362. For example, the interval size information determination core 365 may provide a probability estimate $P_t$ as the interval size information 362. The interval size information determination core 365 may derive the probability estimate $P_t$ according to $$P_t = ((a_t >> (BITS_a - BITS_{min})) + (b_t >> (BITS_b - BITS_{min}))) >> 1$$

where $$BITS_{min} = \min(BITS_a, BITS_b)$$

wherein $a_t$ is the first state variable value, wherein $b_t$ is the second state variable value, wherein $BITS_a$ is a number of bits used for a representation of $a_t$; and wherein $BITS_b$ is a number of bits used for a representation of $b_t$.

The arithmetic encoder 310 may optionally be supplemented by any of the features, functionalities and details described herein with respect to the other embodiments, both individually and taken in combination. In particular, the interval size information determination core 365 may, for example, be implemented as described with respect to aspect 4 (section 1.5). Further, the interval size information 362 may be provided for an interval size determination, which may be implemented as described with respect to the aspects 2, 3 and 5.

Figure 4:
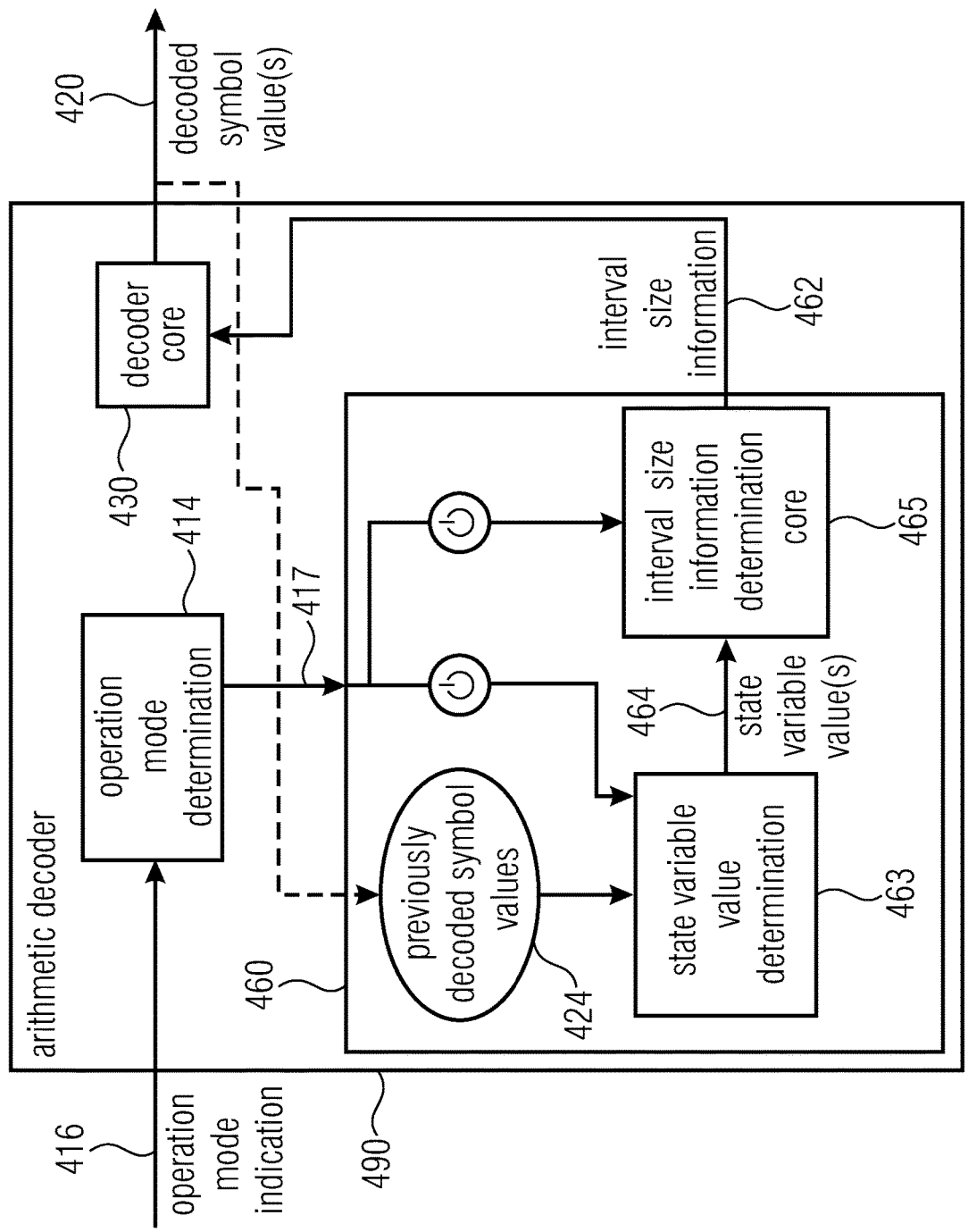
FIG. 4 illustrates an arithmetic decoder according to an embodiment.

FIG. 4 illustrates an arithmetic decoder 490 according to an embodiment of the invention, e.g. according to the first aspect. For example, the arithmetic decoder 490 may correspond to the arithmetic decoder 290. The arithmetic decoder 490 may comprise a decoder core 430, e.g. the decoder core 230, for decoding a symbol value to be decoded so as to obtain a decoded symbol value 420. The arithmetic decoder 490 comprises an interval size determination 450 for to deriving an interval size information 462 for an arithmetic decoding of one or more symbol values to be decoded on the basis of one or more state variable values 464, which represent statistics of a plurality of previously decoded symbol values in a first mode of operation and to update the one or more state variable values 464 and/or the interval size information 462 for a decoding of one or more subsequent symbol values to be decoded in the first mode. The arithmetic decoder 490 is configured to disable an update of the one or more state variable values 464 and/or of the interval size information 462 in a second mode. The arithmetic decoder 490 is configured to receive a side information 416 indicating whether the first mode, in which the update of the one or more state variable values 464 and/or of the interval size information 462 as enabled, or the second mode, in which the update of the one or more state variable values 462 and/or of the interval size information 462 is disabled, is used.

For example, the side information 416 comprising an operation mode indication may correspond to the operation mode indication 316 of FIG. 3. The arithmetic decoder 490 comprises an operation mode determination 414 to derive the operation mode to the used for the decoding of the current symbol value, or the current frame, for the current slice, or the current group of pictures, or the current sequence. The operation mode determination 414 provides an operation mode information 417 indicating the current operation mode. For example, the operation mode information 417 may be referred to as a side information indicating whether the first mode or the second mode of operation is used.

The arithmetic decoder 490 comprises an interval size information determination 460, which may correspond to the interval size information determination 260. The interval size information determination 460 may be implemented analog to the interval size information determination 360 of FIG. 3, wherein a state variable value determination 463 and an interval size information determination core 465 of the interval size information determination 460 corresponds to the state variable value determination 363 and the interval size information determination core 365 of FIG. 3 respectively. Accordingly, one or more state variable values 464 provided by the state variable value determination 463 may correspond to the state variable values 364, and the interval size information provided by the interval size information determination core 465 may correspond to the interval size information 362 of FIG. 3. The state variable values 464 may represent statistics of a plurality of previously decoded symbol values 424. In other words, the state variable value determination 463 may determine the state variable values 464 on the basis of the previously decoded symbol values 424. For example, the interval size information determination 460 may correspond to the interval size information determination 360 except for that the previously decoded symbol values 424 may replace the previously encoded symbol values 324. For example, the arithmetic decoder 490 provides a decoded symbol value 420, which may correspond to the decoded symbol value 220. The decoded symbol value 420 may be considered as one of the previously decoded symbol values 424 for updating the state variable values 464 for one or more subsequent symbol values to be decoded.

The interval size information determination 460 may operate the first operation mode or in the second operation mode according to the operation mode information 417. The operation of the interval size information determination 460 in the first or in the second operation mode may be analog, as described with respect to the interval size information determination 360 of FIG. 3.

The arithmetic decoder 419 may optionally be supplemented by or combined with any of the features, functionalities and the details described herein with respect to the other embodiments, both individually and taken in combination.

1.3. Arithmetic Encoder 510 and Arithmetic Decoder 690 According to FIGS. 5 to 7

Figure 5:
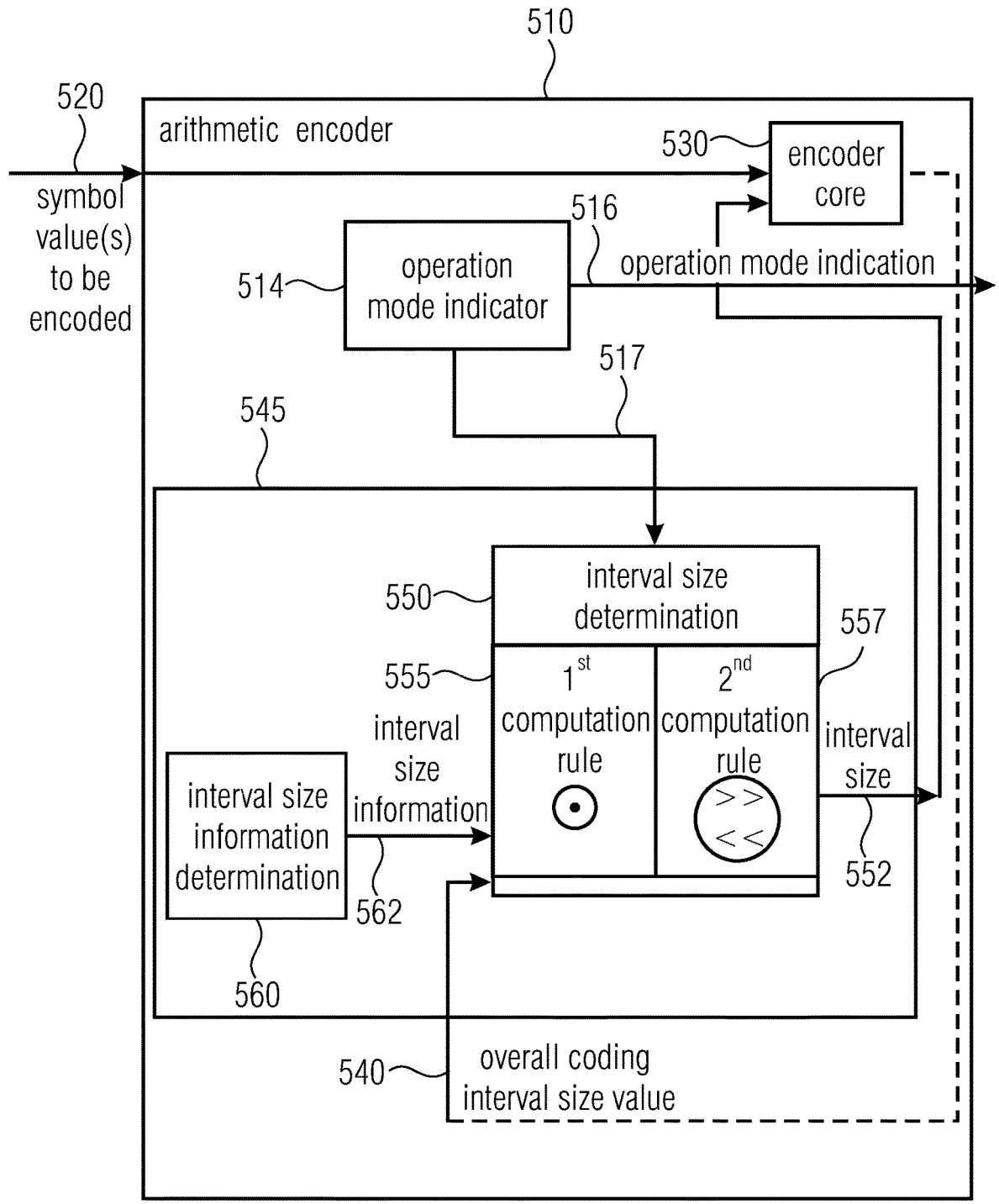
FIG. 5 illustrates an arithmetic encoder according to an embodiment.

FIG. 5 illustrates an arithmetic encoder 510 according to an embodiment of the invention, e.g. according to the second aspect. The arithmetic encoder 510 may correspond to any of the arithmetic encoders 110, 310.

The arithmetic encoder 510 receives symbol values 520 to be encoded. The symbol values 520 may correspond to the symbol values 120, 320.

The arithmetic encoder 510 comprises an interval size information determination block 545, which is to determine an interval size information 562 for an arithmetic encoding for one or more symbol values to be encoded. The information determination block 545 may correspond to the interval size determination block 145. The information determination block 545 comprises an interval size information determination 560, which may correspond to the interval size information determination 160, 360, and which is to determine an interval size information 562, which may correspond to the interval size information 162, 362.

The interval size information determination block 545 further comprises an interval size determination 550, which is to derive an interval size 552 on the basis of the interval size information 562. The interval size determination 550 and the interval size 552 may, for example, correspond to the interval size determination 150, 350 and the interval size 152, 352, respectively.

The arithmetic encoder comprises an operation mode indicator 514 for indicating whether the arithmetic encoder 510 is operating in a first operation mode (e.g. a high efficiency mode or a normal mode), or in a second operation mode (e.g. a high throughput mode). The operation mode indicator 514 is to provide the side information 516 comprising an operation mode indication indicating the operation mode, which is used for encoding the symbol value 520 to be encoded and optionally, further symbol values to be encoded. For example, the operation mode indicator 514 provides an operation mode information 517 indicating the operation mode to the interval size determination 550. In the first operation mode, the interval size determination 550 determines the interval size 552 using a first computation rule 555. In the second operation mode, the interval size determination 515 determines the interval size 552 using a second computation rule 557.

The interval size determination 550 receives an overall coding interval size value 550, which may correspond, for example, to the overall coding interval size value 140, 340. In the first operation mode, using the first computation rule, the interval size determination 550 is configured to multiply the overall coding interval size value 540, or a bit shifted version thereof, e.g., R, with the interval size information value 562, e.g., $p_t$ or $p_{LPS}$, or a bit shifted version thereof, e.g., $P_t$ or $P_{LPS}$, in order to obtain the interval size 552. The interval size 552 is associated with a symbol value out of a plurality of possible symbol values or with a symbol type out of a plurality of possible symbol types. For example, the interval size is associated with the LPS, as described in section 1.1.

In the second operation mode, using the second computation rule, the interval size determination 550 is configured to obtain the interval size 552 by applying a bit shift operation, e.g., a shift to the right operation, to the overall coding interval size value 540, wherein a number of bits by which the overall coding interval size value is shifted, is determined by the interval size information 562.

For example, the interval size information determination 560 may derive a shift count value, e.g., $g_{LPS}$, describing by how many bits the overall coding interval size value 540 is to be shifted. The interval size information determination 560 may provide the shift count value in or as the interval size information 562. Alternatively, the interval size information determination 560 may provide a probability estimate in, or as, the interval size information 562, and the interval size determination 550 may determine, based on the probability estimate the shift count value.

For example, the interval size information determination 560 may determine a probability estimate describing the probability that the symbol value 520 to be encoded corresponds to a symbol value which is associated with the probability estimate. The symbol value associated with the probability estimate is a symbol value out of a plurality of possible symbol values, for example, binary symbol values. The probability estimate may also be referred to as probability value. For example, the interval size information determination 560 may determine the probability estimate as described with respect to the interval size information determination 160, 360. For example, the first and/or the second computation rule 555, 557 may comprise a determination of the shift count value based on the interval size information 562.

Figure 7:
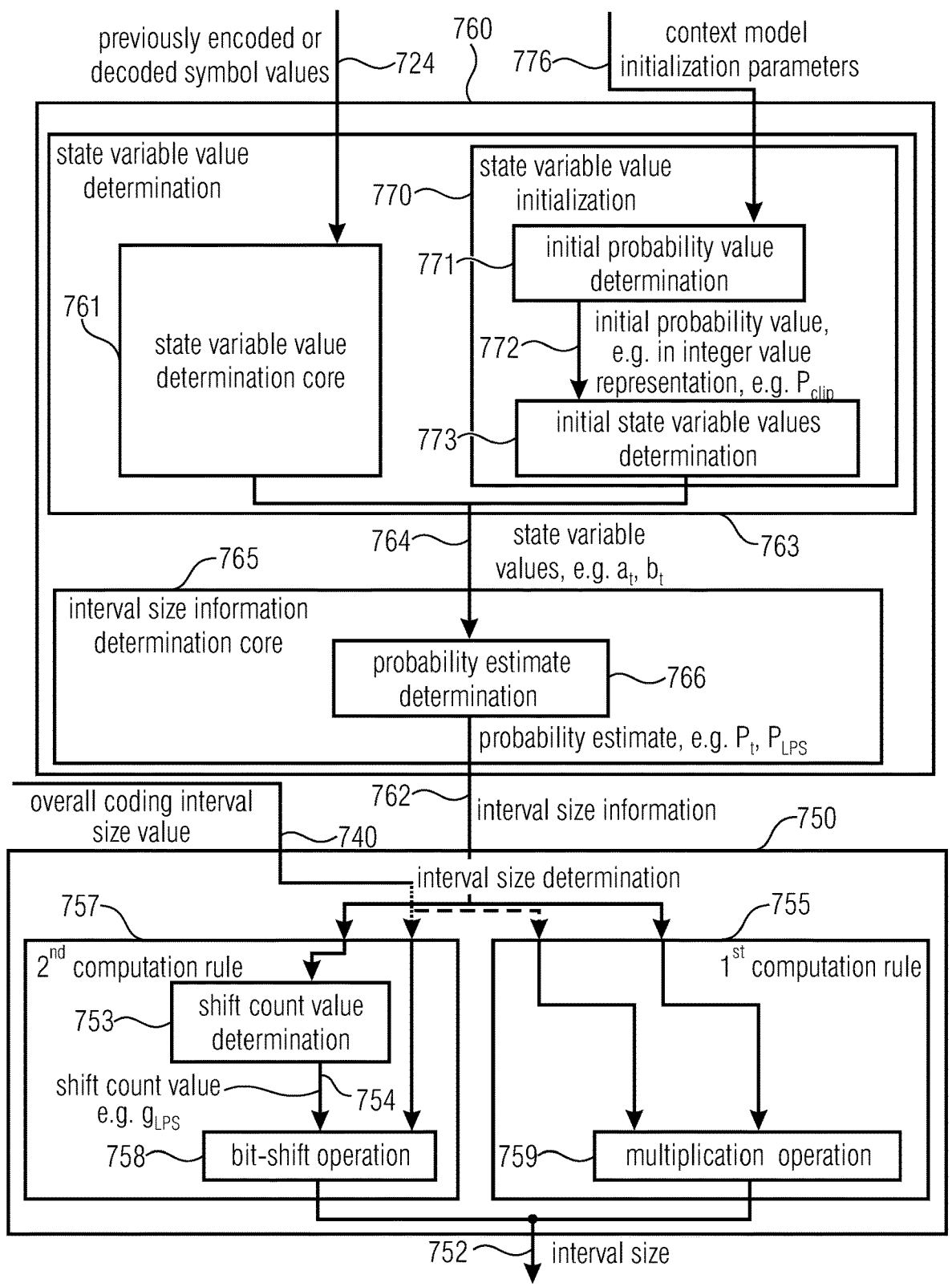
FIG. 7 illustrates an interval size determination block according to an embodiment.

FIG. 7 illustrates an interval size determination block 745 for determining an interval size 752 according to an embodiment. The interval size 752 may correspond to any of the interval size 152, 352, 552. The interval size 752 is determined by an interval size determination 750, which may be an implementation of the interval size determination 150, 350, 750. The interval size determination 750 receives an interval size information 762 and an overall coding interval size value 740, which may correspond to the interval size information 162, 362, 562 and the overall coding interval size value 140, 340, 540, respectively. The interval size information 762 is determined by an interval size information determination 760, which may correspond to the interval size information determination 160, 360, 560. Alternatively, the interval size information 762 may be derived by other implementations of the interval size information determination 160, 360, 560.

The interval size determination 750 may determine the interval size 752 according to a first computation rule 755, which may correspond to the first computation rule 555, or according to a second computation rule 757, which may correspond to the second computation rule 557. The second computation rule 757 comprises a shift count value determination 753, which is to determine the shift count value 754. The shift count value 754 describes by how many bits the overall coding interval size value 740 is shifted by a bit shift operation 758.

For example, the interval size information 762 is provided as an integer value representation value of a probability estimate, e.g., $P_{LPS}$ or $P_t$, comprising a number of BITS of bits. The shift count value determination 753 may use a determination of a bit position of a most significant non zero bit of an operand value, which is increased or decreased with respect to the integer value representation of the probability estimate.

For example, the shift count value determination 753 may use a determination of a bit position of a most significant non zero bit of an operand value, which is increased or decreased with respect to the integer value representation of the probability estimate by an addition or subtraction of a value, which is dependent on the integer value representation of the probability estimate. For example, the value to be added or subtracted may be a right shifted version of the integer value representation of the probability estimate.

For example, the shift count value determination 753 may derive this shift count value 754, denoted as $g_{LPS}$ according to $$g_{LPS} = \text{const1} - \lfloor \log_2(P_{LPS} + (P_{LPS} \gg \text{const2}) + \text{const3}) \rfloor$$

or according to $$g_{LPS} = \min(g_{MAX}, \text{const1} - \lfloor \log_2(P_{LPS} + (P_{LPS} \gg \text{const2}) + \text{const3}) \rfloor)$$

or according to $$g_{LPS} = \text{const1} - \lfloor \log_2(\text{const2'} \cdot P_{LPS} + \text{const3}) \rfloor$$

or according to $$g_{LPS} = \min(g_{MAX}, \text{const1} - \lfloor \log_2(\text{const2'} \cdot P_{LPS} + \text{const3}) \rfloor)$$

wherein $P_{LPS}$ is is the integer value representation of the probability value; wherein const1 is a predetermined value; wherein const2 is a predetermined value; wherein const 2' is a predetermined value; wherein const3 is a predetermined value; wherein $g_{MAX}$ is a predetermined value; wherein ">>" is a shift-to-the-right operator; wherein log 2 is a logarithm operator to base 2; wherein $\lfloor \ldots \rfloor$ is a ceiling operator.

Alternatively, the shift count value determination 753 may determine the shift count value 754, denoted as $g_{LPS}$, according to $$g_{LPS} = \min(g_{MAX}, \text{BITS} - 1 - \lfloor \log_2(P_{LPS} + (P_{LPS} \gg 2)) \rfloor)$$

wherein BITS−1 is a number of bits used for a number representation of $P_{LPS}$; wherein $P_{LPS}$ is the integer value representation of the probability value; wherein $g_{MAX}$ is a predetermined number; wherein >> is a shift-to-the-right operator; wherein $\log_2$ is a logarithm operator to base 2; wherein $\lfloor \ldots \rfloor$ is a ceiling operator.

The interval size information determination 760 comprises an interval size information determination core 765, which may correspond to the interval size information determination core 365, and which is to determine the interval size information 7862 based on one or more state variable values 764. The interval size information determination 760 further comprises a state variable value determination 763, which may correspond to the state variable value determination 363, and which provides the state variable values 764. The state variable value determination 763 comprises a state variable value determination core 761, which may determine the state variable value 764 on the basis of previously encoded or decoded symbol values 724. The previously encoded or decoded symbol values may, depending on whether the state variable value determination 761 is implemented in an arithmetic encoder or an arithmetic decoder, correspond to the previously encoded symbol values 324 or the previously decoded symbol values 424. The state variable value determination 763 may optionally comprise a state variable value initialization 770, which may determine the state variable value 764 alternatively to the state variable value determination core, for example, after initialization of the arithmetic encoder of the arithmetic decoder. The state variable value initialization 770 receives one or more context model initialization parameters 776. The state variable value initialization 770 comprises an initial probability value determination 771 for deriving an initial probability value 772 based on the context model initialization parameter 776. For example, the initial probability value determination 771 may provide the initial probability value 772 in an integer value representation, for example, $P_{CLIP}$.

For example, the initial probability value determination 771 may determine the initial probability value 772 according to $$P_{clip} = \min(\text{const11}, \max(\text{const12}, P_{init}))$$

$$P_{init} = ((\text{slope} \cdot (qp - \text{const13})) \gg \text{const14}) + \text{offset}$$

wherein const 11 is a predetermined value; wherein const 12 is a predetermined value; wherein const 13 is a predetermined value; wherein const 14 is a predetermined value; wherein slope is an initialization parameter value, e.g. one of the context model initialization parameters; wherein qp is a quality parameter value, e.g. one of the context model initialization parameters; wherein offset is an initialization parameter value, e.g. one of the context model initialization parameters.

The state variable value initialization 770 further comprises an initial state variable value determination 773, which determines the state variable values 764, for example, initial values thereof, based on the initial probability value 772.

For example, the state variable values or source statistic values may be denoted as $a_t$ and $b_t$, for example, as described in section 1.2. The initial state variable value determination 773 may determine the state variable values 764 according to $$a_t = P_{clip} << (BITS_a - \text{const31})$$

and/or according to $$b_t = P_{clip} << (BITS_b - \text{const31})$$

wherein $BITS_a$ is a number of bits used for a number representation of the source statistic value $a_t$; $BITS_b$ is a number of bits used for a number representation of the source statistic value $b_t$; const31 is a predetermined value; and wherein << is a shift-to-the-left operator.

For example, in the second operation mode, the arithmetic decoder, for example, the shift count value determination 753, may determine initial values of the shift count values 754 based on the initial values of the state variable values 764, for example, $a_t$ and $b_t$.

The interval size information determination core 765 comprises a probability estimate determination 766, which is to determine a probability estimate, e.g, $P_t$, $P_{LPS}$, on the basis of the state variable values 764. For example, the probability estimate determination 766 may determine the probability estimate as described in section 1.2. The interval size information determination core may provide the probability estimate as the interval size information 762.

For example, the multiplication operation 759, which may be used, for example, for determining the interval size 752 when operating in the first mode, may be implemented as $$R_{LPS} = (((R >> SHIFT_R) \cdot (P_{LPS} >> SHIFT_P)) >> SHIFT_{MUL}) + \text{add}_{LPS}$$

wherein R is the overall coding interval size value; $SHIFT_R$ is a predetermined value; $P_{LPS}$ is an integer valued interval size information value; $SHIFT_P$ is a predetermined value; $SHIFT_{MUL}$ is a predetermined value; $\text{add}_{LPS}$ is a predetermined value.

The interval size information 762 is associated to one of a plurality of possible symbol values or one of a plurality of possible symbol types. For example, the symbol type may be determined based on the probability estimate. For example, the probability estimate may represent a probability of a specific symbol value, for example, of a 0 or of 1, and, in dependence on which of the symbols is less probable, either one of the two symbols may be selected as the LPS. For example, the probability estimate determination 766 may determine the interval size information 762, for example, as an integer value, so that the interval size information 762 is associated with a specific symbol type.

The probability estimate determination 766 may determine the interval size information 762 from a probability estimate, which is associated with a specific symbol value according to $$\text{val}_{MPS} = P_t >> (BITS_{min} - 1)$$

$$P_{LPS} = (\text{val}_{MPS} ? (1 << BITS_{min}) - 1 - P_t : P_t)$$

wherein $P_t$ is an integer-valued probability value; $BITS_{min}$ is a number of bits used for a representation of $P_t$; wherein (cond? A:B) is an operator providing value A if the condition cond is non-zero, and providing B otherwise.

$P_{LPS}$ may represent a probability estimate that is associated to a symbol type, e.g. the LPS, and $P_t$ may represent a probability estimate for a specific symbol value, for example, 1.

The interval size information determination 760 and the interval size determination 750 are examples for implementations of the interval size information determination 560 and the interval size determination 550 of FIG. 5 respectively. Features of the interval size information determination 760 and the interval size determination 750 may be implemented in dependently from each other. However, the interval size information determination 760 may have to provide the interval size information 762 according to the implementation of the interval size determination 750. For example, the interval size information 762 may be provided as integer representation or decimal representation and may be associated to a specific symbol value or to a specific symbol type.

Figure 6:
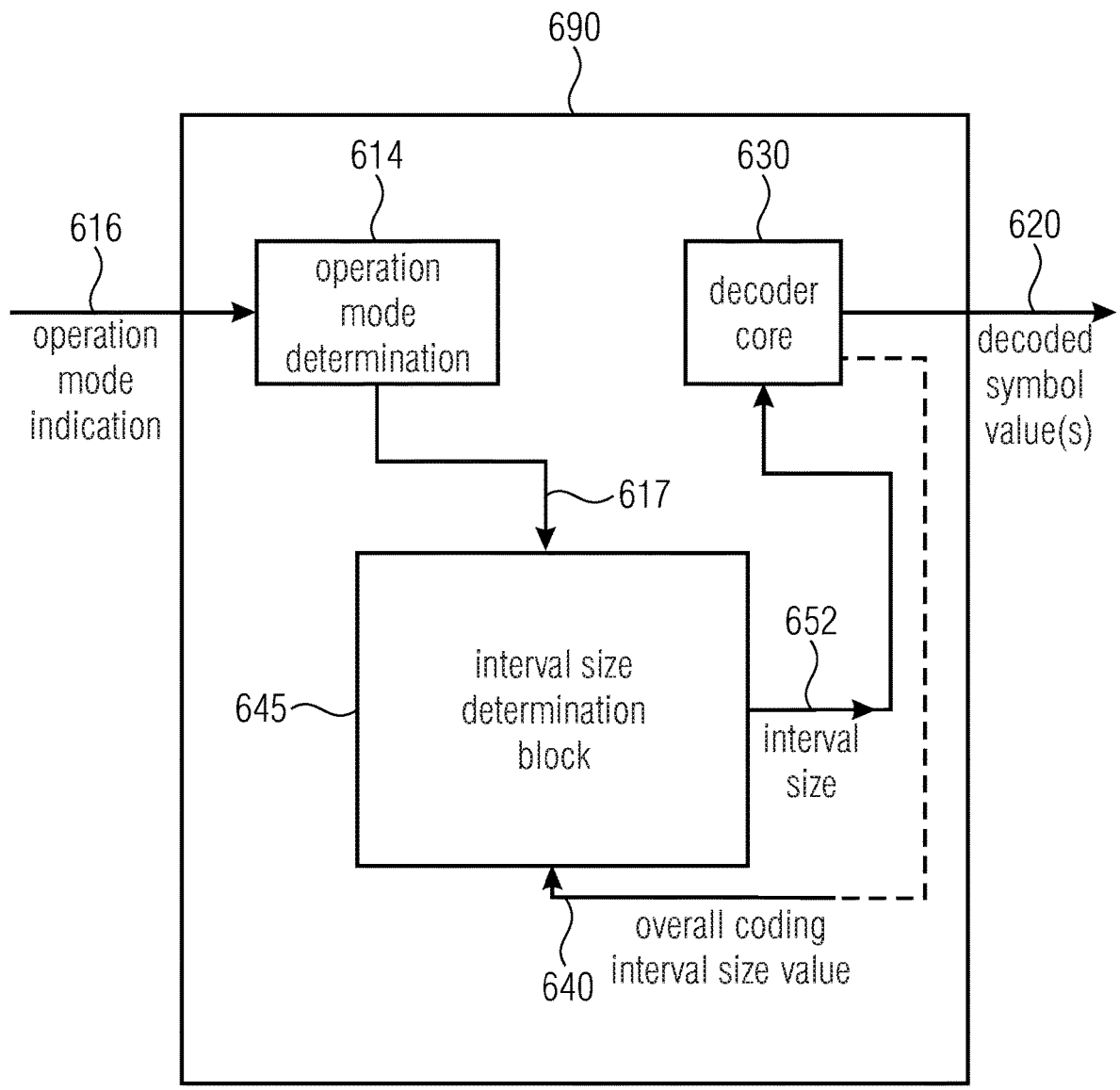
FIG. 6 illustrates an arithmetic decoder according to an embodiment.

FIG. 6 illustrates an arithmetic decoder 690 according to an embodiment of the invention, e.g. according to the second aspect. The arithmetic decoder 690 may correspond to any of the arithmetic decoders 290, 490.

The arithmetic decoder 690 provides one or more decoded symbol values 620, which may correspond to the decoded symbol values 220, 420. The arithmetic decoder 690 comprises an interval size determination blocks 645, which is to provide an interval size 652 for a decoding 630 of the decoded symbol value 620. The interval size 652 is determined based on an overall coding interval size 640. The interval size 652 and the overall coding interval size value 640 may correspond to the interval size 552 and the overall coding interval size 540 of FIG. 5. The interval size determination block 645 may be implemented as the interval size determination block 545, which may correspond to the interval determination block 745.

The arithmetic decoder 690 may operate in a first operation mode and a second operation mode. The arithmetic decoder 690 receives a side information 616 comprising an operation mode indication. The arithmetic decoder 690 comprises an operation mode determination 614, which may correspond to the operation mode determination 214, 414, to detect the operation mode based on the operation mode indication 616. The operation mode determination 614 may provide an operation mode information 616 to the interval size determination block 645. The operation mode information 617 may be referred to as a side information. The operation mode information 616 indicates, whether the decoding of the symbol value to be decoded, and optionally further symbol values to be decoded, are to be decoded in a first operation mode or a second operation mode. The interval size determination block 645 determines the interval size 652 in dependence on whether the operation mode information 617 indicates the first operation mode or the second operation mode.

The arithmetic decoder 690 comprises a decoder core 630, which may correspond to the decoder core 230, 430.

The arithmetic decoder 690 may optionally be supplemented by or combined with any of the features, functionalities or details described with respect to the arithmetic decoder 200, 400 and further embodiments described herein.

Figure 8:
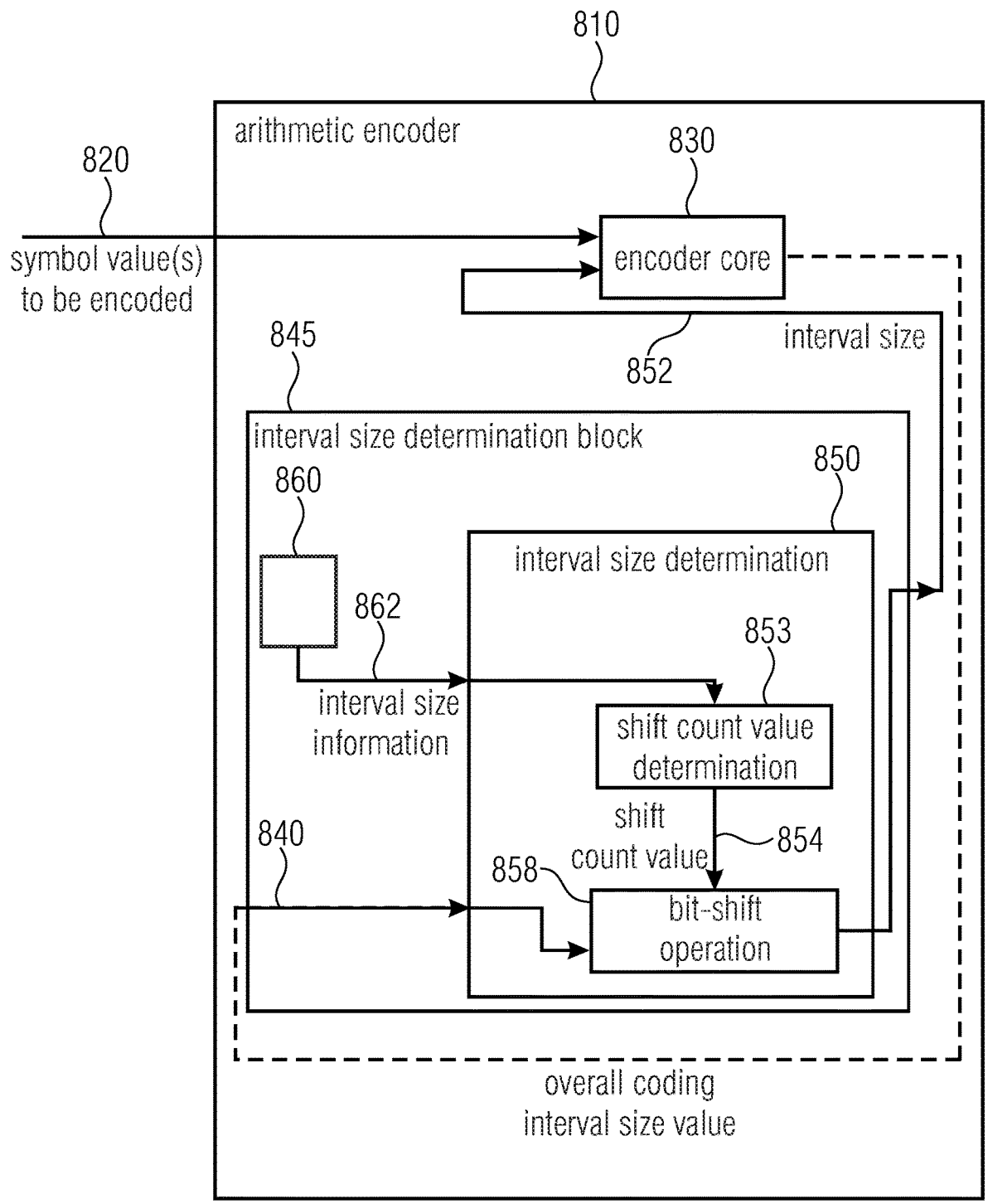
FIG. 8 illustrates an arithmetic encoder according to an embodiment.
Figure 9:
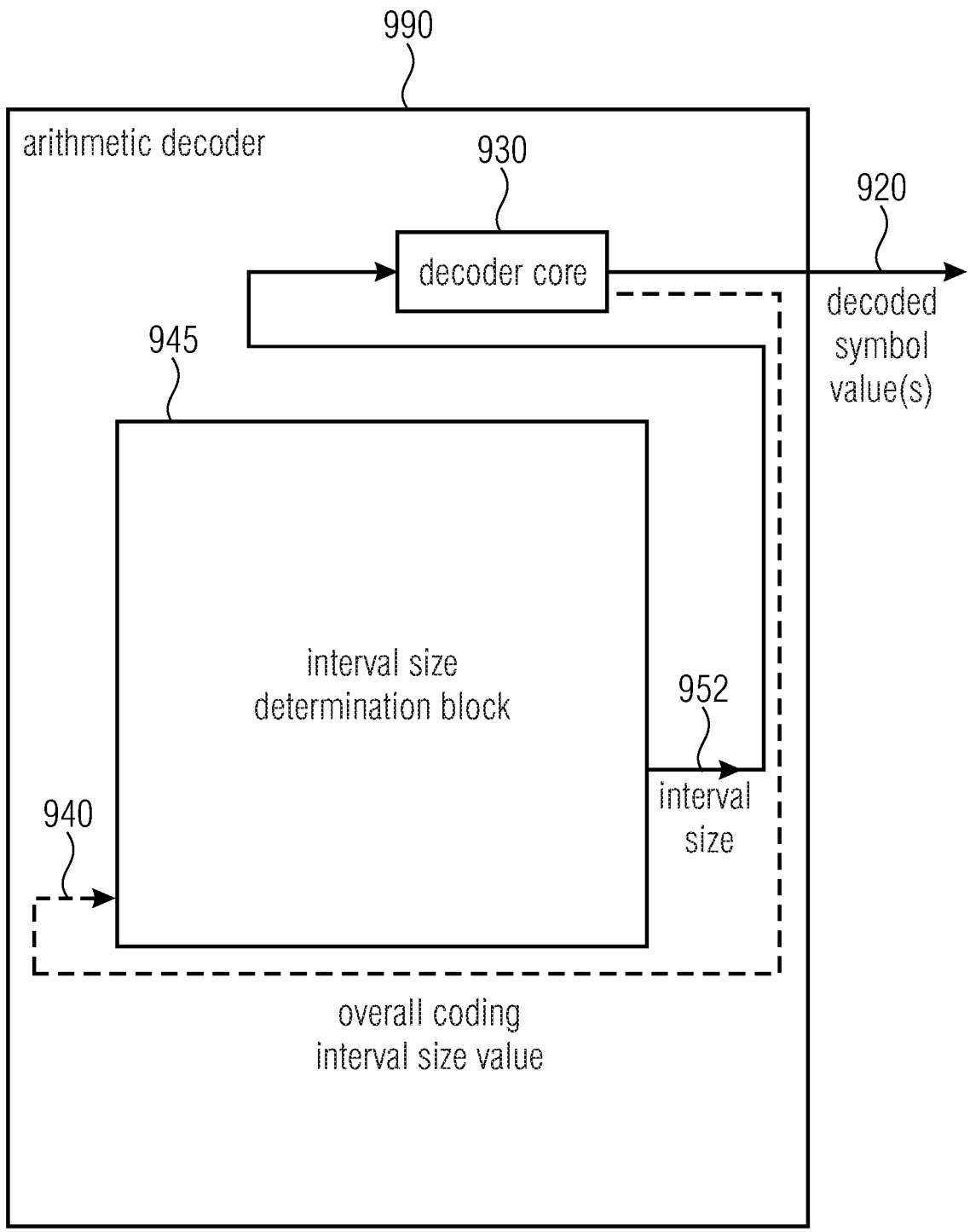
FIG. 9 illustrates an arithmetic decoder according to an embodiment.

1.4 Arithmetic Encoder 810 and Arithmetic Decoder 990 According to FIGS. 8 and 9

FIG. 8 illustrates an arithmetic encoder 810 according to an embodiment of the invention, e.g. according to the third aspect. The arithmetic encoder 810 may correspond to any of the arithmetic encoders 110, 310, 510.

The arithmetic encoder receives one or more symbol values 820 to be encoded. The arithmetic encoder 810 comprises an encoder core 830, which may correspond to the encoder core 130, for encoding the symbol value 820 to be encoded. The arithmetic encoder 810 comprises an interval size determination block 845, which may correspond to the interval size determination block 545. The interval size determination block is to derive an interval size 852, which may correspond to the interval size 152, 352, 552. The interval size determination block 845 comprises an interval size information determination 860 and an interval size determination 850. The interval size information determination 860 is to determine an interval size information 862. The interval size information determination 860 and the interval size information 862 may correspond to the interval size information determination 160, 360, 560 and the interval size information 162, 362, 562, respectively. The interval size determination 850 determines the interval size 852 on the basis of the interval size information 862 and an overall coding interval size value 840. The overall coding interval size value 840 may respond to the overall coding interval size value 140, 340, 540. The interval size 852 is associated with a symbol value out of a plurality of possible symbol values. The interval size determination 850 determines the interval size 852 by applying a bit shift operation 858 to the overall coding interval size value 840. A number of bits by which the overall coding interval size value 840 is shifted, is determined by a shift count value 854. The interval size determination 850 comprises a shift count value determination 853 for determining the shift count value 854 on the basis of the interval size information 862. The interval size information 862 is represented by an integer value representation, e.g., $P_{LPS}$. The shift count value determination 853 uses a determination of a bit position of a most significant non zero bit of an operand value, which is increased or decreased with respect to the integer value representation of the interval size information 862.

For example, the shift count value determination 853 may correspond to this shift count value determination 753. Accordingly, the shift count value determination 853 may be supplemented by or combined with any of the features, functionalities and details described with respect to the shift count value determination 753.

For example, the interval size information determination 860 may correspond to the interval size information determination 760 discussed with respect to FIG. 7. For example, the interval size information determination 860 may derive the interval size information 862 on the basis of state variable values, e.g., $a_t$, $b_t$, which may be determined, for example, as described with respect to the state variable value determination 763. In particular, the state variable values may be initialized as described with respect to the state variable value initialization 770. For example, the initial state variable value determination 773 may apply a bit shift operation to the initial probability value 772.

For example, the arithmetic encoder 810 may operate in a first operation mode (e.g. a high efficiency mode or a normal mode) and a second operation mode (e.g. a high throughput mode), as described with respect to the arithmetic encoders 310, 510. For example, the provision of the interval size information 862 and the determination of the interval size 852 may depend on the operation mode, as described with respect to the arithmetic encoders 310, 510. In other words, the arithmetic encoder 810 may be supplemented by the operation mode dependent determination of the interval size 852 as described with respect to the previous embodiments. In case the operation mode dependent determination of the interval size 852 is implemented in the arithmetic encoder 810, initialization parameters that are used for determining the interval size information 862, for example, in the first operation mode, may be used for determining initial value of the shift count value 854. For example, the interval size information determination 860 may determine, based on one or more initialization parameters, for example, the context model initialization parameter 776, initial values of one or more source statistic values, e.g., $a_t$, $b_t$, which are used for the derivation of the interval size information 862. For example, the interval size determination 850 may determine the initial value of the shift count value 854 on the basis of the initial value determined for the interval size information 862, or may alternatively determine the initial value of the shift count value 854 on the basis of the initialization parameters used for determining the initial value of the interval size information 862.

FIG. 9 illustrates an arithmetic decoder 990 according to an embodiment of the invention, e.g. according to the third aspect. The arithmetic decoder 990 may correspond to any of the arithmetic decoders 290, 490, 690.

The arithmetic decoder 990 is to provide one or more decoded symbol values 920, which may correspond to the decoded symbol values 220, 420, 620. The arithmetic decoder 990 comprises a decoder core 930 for decoding the decoded symbols 920. The decoder core 930 may correspond to the decoder core 230. The arithmetic decoder 990 further comprises an interval size determination block 945 for determining an interval size 952 on the basis of an overall coding interval size value 940. The interval size determination block 945 may correspond to the interval size determination block 845 of FIG. 8. For example, the interval size determination block 945 may use a plurality of previously decoded symbol values, where the interval size determination block 845 is to use a plurality of previously encoded symbol values. Accordingly, the interval size determination block 945 may use the decoded symbol value 920 to update the plurality of previously decoded symbol values where the interval size determination block 845 uses the symbol to be encoded 820 to update the plurality of previously encoded symbol values.

The arithmetic encoder 810 and the arithmetic decoder 990 may be supplemented by or combined with any of the features, functionalities and the details described herein with respect to the other embodiments, both individually or in combination.

Figure 10:
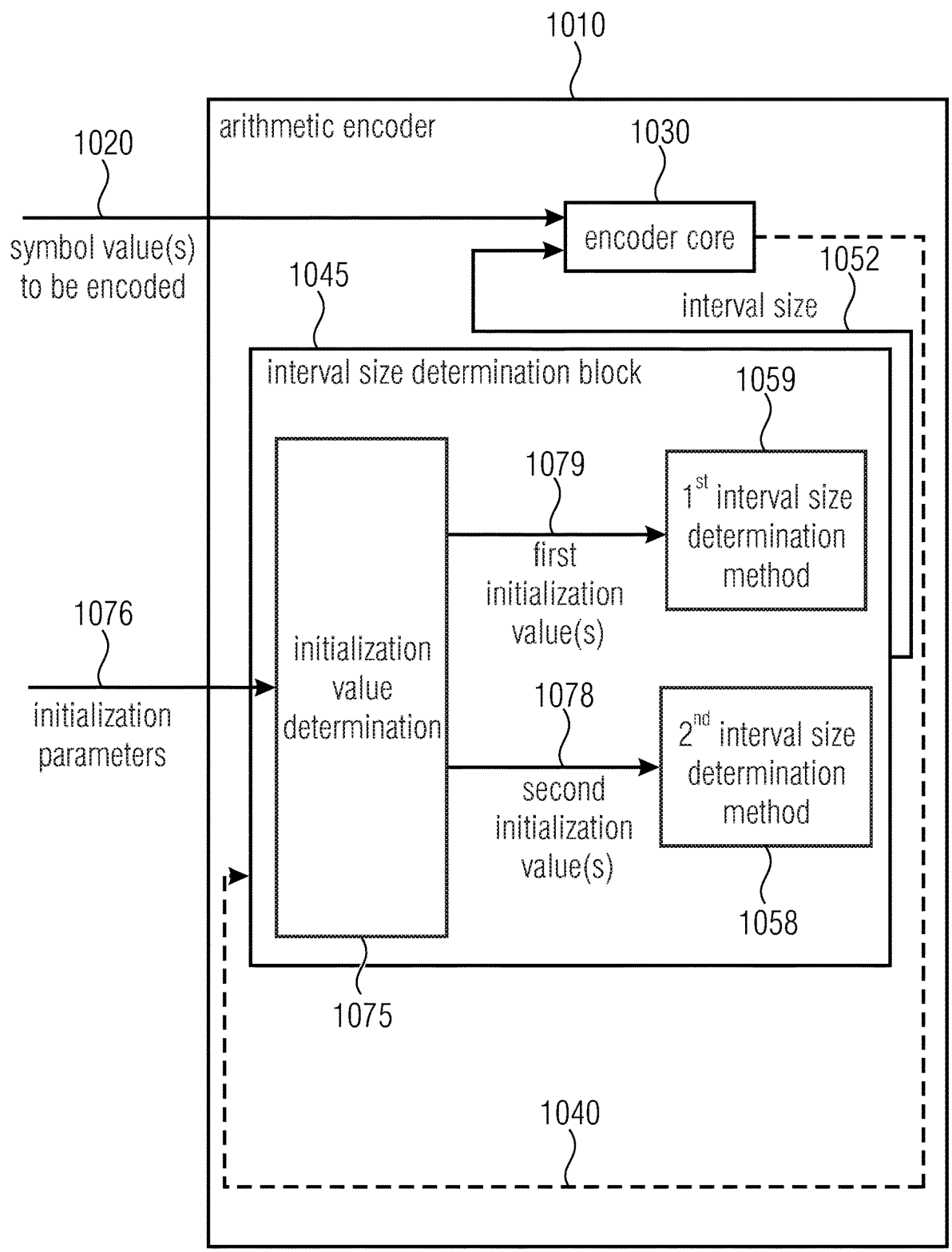
FIG. 10 illustrates an arithmetic encoder according to an embodiment.
Figure 11:
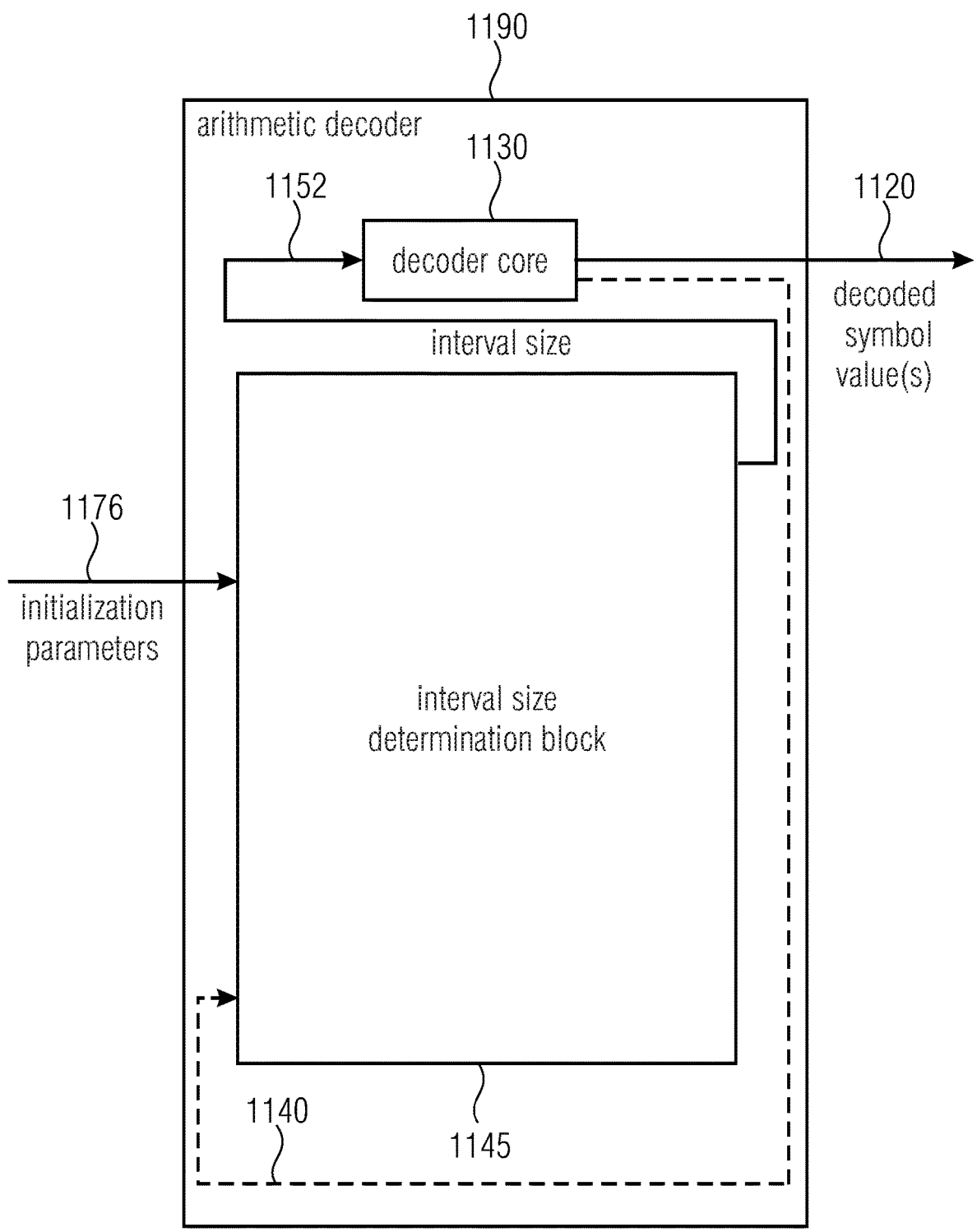
FIG. 11 illustrates an arithmetic decoder according to an embodiment.

1.5 Arithmetic Encoder 1010 and Arithmetic Decoder 1190 According to FIG. 10 and FIG. 11

FIG. 10 illustrates an arithmetic encoder 1010 according to an embodiment of the invention, e.g. according to the fourth aspect. The arithmetic encoder 1010 may correspond to any of the arithmetic encoders 110, 310, 510, 810. The arithmetic encoder 1010 comprises an encoder core 1030 for encoding one or more symbol values 1020 to be encoded. The encoder core 1030 and the symbol values 1020 to be encoded may correspond to the encoder core 130 and the symbol value 120, 320, 520, 820, respectively.

The arithmetic encoder comprises an interval size determination block 1045, which may correspond to the interval size determination block 545, 845. The interval size determination block 1045 is to determine an interval size 1052 that may correspond to the interval size 152, 352, 552, 852. The interval size determination block 1045 may, for example, determine the interval size 1052 on the basis of an overall coding interval size value 1040, which may correspond to the overall coding interval size value 140, 340, 540, 840. The arithmetic encoder may, for example, by operated in one of a first operation mode (e.g. a high efficiency mode or a normal mode) and a second operation mode (e.g. a high throughput mode). In a first mode, the interval size determination block 1045 determines the interval size 1052 using a first interval size determination method 1059. For example, the first interval size determination method 1059 may comprise a multiplication. For example, the first interval size determination 1059 may correspond to the multiplication operation 759. In the second operation mode, the interval size determination block 1045 determines the interval size 1052 by using a second interval size determination method 1058. The second interval size determination method 1058 may comprise a bit shift operation. For example, the second interval size determination method 1058 may correspond to the bit shift operation 758.

The arithmetic encoder 1010 is to obtain one or more initialization parameters 1076, which may correspond to the context model initialization parameter 776. The interval size determination block 1045 comprises an initialization value determination 1075. The initialization value determination 1075 obtains one or more first initialization values 1079 on the basis of the initialization parameters 1076. The first interval size determination method 1059 may use the first initialization values 1079 for determining the interval size 1052. The initialization value determination 1075 further determines one or more second initialization values 1078 on the basis of the initialization parameters 1076. The second interval size determination method 1058 uses the second initialization values 1078 for determining the interval size 1052. For example, the initialization value determination 1075 may, in dependence on the operation mode, determine either the first initialization values 1079 or the second initialization values 1078.

For example, the second initialization value 1078 may correspond to a shift count value, for example, the shift count value 554, 754, 854, or an initial value thereof.

For example, the first initialization value 1079 may comprise one or more source statistic values or state variable values, e.g., $a_t$ and $b_t$. For example, the initialization value determination 1075 may determine the one or more first initialization values using a first mapping, which linearly maps, except for one or more clipping operations and one or more rounding operations, an intermediate probability value, e.g., $P_{CLIP}$, obtained on the basis of the initialization parameters 1076 onto the first initialization values 1079.

For example, the initialization value determination 1075 may determine the one or more second initialization values 1078 using a logarithmic compression of an operand value, which is equal to the intermediate probability value, e.g., $P_{CLIP}$, or which is based on the intermediate probability value, to reduce a range of values. Alternatively, the initialization value determination 1075 may determine the one or more second initialization values 1078 using a quantization to a grid in a logarithmized domain of an operand value that is equal to the intermediate probability value, or which is based on the intermediate probability value.

For example, additionally or alternatively, the initialization value determination 1075 may determine the one or more second initialization values 1078 using a second mapping, which comprises a computation of a logarithmic of an operand value, which is equal to the intermediate probability value, or which is based on the intermediate probability value, and the rounding of a result of the computation of the logarithmic to an integer value.

For example, the initialization value determination 1075 may determine the first initialization values 1079 according to the state variable value initialization 770 of FIG. 7. Accordingly, the first interval size determination method 1059 may comprise the interval size information determination core 765 for determining the interval size information and may further comprise the first computation rule 755 for determining the interval size 1052 on the basis of the interval size information.

For example, the initialization value determination 1045 may determine the second initialization values 1078 by determining the interval size information according to the interval size information determination core 765 based on the initialization parameters 1076 as described with respect to the interval size information determination 760. The initialization value determination 1075 may, for example, determine the second initialization value 1078, for example the shift count value, based on the interval size information, for example, by using the shift count value determination 753.

According to one example, the initialization value determination 1075 may determine the one or more first initialization values, $a_t$ and/or $b_t$ according to $$a_t = P_{clip} << (BITS_a - const64)$$

$$b_t = P_{clip} << (BITS_b - const64)$$

wherein the arithmetic encoder is configured to obtain the intermediate probability value $P_{clip}$ according to $$P_{clip} = \min(const60, \max(const61, P_{init}))$$

$$P_{init} = ((slope \cdot (qp - const62)) >> const63) + offset$$

wherein slope is a first initialization parameter, e.g. of the initialization parameters 1076; wherein offset is a second initialization parameter, e.g. of the initialization parameters 1076; wherein qp is a third initialization parameter, e.g. of the initialization parameters 1076; wherein const60 is a predetermined value; wherein const61 is a predetermined value; wherein const62 is a predetermined value; wherein const63 is a predetermined value; wherein const64 is a predetermined value; wherein $BITS_a$ is a number of bits used for a representation of the first source statistic value $a_t$; wherein $BITS_b$ is a number of bits used for a representation of the first source statistic value $b_t$.

For example, the one or more second initialization values 1078 may be determined by the initialization value determination 1075 according to $$g_{LPS} = const1 - \lfloor \log_2(P_{LPS} + (P_{LPS} >> const2) + const3) \rfloor$$

or according to $$g_{LPS} = \min(g_{MAX}, const1 - \lfloor \log_2(P_{LPS} + (P_{LPS} >> const2) + const3) \rfloor)$$

or according to $$g_{LPS} = \text{const1} - \lfloor \log_2(\text{const2'} * P_{LPS} + \text{const3}) \rfloor$$

or according to $$g_{LPS} = \min(g_{MAX}, \text{const1} - \lfloor \log_2(\text{const2'} * P_{LPS} + \text{const3}) \rfloor)$$

wherein $P_{LPS}$ is equal to $P_{clip}$ or based on $P_{clip}$, wherein $P_{clip}$ is obtained according to $$P_{clip} = \min(\text{const60}, \max(\text{const61}, P_{init}))$$

$$P_{init} = ((\text{slope} \cdot (qp - \text{const62})) >> \text{const63}) + \text{offset}$$

wherein slope is a first initialization parameter, e.g. of the initialization parameters 1076;
wherein offset is a second initialization parameter, e.g. of the initialization parameters 1076;
wherein qp is a third initialization parameter, e.g. of the initialization parameters 1076;
wherein const60 is a predetermined value; wherein const61 is a predetermined value;
wherein const62 is a predetermined value; wherein const63 is a predetermined value;
wherein const 1 is a predetermined value; wherein const 2 is a predetermined value;
wherein const 2' is a predetermined value; wherein const3 is a predetermined value;
wherein $g_{MAX}$ is a predetermined value; wherein ">>" is a shift-to-the-right operator;
wherein log 2 is a logarithm operator to base 2; wherein $\lfloor \ldots \rfloor$ is a ceiling operator.

FIG. 11 illustrates an arithmetic decoder 1190 according to an embodiment of the invention, e.g. according to the fourth aspect. The arithmetic encoder 1190 may correspond to any of the arithmetic decoder 290, 490, 690, 990. The arithmetic decoder 1190 comprises a decoder core 1130, which may correspond to the decoder core 230.

The decoder core 1130 is to decode symbol values to be decoded so as to provide one or more decoded symbol values 1120. The decoded symbol values 1120 may correspond to the decoded symbol values 220, 420, 620, 920. The arithmetic decoder 1190 comprises an interval size determination block 1145 for determining an interval size 1152 for the decoding 1130 of the symbol values to be decoded. The interval size determination block 1145 corresponds to the interval size determination block 1045 described with respect to FIG. 10, wherein previously encoded symbol values may be replaced by previously decoded symbol values, and wherein the initialization parameters 1076 may correspond to initialization parameters 1176, which are received by the arithmetic decoder 1190. The interval size determination block 1145 may determine an interval size 1152, which may correspond to the interval size 1152, on the basis of an overall coding interval size value 1140, which may correspond to the overall coding interval size value 1040.

The arithmetic encoder 1090 and the arithmetic decoder 1190 may be supplemented by or combined with any of the features, functionalities, and details described herein with respect to the other embodiments, both individually or taken in combination. In particular, the first and the second interval size determination methods 1059, 1058 may be implemented as described with respect to the first and the second computation rules 555, 557. The implementation of the first and the second operation mode may be according to the previous embodiments.

Figure 12:
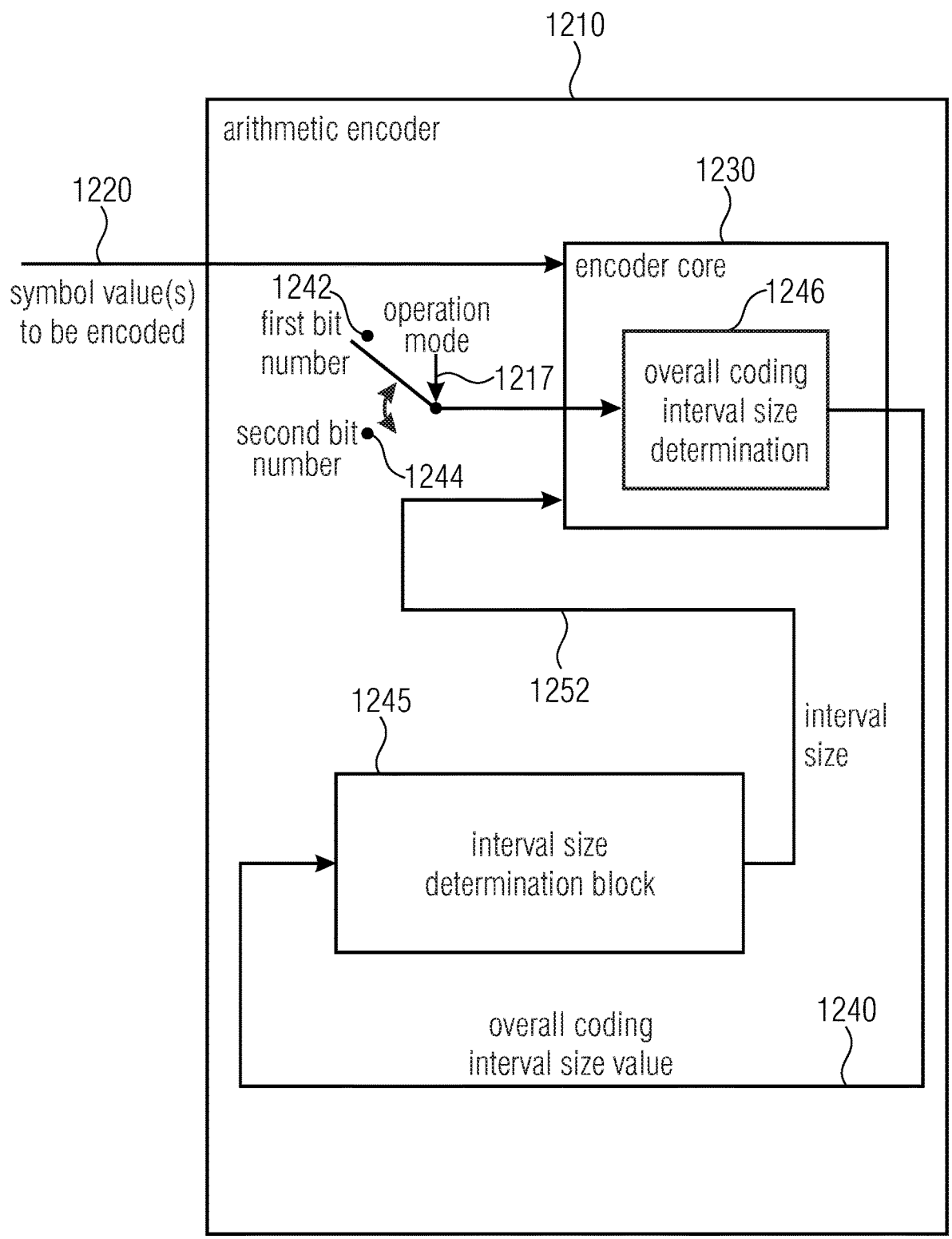
FIG. 12 illustrates an arithmetic encoder according to an embodiment.
Figure 13:
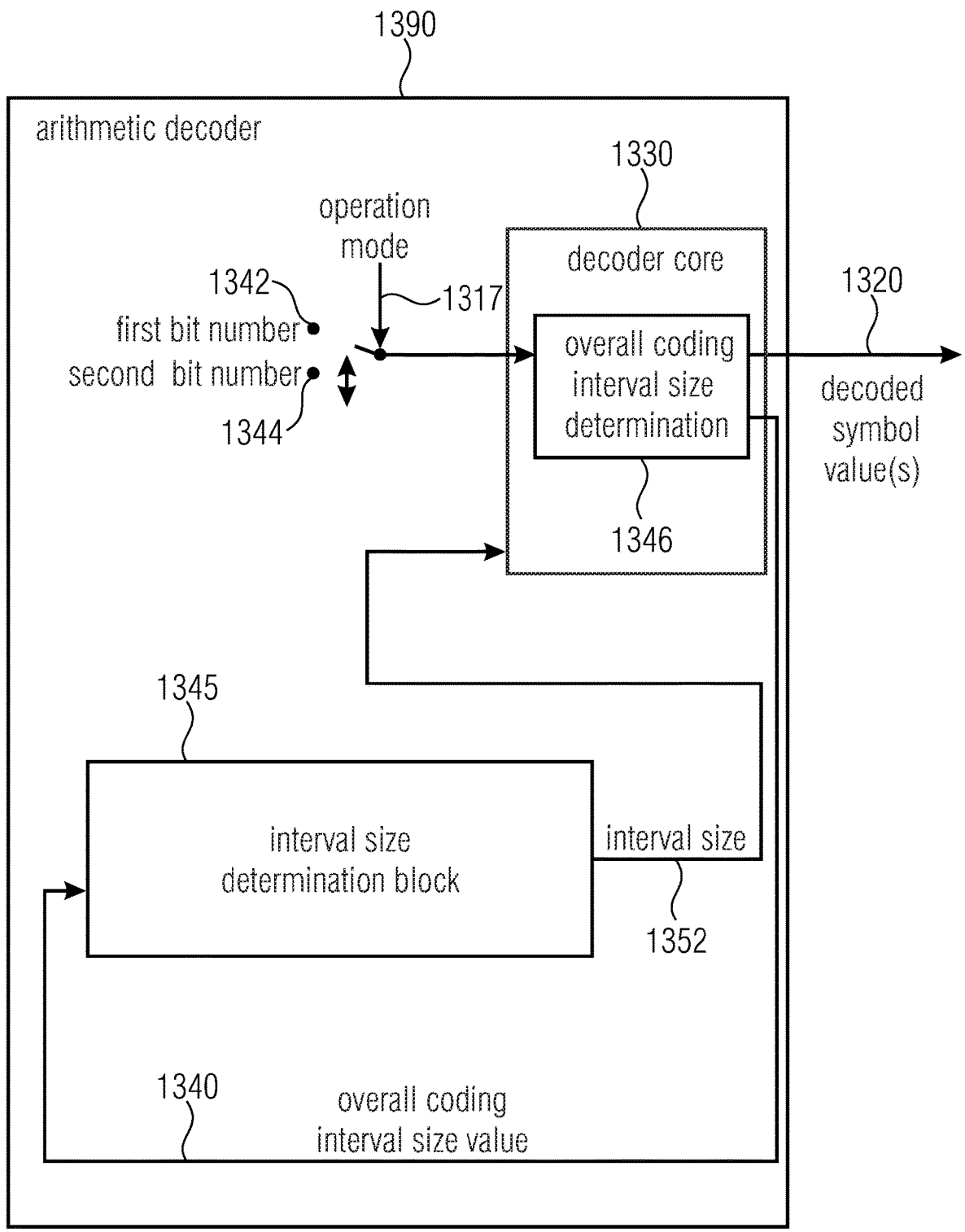
FIG. 13 illustrates an arithmetic decoder according to an embodiment.

1.6 Arithmetic Encoder 1210 and Arithmetic Decoder 1310 According to FIG. 12 and FIG. 13

FIG. 12 illustrates an arithmetic encoder 1210 according to an embodiment of the invention, e.g. according to the fifth aspect. The arithmetic encoder 1210 may correspond to any of the arithmetic encoders 110, 310, 510, 810, 1010.

The arithmetic encoder 1210 comprises an encoder core 1230 to encode one or more symbol values 1220 to be encoded. For example, the encoder core 1230 may correspond to the encoder core 130. The arithmetic encoder 1210 comprises an interval size determination block 1245. The interval size determination block 1245 is to determine an interval size 1252 for the encoding 1230 of the symbol value 1220 to be encoded. The interval size determination block 1245 determines the interval size 1252 on the basis of an overall coding interval size value 1240. The interval size determination block 1245 may be implemented as or may correspond to any of the interval size determination blocks 145, 345, 545, 845, 1045. Accordingly, the interval size 1252 and the overall coding interval size value 1240 may correspond to the interval size 152, 352, 552, 852, 1052 and the overall coding interval size value 140, 340, 540, 840, 1040, respectively.

The interval size determination block 1245 is to determine an interval size information based on the overall coding and the overall size value 1214, and is further to determine the interval size 1252 on the basis of the interval size information. The interval size 1252 is associated with a symbol value out of a plurality of possible symbol values. For example, the encoder core 1230 may provide the overall coding interval size value 1240, for example, as explained with respect to the encoder core 130. For example, the encoder core 1230 may comprise an overall coding interval size determination 1246.

The arithmetic encoder 1210 may operate in a first operation mode and a second operation mode, for example, as explained with respect to the arithmetic encoder 310, 510. For example, the operation mode may be indicated by an operation mode information 1217, which may correspond to the operation mode indication 317, 517. In the first operation mode, the arithmetic encoder may use a first bit number 1242 for a representation of the overall coding interval size value 1240. In the second operation mode, the arithmetic encoder 1210 may use a second bit number 1244 for representing the overall coding interval size value 1240. The first bit number 1242 is higher than the second bit number 1244.

For example, the first bit number 1242 may be referred to as $\text{BITS}_{R1}$. For example, the second bit number 1244 may be referred to as $\text{BITS}_{R2}$.

For example, the overall coding interval size determination 1246 may determine the overall coding interval size value 1240 so that the overall coding interval size value 1240 is within an interval $$[1 << (\text{BITS}_{R1} - 1), (1 << \text{BITS}_{R1}) - 1]$$

before an encoding of a symbol value, wherein the arithmetic encoder is configured to represent the coding interval size with $\text{BITS}_{R1}$ bits in the first mode, and wherein the arithmetic encoder is configured to represent the coding interval size with $\text{BITS}_{R2}$ bits in the second mode, wherein $\text{BITS}_{R2} < \text{BITS}_{R1}$.

For example, the overall coding interval size determination 1246 may determine the overall coding interval size value so that the overall coding interval size value 1240 is within an interval $$[1 << (\text{BITS}_R - 1), (1 << \text{BITS}_R) - 1]$$

wherein the arithmetic encoder is configured to represent the coding interval size with $BITS_{R1}$ bits in the first mode, and wherein the arithmetic encoder is configured to represent the coding interval size with $BITS_{R2}$ bits in the second mode, wherein $BITS_{R2} < BITS_{R1}$.

Wherein the variable bits may be set to the first bit number 1242, e.g., bits are 1, in the first operation mode, and wherein the variable bits may be set to the second bit number 1244, e.g., bits are 2, in the second operation mode.

For example, the interval size determination block 1245 may determine the interval size 1252 in dependence on the operation mode, as described with respect to the previous embodiments. For example, in the first operation mode, the interval size 1252 may be determined by applying a multiplication operation to the overall coding interval size value 1240 and the interval size information. For example, in the second operation mode, the interval size 1252 may be determined by applying a bit shift operation to the overall coding interval size value 1240, wherein the number of bits by which the overall coding interval size value 1240 is shifted may be determined by a shift count value, e.g., the shift count value 554, 754, 854. For example, the shift count value may be limited to a first maximum value in the first operation mode and may be limited to a second maximum value in the second operation mode. The first maximum value for the shift count value may be larger than the second maximum value.

The first bit number may be adapted to the first maximum value for the shift count value, so that a shifting of the overall coding interval size value 1240, represented by a number of bits defined by the first bit number 1242, results in a non-zero value. The second bit number 1244 may be adapted to the second maximum value for the shift count value, so that a shifting of the overall coding interval size value 1240, represented by a number of bits defined by the second bit number 1244, results in a non-zero value.

The feature of adapting the bit number, with which the overall coding interval size value 1240 is represented to the operation mode, may be combined with any of the features described in the previous embodiments. That is, the overall coding interval size value 140, 340, 540, 740, 840, 1040 may be represented by the first number of bits in the first operation mode may be represented by the second number of bits in the second operation mode. For example, the bit shift operation for determining the interval size 152, 352, 552, 752, 852, 1052 may be adapted to the number of bits with which the overall coding interval size value is represented.

FIG. 13 illustrates an arithmetic decoder 1390 according to an embodiment of the invention, e.g. according to the fifth aspect. For example, the arithmetic decoder 1390 may correspond to any of the arithmetic decoders 290, 490, 690, 990, 1190.

The arithmetic decoder comprises a decoder core 1330, e.g. the decoder core 230, for decoding one or more symbols to be decoded so as to provide one or more decoded symbol values 1390. The arithmetic decoder comprises an interval size determination block 1345 for providing an interval size 1352 for the decoding 1330 of the symbol values to be decoded. The interval size determination block 1345 corresponds to the interval size determination block 1245, wherein for example, instead of previously encoded symbol values or previously decoded symbol values may be used. Accordingly, the interval size value 1352 and the overall coding interval size value 1340, based on which the interval size determination block 1345 determines the interval size 1352, may correspond to the interval size 1252 and the overall coding interval size value 1240. Analog to the description of the arithmetic encoder 1210, the arithmetic decoder 1390 may operate in a first operation mode and a second operation mode, which may be indicated by an operation mode information 1317, which may correspond to the operation mode information 1217. The decoder core 1330 may comprise an overall coding interval size determination 1346 for determining the overall coding interval size value 1340. In the first operation mode, the overall coding interval size determination uses a first bit number 1342, which may correspond to the first bit number 1242, for representing the overall coding interval size value 1340. In the second operation mode, the overall coding interval size determination 1346 may use a second bit number 1344, which may correspond to the second bit number 1244, for representing the overall coding interval size value 1340.

For example, the overall coding interval size determination 1246, 1346 may provide the overall coding interval size value as a predetermined value, or as a result of the decoding of the symbol value to be encoded, as described with respect to the encoder core 130 and the decoder core 230.

The arithmetic encoder 1210 and the arithmetic decoder 1390 may be supplemented by or combined with any of the features, functionalities, and details described herein with respect to the other embodiments.

1.7 Arithmetic Encoder 1410 and Arithmetic Decoder 1890 According to FIGS. 14 to 18

Figure 14:
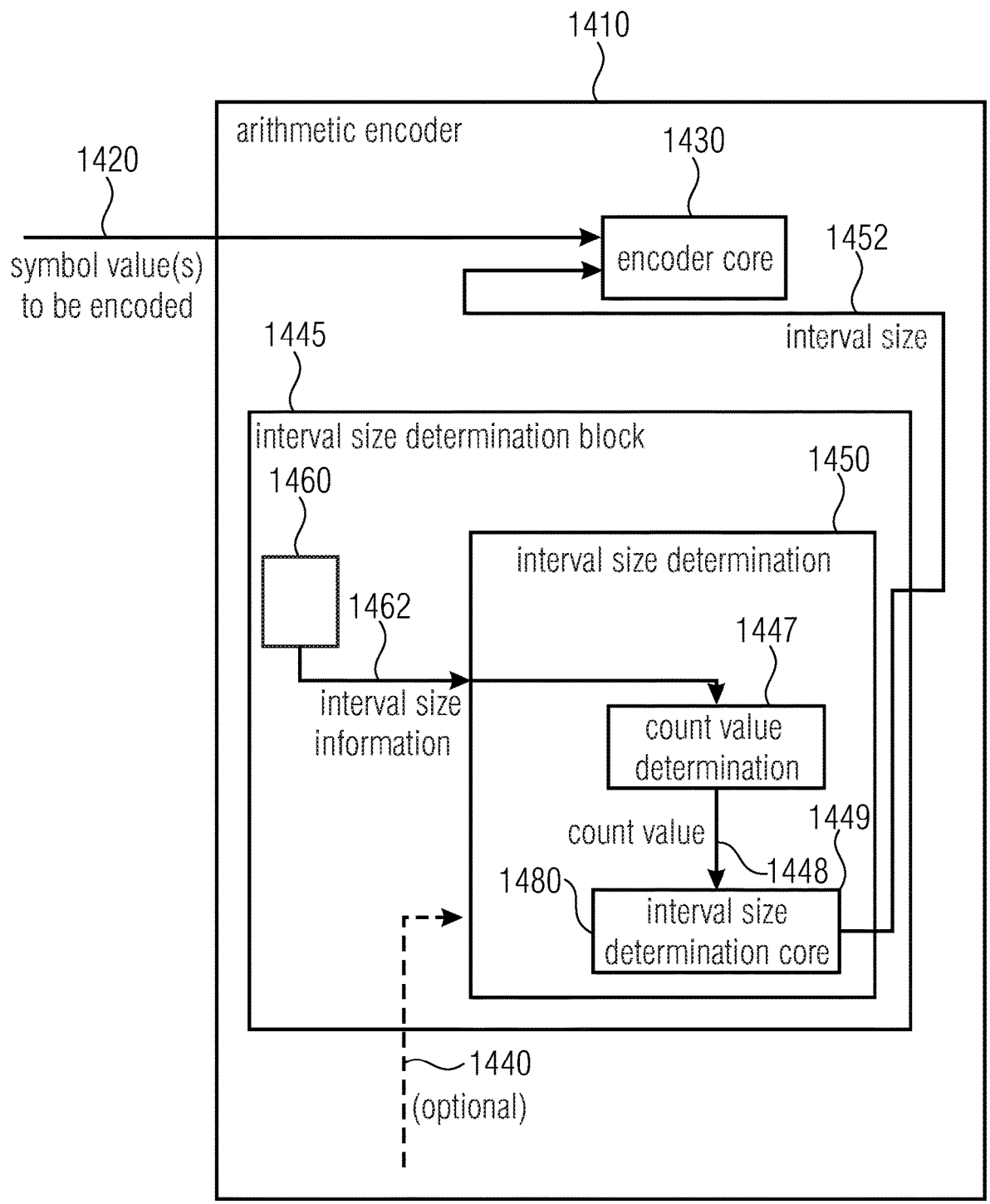
FIG. 14 illustrates an arithmetic encoder according to an embodiment.

FIG. 14 illustrates an arithmetic encoder 1410 according to an embodiment of the invention, e.g. according to the sixth aspect. For example, the arithmetic encoder 1410 may correspond to any of the arithmetic encoders 110, 310, 510, 810, 1010, 1210.

The arithmetic encoder 1410 comprises an encoder core 1430 for encoding one or more symbol values 1420 to be encoded. For example, the encoder core 1430 may correspond to the encoder core 130.

The arithmetic encoder 1410 comprises an interval size determination block 1445. The interval size determination block 1445 comprises an interval size information determination 1460 for determining an interval size information 1462. The interval size determination block further comprises an interval size determination 1450 for deriving an interval size 1452 on the basis of the interval size information 1462. The interval size 1452 is provided for the encoding 1430 of the symbol value 1420 to be encoded. The interval size determination block may, for example, correspond to the interval size determination block 145, 345, 545, 845, 1045, 1245. The interval size determination block 1445 determines the interval size 1452 optionally on the basis of an overall coding interval size value 1440. For example, the overall coding interval size value 1440 may correspond to the overall coding interval value 110, 310, 510, 810, 1010, 1210.

The interval size determination 1450 comprises account value determination 1447, which is to derive a count value 1448 on the basis of an integer value representation of the probability value 1462, that is the interval size information 1462, using a determination of a bit position of a most significant non-zero bit of an operand value, which is decreased or increased with respect to the integer value representation of the interval size information 1462. The interval size determination 1450 further comprises an interval size determination core 1449, which is to obtain the interval size 1452, which is associated with a symbol value out of a plurality of possible symbol values. The interval size determination core 1449 is to obtain the interval size 1452 using the count value 1448.

For example, the count value determination 1447 is implemented as may correspond to the shift count value determination 853, 753.

In some examples, the interval size determination block 1445 may determine the interval size 1452 independent from an overall coding interval size value.

Figure 15:
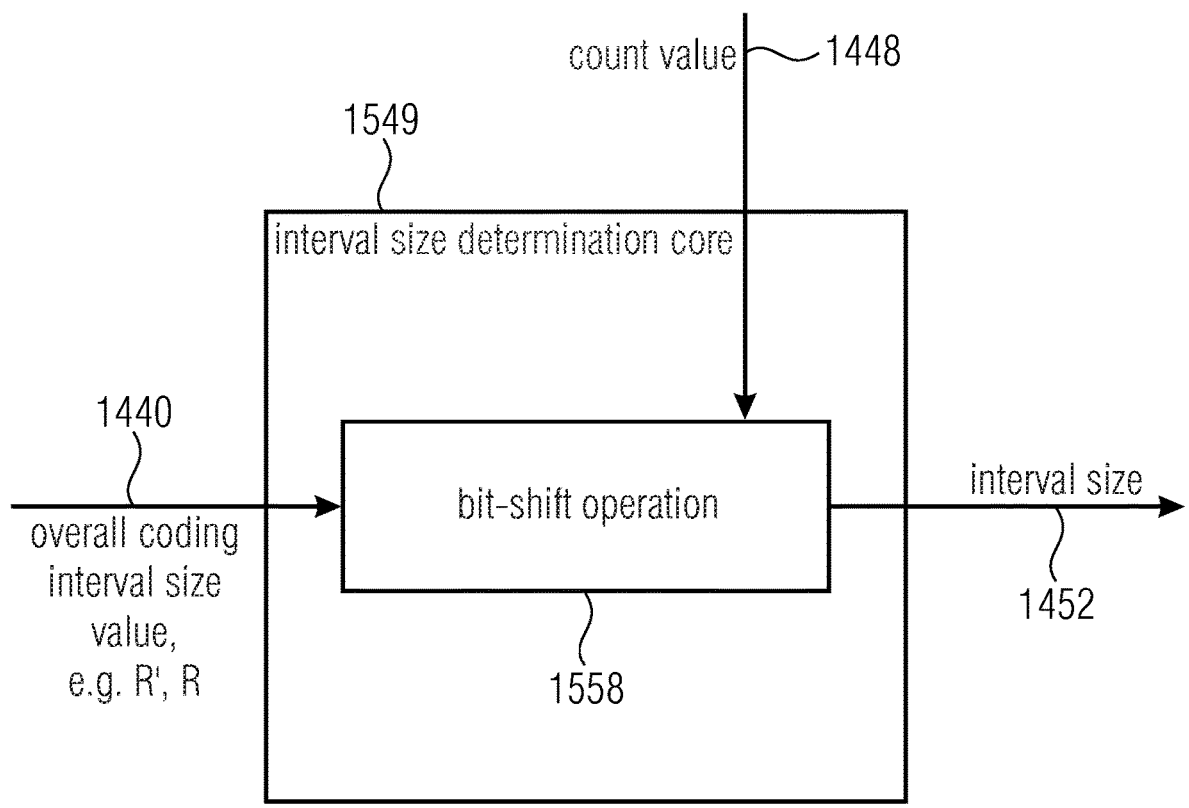
FIG. 15 illustrates an interval size determination core according to an embodiment.

FIG. 15 illustrates an interval size determination core 1549 according to an embodiment, e.g. according to the sixth aspect. The interval size determination core 1549 may be an implementation of the interval size determination core 1449. For example, the interval size determination core 1549 may determine the interval size 1452 by applying a bit shift operation 1558 to the overall coding interval size value 1440. The overall coding interval size value may be a predetermined value, e.g., R'. for example, the overall coding interval size value 1440 may be set to 384. The bit shift operation 1558 shifts the predetermined value of the overall coding interval size value 1440 by a number of bits, which is determined by the count value 1448.

For example, the bit shift operation 1558 may be implemented according to the bit shift operation 758, 858.

Figure 16:
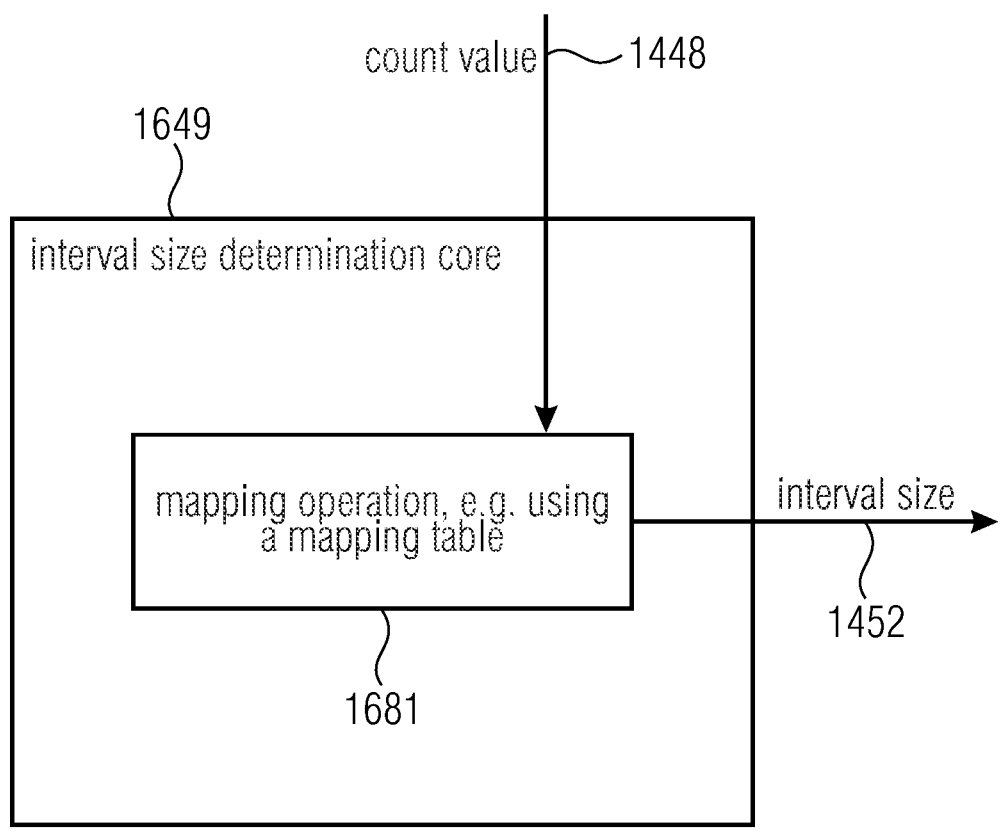
FIG. 16 illustrates an interval size determination core according to an embodiment.

FIG. 16 illustrates an interval size determination core 1649 according to an embodiment, the interval size determination core 1649 may be an example of an implementation of the interval size determination core 1449. The interval size determination core 1649 is configured to map the count value 1448 onto the interval size 1452.

For example, the interval size determination core 1649 comprises a mapping operation 1681. The mapping operation may map the count value 1448 onto a value for the interval size 1452. For example, the mapping operation 1681 may use a mapping function or a mapping table for mapping the count value 1448 onto the interval size 1445.

Figure 17:
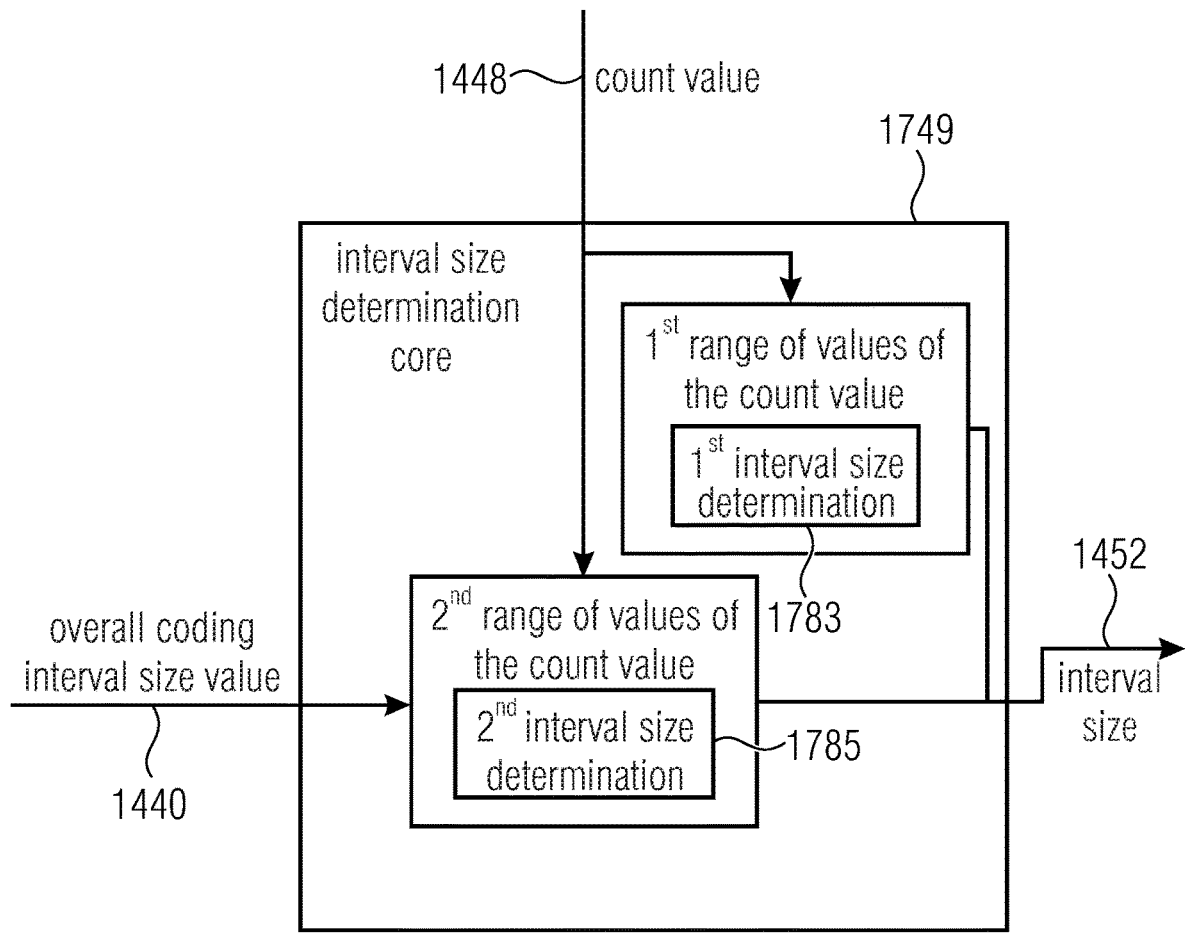
FIG. 17 illustrates an interval size determination core according to an embodiment.

FIG. 17 illustrates an interval size determination core 1749 according to an embodiment. The interval size determination core 1749 may be an implementation of the interval size determination core 1449. The interval size determination core is to determine the interval size 1452 in dependent from the overall coding interval size value 1440 if the count value 1448 lies in a first range of values. For example, if the count value 1448 is within the first range of values, the interval size determination core may determine the interval size 1452 using a first interval size determination 1783. If the count value 1448 lies in a second range of values, which is different from the first range of values, the interval size determination core 1749 determines the interval size 1452 in dependence on the overall coding interval size value 1440.

For example, the overall coding interval size value 1414 may be a predetermined value, for example, as described with respect to FIG. 16, or may depend on the encoding of the previously encoded symbol, for example, as explained with respect to the previous embodiments.

If the count value 1448 is within the second range of values, the interval size determination core 1749 may use a second interval size determination 1785 to determine the interval size 1452.

For example, the second interval size determination 1784 may comprise taking over the current overall coding interval size value 1440 as the interval size 1452.

Alternatively, for example, the second interval size determination 1784 comprises the shift operation, for example a bit shift operation, for example, the bit shift operation 758, 858, 1558, to the current overall coding interval size value 1440 for determining the interval size 1452.

According to an alternative implementation of the interval size determination core 1749, the first interval size determination 1783 depends on the overall coding interval size value 1440. For example, the first interval size determination 1783 may apply a shift operation, e.g., a bit shift operation, e.g., the bit shift operation 758, 858, 1558, to the overall coding interval size value 1440 for determining the interval size 1452. According to this embodiment, the second interval size determination 1785 may take over the current overall coding interval size value 1440 as the interval size 1452.

For example, taking over the overall coding interval size value 1440 as the interval size 1452 may be referred to as a bypass mode.

The implementation of the overall coding interval size value 1440 as a predetermined value, as explained with respect to FIG. 14, may optionally be implemented in any of the arithmetic encoders 110, 310, 510, 810, 1010, 1210. Thus, the overall coding size interval value may optionally not be provided by the encoding 130, 330, 530, 830, 1030, 1230, but may be a predetermined value.

For example, in the second operation mode, the overall coding interval size value may be implemented as a predetermined value, while in the first operation mode, the overall coding interval size value may be determined by the encoding 1430, e.g. as described with respect to the encoder core 130 (or, in case of the decoder, by the decoding, e.g. as described with respect to the decoder core 230).

For example, the first range of values of the count value may be defined by a predetermined threshold value, for example, by 1. For example, the interval size determination core may determine the interval size 1452 according to the first interval size determination 1783, if the count value 1448 exceeds the predetermined threshold value, which may, for example, be 1. If the count value 1448 does not exceed the predetermined threshold value, the interval size determination core 1749 may apply the second interval size determination 1785 for determining the interval size value 1452. For example, the count value 1448 being 1 may correspond to equal probabilities of the two of two binary values for the symbol value to be encoded. In this case, a bypass mode may be used, for example, as described with respect to the second interval size determination 1785.

The interval size determination block 1445 may correspond to any of the interval determination blocks 145, 345, 545, 845, 1045, 1245. For example, the interval size determination 1450 may be an example of an implementation of the interval size determination 150, 350, 550, 850, 1050, 1250 for the second operation mode. For example, the determination of the interval size according to the interval size determination 1450 may be implemented as the second computation rule 557, 757 in a two-mode operation of the arithmetic encoder.

Figure 18:
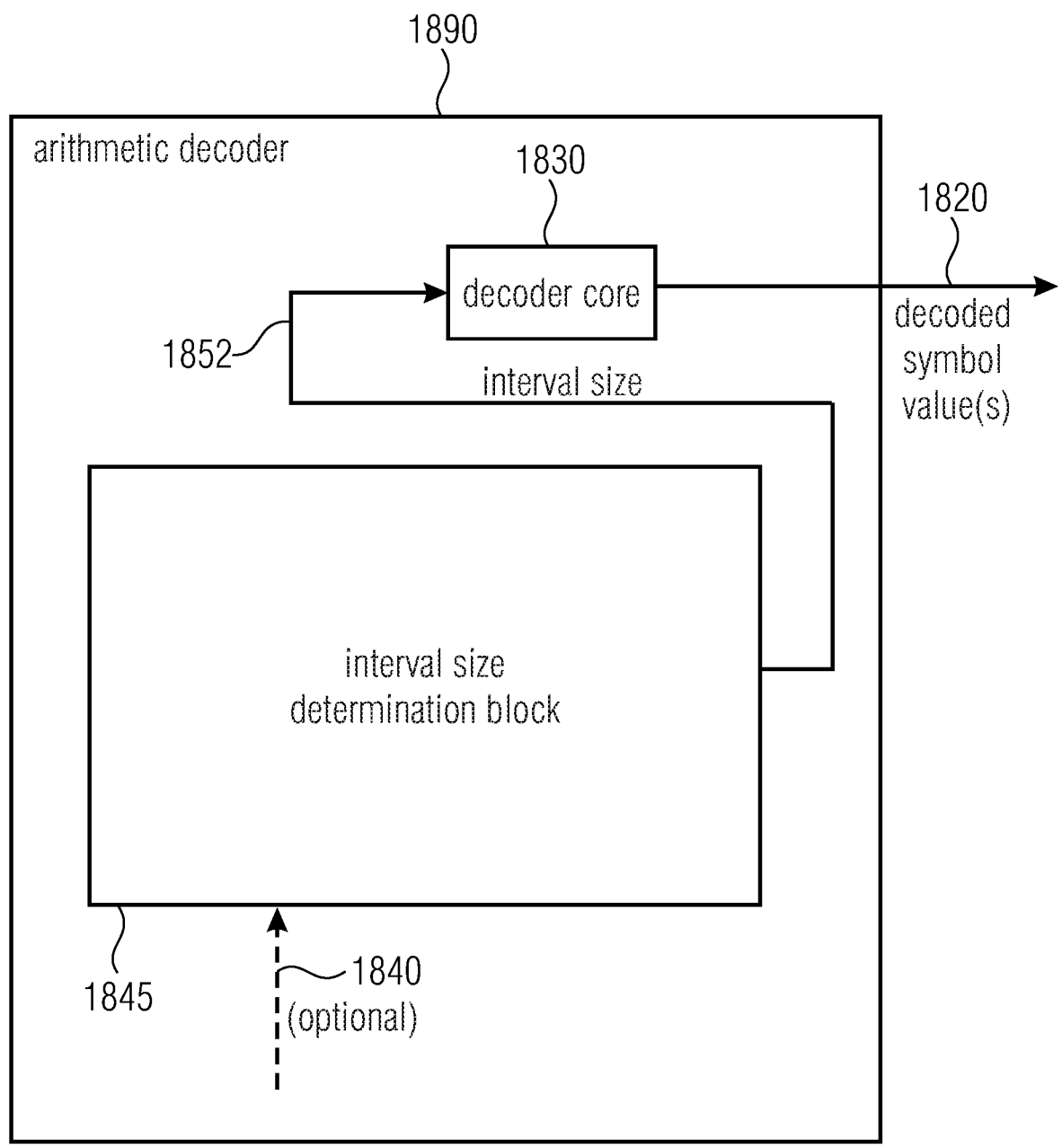
FIG. 18 illustrates an arithmetic decoder according to an embodiment.

FIG. 18 illustrates an arithmetic decoder 1890 according to an embodiment of the invention, e.g. according to the sixth aspect. The arithmetic decoder 1890 may correspond to any of the arithmetic decoders 290, 490, 690, 990, 1190, 1390. The arithmetic decoder 1890 comprises a decoder core 1830 to decode symbol values to be decoded for providing one or more decoded symbol values 1820. The decoder core 1830 may correspond to the decoder core 230. The arithmetic decoder 1890 comprises an interval size determination block 1845 for determining an interval size 1852 for the decoding 1830. The interval size determination block 1845 may correspond to the interval size determination block 1445 of FIG. 14, for example, except for the previously encoded symbol values are replaced with previously decoded symbol values and a decoding replaces an encoding. The interval size determination block 1845 optionally determines the interval size 1852 on the basis of an overall coding interval size value 1840. Accordingly, the interval size 1852 and the overall coding interval size value 1840 may correspond to the interval size 1452 and the overall coding interval size value 1840, respectively.

The arithmetic encoder 1410 and the arithmetic decoder 1890 may optionally be supplemented by or combined with any of the features, functionalities and details described herein with respect to the other embodiments, both individually or in combination.

Figure 19:
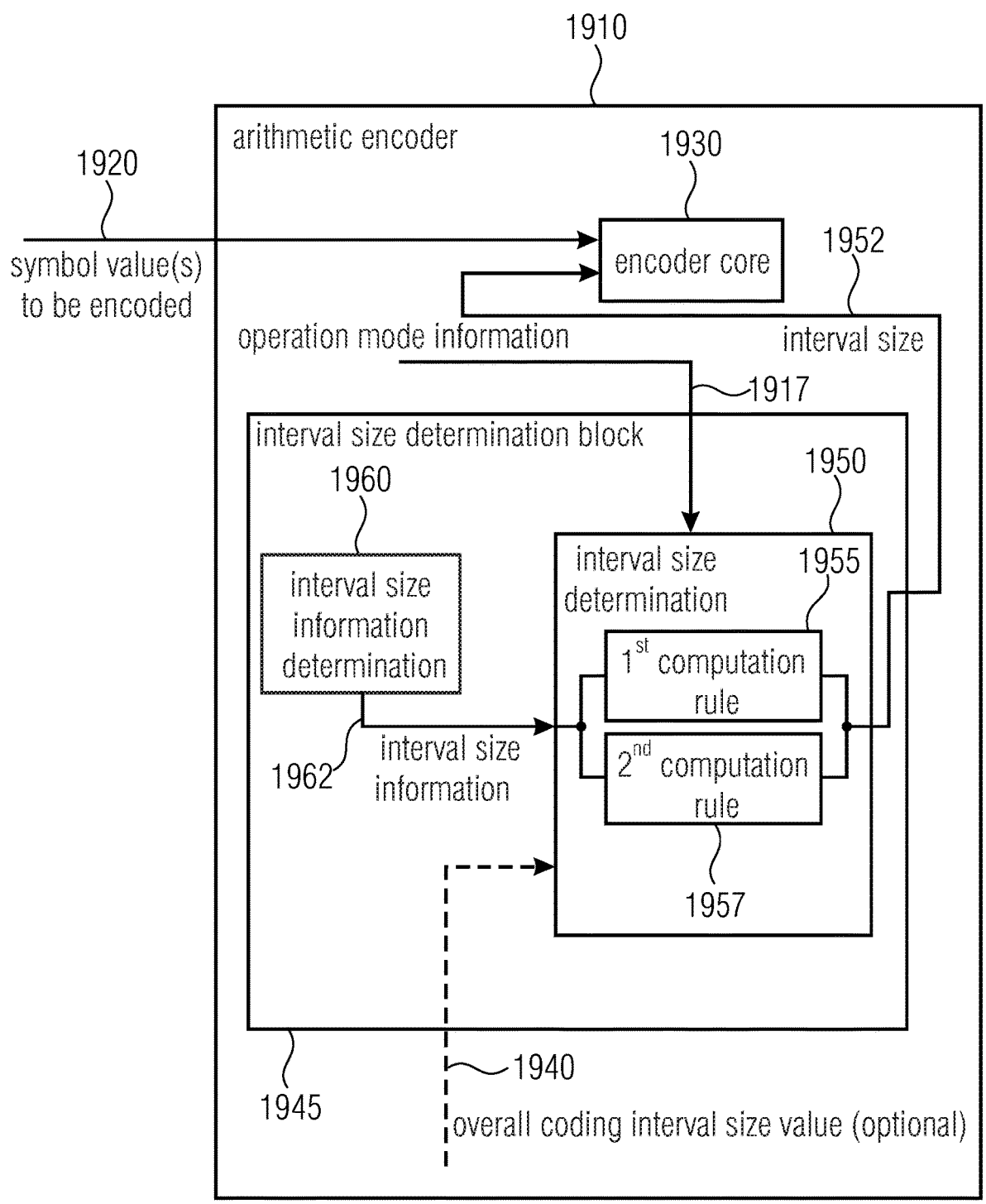
FIG. 19 illustrates an arithmetic encoder according to an embodiment.
Figure 20:
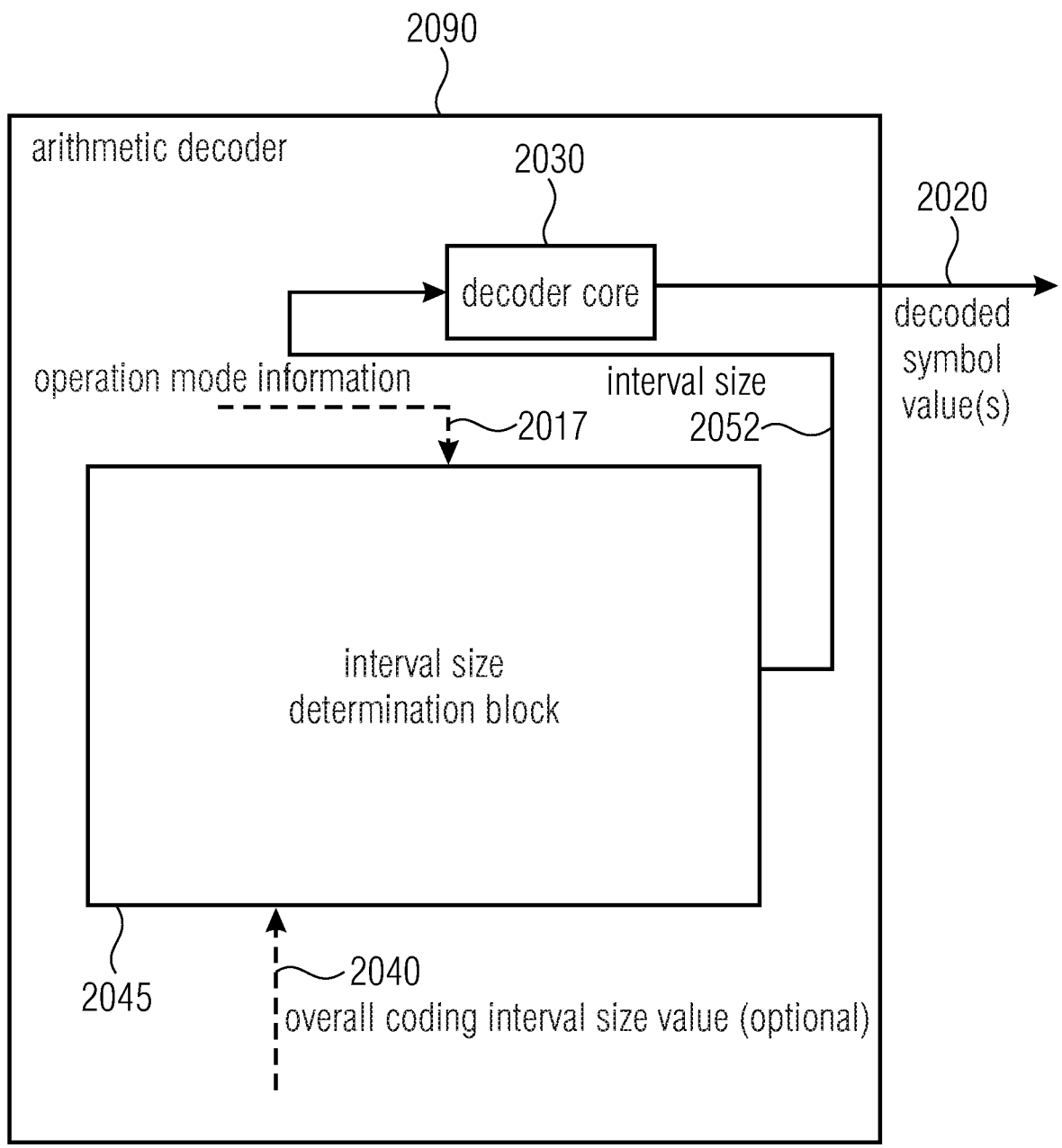
FIG. 20 illustrates an arithmetic decoder according to an embodiment.

1.8 Arithmetic Encoder 1910 and Arithmetic Decoder 2090 According to FIG. 19 and FIG. 20

FIG. 19 illustrates an arithmetic encoder 1910 according to an embodiment of the invention, e.g. according to the seventh aspect. The arithmetic encoder 1910 may correspond to any of the arithmetic encoders 110, 310, 510, 810, 1010, 1210, 1410.

The arithmetic encoder 1910 comprises an encoder core 1930 for encoding one or more symbol values 9020 to be encoded. The encoder core 1930 may, for example, correspond to the encoder core 130. The arithmetic encoder 1910 comprises an interval size determination block 1945 for determining an interval size 1952 for the encoding 1930. Optionally, the interval size determination block determines in the interval size 1952 on the basis of an overall coding interval size value 1940. The interval size determination block comprises an interval size information determination 1960 which is to determine an interval size information 1962. The interval size determination block 1945 further comprises an interval size determination 1950 which is to determine the interval size 1952 on the basis of the interval size information 1962.

The arithmetic encoder 1910 may operate in one of a first operation mode and a second operation mode. For example, the first operation mode may be a normal operation mode and the second operation mode may be a high throughput operation mode. It should be noted that in some embodiments, the first operation mode may be a high throughput operation mode and the second operation mode may be a normal mode.

The interval size determination 1915 may determine the interval size 1952 in dependence on whether the arithmetic encoder 1910 is operating in the first operation mode or in the second operation mode, as may be indicated by an operation mode information 1917 provided to the interval size determination 1950. In the first operation mode, the interval size determination 1915 may determine the interval size 1952 using a first computation rule 1955. In the second operation mode, the interval size determination 1950 may determine the interval size 1952 using a second computation rule 1957. The interval size determination 1950 determines the interval size 1952 on the basis of an interval size information 1962. The interval size information 1962 is determined by an interval size information determination 1960.

The first computation rule 1955 has a first granularity or a first resolution and the second computation rule 1957 has a second granularity or a second resolution. Thus, operating in the first operation mode, the interval size determination 1950 determines the interval size 1952 with the first granularity or first resolution and when operating in the second operation mode, the interval size determination 1950 determines the interval size 1952 in the second granularity or second resolution. The second granularity or the second resolution is coarser than the first granularity or the first resolution.

For example, the interval size determination 1950 may provide the interval size 1952 in a representation having a first number of bits when operating in the first mode, and may provide the interval size 1952 in a representation having a second number of bits when operating in the second mode. The first number of bits is larger than the second number of bits. For example, the first number of bits may be 9 bits and the second number of bits may be 6 bits.

Alternatively, the second computational rule 1957 may provide the interval size 1952 in a representation, in which a plurality of bits, for example the least significant 3 bits, or another number of least significant bits, are set or left at a predetermined value, for example 0, and the first computation rule 1955 may use all bits of the representation of the interval size 1952 for providing the interval size 1952.

Thus, the interval size 1952, when provided by the second computation rule 1957, has a coarser resolution or granularity, as the bits set to the predetermined value may not carry any information.

The interval size determination 1950 may determine the interval size 1952 based on an overall coding interval size value 1940. For example, the overall coding interval size value 1940 may be provided or determined by the encoding 1930. Alternatively, the overall coding interval size value 1940 may be a predetermined value, for example in one or both of the two operation modes, for example in the second operation mode, e.g., the high throughput operation mode, as explained in section 1.7.

In the first operation mode, the arithmetic encoder 1910 may provide the overall coding interval size value 1914 in a representation having a third number of bits. In the second operation mode the arithmetic encoder 1910 may provide the overall coding interval size value 1940 in a representation having a fourth number of bits. The third number of bits is larger than the fourth number of bits.

Alternatively, the arithmetic encoder 1910 may leave a plurality of bits, or set a plurality of bits, e.g., a number of least significant bits, for example the least significant 3 bits of the representation of the overall coding interval size value 1940 at a predetermined bit value, for example 0, when operating in the second mode. In the first operation mode the arithmetic encoder 1910 may instead use all bits of the representation of the overall coding interval size 1940 as information carrying bits.

For example, the first computation rule may be implemented as described with respect to the first computation rule 555, 755 or the first interval size determination method 1059, and the second computation rule 1957 may be implanted as described with respect to the second computation rule 557, 757 or the second interval size determination method 1058.

For example, the first computation rule 1955 may determine the interval size 1952 dependence on the overall coding interval size value 1940, while the second computational rule 1957 may determine the interval size 1952 independent from the overall coding interval size value 1940. For example, the second computation rule 1957 may determine the interval size 1952 either in dependence on or independent of the overall coding interval size value 1940, depending on a value of the interval size information 1962.

For example, the second computation rule 1957 may be implemented according to the interval size determination 1450 described with respect to the FIGS. 14 to 17.

For example, the arithmetic encoder 1910 may initialize the overall coding interval size value 1940 to be a multiple of a predetermined power of 2 when operating in the second operation mode. For example, the arithmetic encoder 1910 may provide the interval size 1952 such that the interval size 1952 is a multiple of the predetermined power of 2, for example 8, for example the predetermined power of 2 in which the overall coding interval size value is initialized, when operating in the second operation mode.

For example, the second computation rule 1957 may determine the interval size 1952 by using a look-up table. For example, the second computation rule 1957 may invite the interval size 1952 by applying a mapping, for example as explained with respect to FIG. 16. For example, entries of the look-up table which may be used for determining the interval size 1952 are multiples of the predetermined power of 2, for example 8, for example the predetermined power of 2 in which the overall coding interval size value 1940 is initialized.

For example, in case that the overall coding interval size value 1940 is a predetermined value, for example R prime, the predetermined value may, for example, be chosen such that bit shifted versions of the predetermined value are multiples of the predetermined power of 2.

FIG. 20 illustrates an arithmetic decoder 2090 according to an embodiment of the invention, e.g. according to the seventh aspect. The arithmetic decoder 2090 may correspond to any of the arithmetic decoder 290, 490, 690, 990, 1190, 1390, 1990.

The arithmetic decoder 2090 comprises a decoder core 2030 for decoding symbol values to be decoded so as to provide one or more decoded symbol values 2020. The arithmetic decoder 2090 comprises an interval size determination block 2045 for determining an interval size 2052 for the decoding 2030 of the symbol values to the decoded. The interval size determination block 2045 may correspond to the interval size determination block 1945 with the exception that previously encoded symbol values may be replaced by previously decoded symbol values and an encoding may be replaced by a decoding. Accordingly, an overall coding interval size value 2040, which may optionally be provided to the interval size determination block 2045, may correspond to the overall coding interval size value 1940. Further, an interval size 2052 provided by the interval size determination block 2045 may correspond to the interval size 1952.

For example, the decoder core 2013 may correspond to the decoder core 230.

The arithmetic encoder 1910 and the arithmetic decoder 2090 may optionally be supplemented by or combined with any of the features, functionalities and details described herein with respect to the other embodiments, both individually or in combination.

Figure 21:
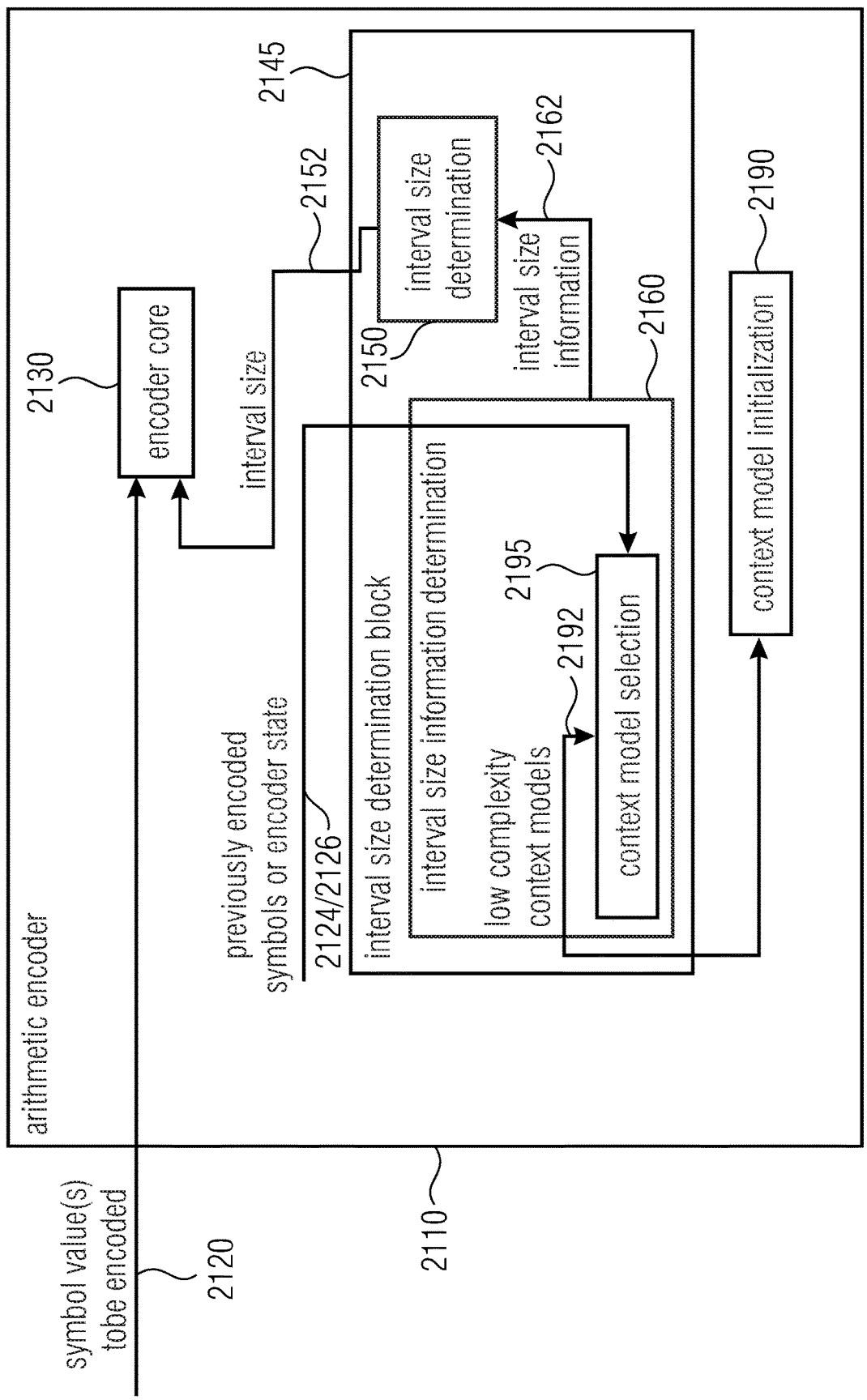
FIG. 21 illustrates an arithmetic encoder according to an embodiment.
Figure 22:
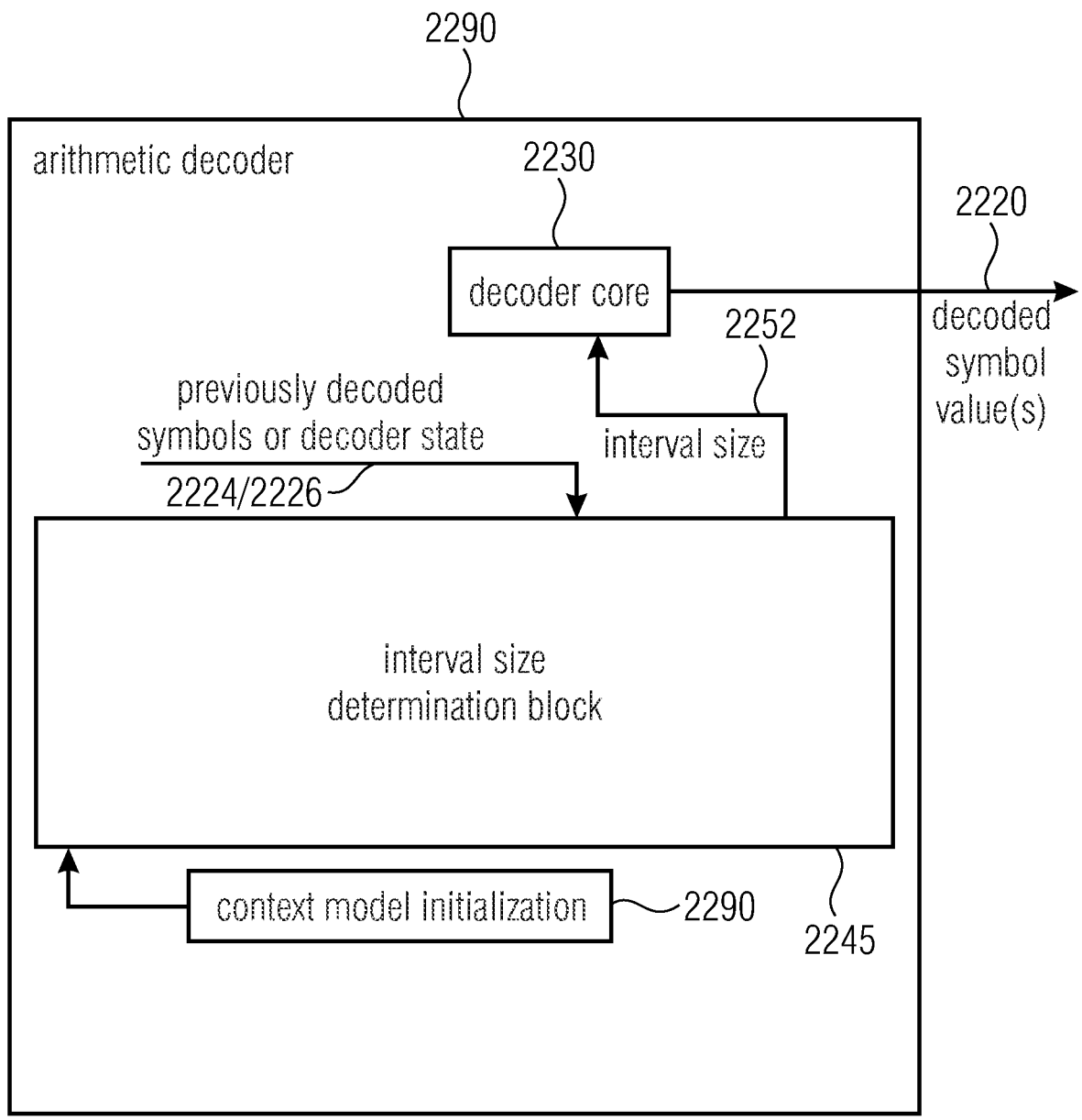
FIG. 22 illustrates an arithmetic decoder according to an embodiment.

1.9 Arithmetic Encoder 2110 and Arithmetic Decoder 2290 According to FIGS. 21 and 22

FIG. 21 illustrates an arithmetic encoder 2110 according to an embodiment of the invention, e.g. according to the eighth aspect. For example, the arithmetic encoder 2210 may correspond to any of the arithmetic encoders 110, 310, 510, 810, 1010, 1210, 1410, 1910.

The arithmetic encoder 2110 comprises an encoder core 2130, which may correspond to the encoder core 130, for encoding one or more symbol values 2120 to be encoded. The arithmetic encoder 2110 comprises interval size determination block 2145 (e.g. 145) for determining an interval size 2152 for the encoding 2130 of the one or more symbol values 2120. The interval size determination block 2145 comprises an interval size information determination 2160 (e.g. 160) for determining an interval size information 2162. The interval size determination block further comprises an interval size determination 2150 (e.g. 150) which is to determine the interval size 2152 on the basis of the interval size information 2162.

The interval size information determination 2160 comprises a context model selection 2195 which is to select a low complexity context model out of a plurality of low complexity context models 2192 in dependence on one or more previously encoded symbol values 2124 or in dependence on an encoder state 2126 for determining the interval size information 2162. The arithmetic encoder 2110 comprises a context model initialization 2190 which is to initialize the plurality of low complexity context models 2192. For example, the context model initialization 2190 provides the context information 170 of FIG. 1.

For example, each of the low complexity context models 2192 may comprise one or more parameters. The context model initialization 2190 is configured to initialize the one or more parameters of a plurality of low complexity context models, for example a subset or all of the low complexity context models 2192, such that one or more parameter values of two or more low complexity context models, which are associated with a same syntax element to be decoded, and which are associated with different environments of one or more previously encoded symbols 2124 or different encoder states 2126, are identical.

For example, the symbol value 2120 to be encoded may be associated with a syntax element, for example a flag or a transform coefficient. In other words, the symbol value 2120 may be associated with a specific content to which it refers. The low complexity context models 2192 may comprise different context models for symbol values which are associated with different syntax elements. Further, for a specific syntax element, the low complexity context models 2192 may comprise multiple low complexity context models for different environments of one or more previously encoded symbols and/or different encoder states. The context model selection 2195 may select the context model for the symbol value 2120 to be encoded in dependence on one or more previously encoded symbols 2124 and/or in dependence on the encoder state 2126 and/or in dependence on the syntax element associated with the symbol value 2120 to be encoded. The context model initialization 2190 initializes the low complexity context models 2192 so that the low complexity context models 2192 comprise two or more low complexity context models for a same syntax element or a specific syntax element, the two or more low complexity context models for the same syntax element being associated to different environments of one or more previously encoded symbols and/or different encoder states. One or more parameters values of the two or more low complexity context models for the same syntax element are identical.

Thus, the context model selection 2194 may omit an evaluation of the previously encoded symbols 2124 and/or the encoder state 2126. For example, the context model selection 2195 may select the context model for the symbol value 2120 to be encoded according to the syntax element associated with the symbol value 2120.

For example, the interval size information determination 2160 may determine the interval size information 2162 in dependence on the context model selected for the symbol value 2120 to be encoded.

For example, the arithmetic encoder 2110 may operate in one of a first operation mode and a second operation mode. For example, the first operation mode is a normal operation mode, for example a high efficiency operation mode, and the second operation mode is a high throughput operation mode.

For example, the implementation of the first and the second operation mode is in accordance with the description of the previous embodiments.

For example, the arithmetic encoder 2110 may use the low complexity context models 2192 in the second operation mode, and may use a plurality of high complexity context models in the first operation mode.

For example, the context model selection 2195 may, when the arithmetic encoder 2110 is operating in the first operation mode, select a high complexity context model out of the plurality of high complexity context models in dependence on one or more previously encoded symbols 2125 or in dependence on the encoder state 2126. The interval size information determination 2160 may use the selected high complexity context model or the selected low complexity context model to determine the interval size 2162. For example, the context model initialization 2190 may initialize the plurality of high complexity context models. For example, parameter values or sets of parameter values of two or more high complexity context models, which are associated with a same syntax element to be encoded, and which are associated with different environments of one or more of the previously encoded symbols 2125 and/or different encoder states 2126 are different.

For example, the arithmetic encoder 2110 may be configured to determine whether one or more parameter values of two or more low complexity context models, which are associated with a same syntax element to be encoded, and which are associated with different environments of one or more of the previously encoded symbols 2124 and/or different encoder states 2126, are identical. In case, that the one or more parameter values of the two or more low complexity context models are identical, the arithmetic encoder 2110 may selectively disable a distinction between different environments of one or more previously encoded symbols 2124 or different encoder states 2126. For example, the arithmetic encoder 2110 may be implemented in a video encoder and the symbol value 2120 to be encoded may be associated with an image portion. For example, the image portion associated to the symbol value 2120 may be independently encoded, or may be a one direction predicted image portion, or a two direction predicted image portion. There may be different context models for the cases that the symbol value 2120 is associated to an independent image, a one direction predicted image, or a two direction predicted image, for example beyond the high complexity context models. Thus, the context model selection 2195 may distinguish between said image types. For example, the context model selection 2195 may select the context model in accordance with the image type of said image types. For example, in the second operation mode, when the context model selection 2195 may select the context model from the plurality of low complexity context models 2195, the interval size information determination 2160 may provide the interval size information 2162 in dependent from the type of the image portion. For example, two or more of the low complexity context models 2192 associated with a same syntax element but with different types of the image portion may comprise one or more identical parameters.

For example, the context model initialization 2190 may initialize a plurality of high throughput context models. For example, the high throughput context models may refer to or may be used for an operation of the arithmetic encoder 2110 in a high throughput mode, for example the second operation mode. The context model initialization 2119 may initialize the plurality of high throughput context models such that parameter values or sets of parameter values of two or more high throughput context models, which are associated with a same syntax element to be encoded and different types of image portions, are identical.

For example, the plurality of high complexity context models, which may be initialized by the context model initialization 2190, may depend on an encoding quality parameter, for example a picture quality parameter. That is, there may be different context models within the plurality of high complexity context models for different values of the quality parameter.

For example, the plurality of high throughput context models, the plurality of low complexity context models 2192, may be independent from the encoding quality parameter. For example, the context model initialization 2190 may initialize each of the high efficiency context models, or the high complexity context models, using an individual set of context model initialization parameters, and the context model initialization 2190 may initialize two or more of the low complexity context models 2192, or the high throughput candidate context models, using a common set of context model initialization parameters.

FIG. 22 illustrates an arithmetic decoder 2290 according to an embodiment of the invention, e.g. according to the eighth aspect. For example, the arithmetic decoder 2290 may correspond to any of the arithmetic decoders 290, 490, 690, 990, 1190, 1390, 2090.

The arithmetic decoder 2290 comprises a decoder core 2230 for decoding one or more symbol values to be decoded so as to obtain one or more decoded symbol values 2220. The arithmetic decoder 2290 comprises an interval size determination block 2245 which is to determine an interval size 2252 for the decoding 2230. The interval size determination block 2245 corresponds to the interval size determination block 2145 of FIG. 21 with the exception that previously decoded symbols 224 and/or decoder states 2226 are provided to the interval size determination block 2245 instead of the previously encoded symbols 2124 and the encoder state 2126. Further, the symbol value to be encoded is replaced by the symbol value to be decoded. The arithmetic decoder 2290 comprises a context model initialization 2290 which may correspond to the context model initialization 2190, and which accordingly may provide the low complexity context models 2192 and optionally also high complexity context models.

For example, the decoder core 2230 may correspond to the decoder core 130. The interval size 2252 may correspond to the interval size 2152.

The context model initialization as described with respect to the arithmetic encoder 2110 and the arithmetic decoder 2290 may optionally be combined with any of the previously described arithmetic encoders and arithmetic decoders. For example, the interval size determination block 2145 may correspond to any of the interval determination blocks 145, 345, 545, 845, 1045, 1245, 1445, 1945. The interval size information determination of the interval size determination block of the respective arithmetic encoders and decoders may determine the interval size information in dependence on a context model selected for the symbol value to be encoded or the symbol value to be decoded, for example, as described with respect to the arithmetic encoder 2110.

The arithmetic encoder 2110 and the arithmetic decoder 2290 may optionally be supplemented by or combined with any of the features, functionalities and details described herein with respect to the other embodiments, both individually or in combination.

Figure 23:
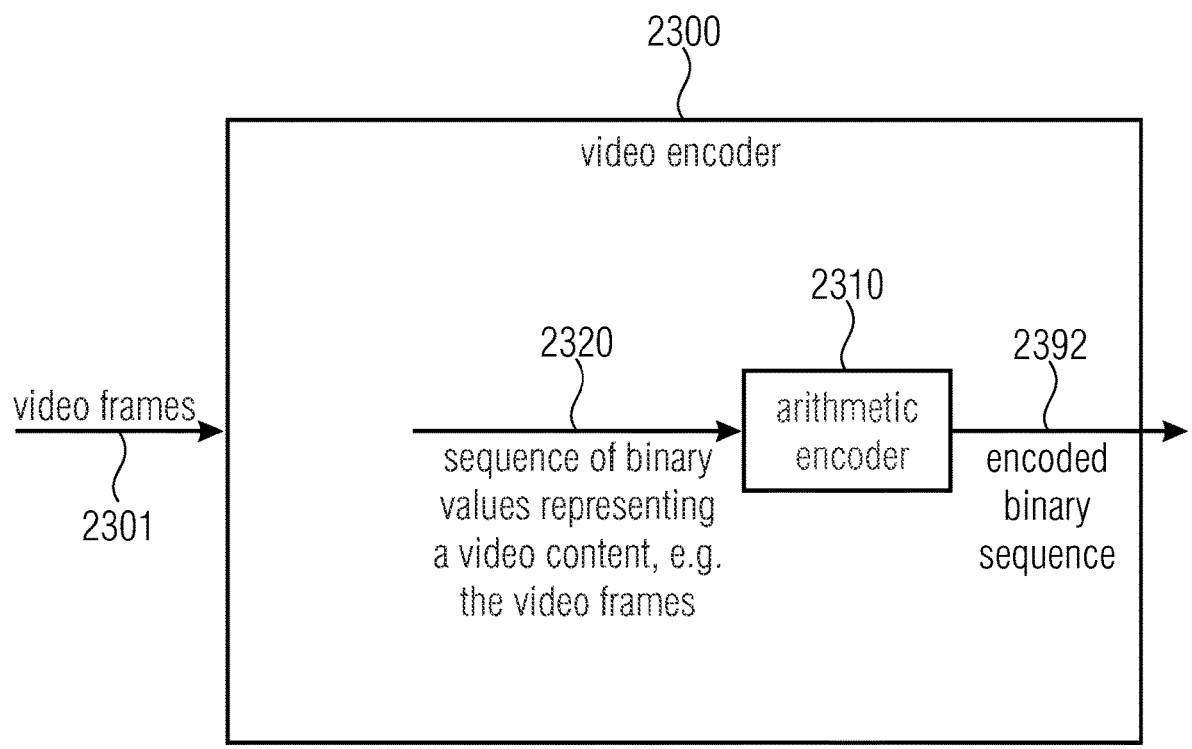
FIG. 23 illustrates a video encoder according to an embodiment.
Figure 24:
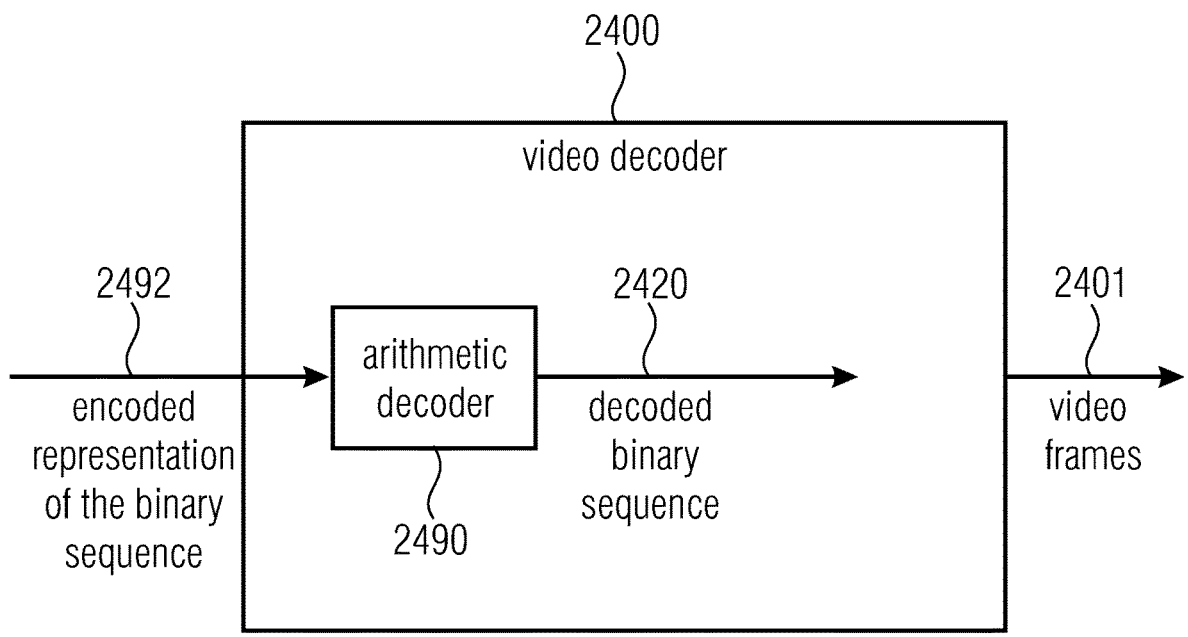
FIG. 24 illustrates a video decoder according to an embodiment.

1.10 Video Encoder 2300 and Video Decoder 2400 According to FIGS. 23 and 24

FIG. 23 illustrates a video encoder 2300 according to an embodiment. The video encoder 2300 is to encode a plurality of video frames 2301. The video encoder comprises an arithmetic encoder 2310 for providing an encoded binary sequence 2392 on the basis of a sequence of binary values 2320 representing a video content.

For example, the arithmetic encoder may correspond to any of the arithmetic encoders 110, 310, 510, 810, 1010, 1210, 1410, 1910, 2110. Accordingly, the symbol value to be encoded 120, 320, 520, 820, 1020, 1220, 1420, 1920, 2120 may correspond to one or more of the binary values of the sequence of binary values 2320. The encoded binary sequence 2392 may correspond to the bit stream 192.

FIG. 24 illustrates a video decoder 2400 according to an embodiment. The video decoder 2400 is configured to decode a plurality of video frames 2401. The video decoder 2400 comprises an arithmetic decoder 2490 for providing a decoded binary sequence 2420 on the basis of an encoded representation 2492 of the binary sequence.

For example, the arithmetic decoder 2490 may correspond to any of the arithmetic decoders 290, 490, 690, 990, 1190, 1390, 2090, 2290. The encoded representation 2492 may correspond to the encoded representation 292, or may correspond to the encoded binary sequence 2392 provided by the video encoder 2310. The decoded symbol values 220, 420, 620, 920, 1120, 1320, 2020, 2220 may correspond to one or more of similar values of the decoded binary sequence 2420.

For example, the video encoder 2300 may comprise a coding block for providing the sequence of binary values 2320 on the basis of the video frames 2301. The video decoder 2400 may comprise a decoding block for providing the video frames 2401 on the basis of the decoded binary sequence 2420.

2. Further Embodiments

In the following, further embodiments of the invention are described. The embodiments described in the following, may optionally be supplemented by or combined with individual features, functionalities and details or combinations of features, functionalities and details described with respect to the previously described embodiments, such as the arithmetic encoders 110, 310, 510, 810, 1010, 1210, 1410, 1910, 2110 and the arithmetic decoders 290, 490, 690, 990, 1190, 1390, 2090, 2290. Equivalently, the previously described embodiments may optionally be supplemented by or combined with individual features, functionalities or details, or combinations of features, functionalities or details, described with respect to the previously described embodiments, such as the arithmetic encoders 110, 310, 510, 810, 1010, 1210, 1410, 1910, 2110 and the arithmetic decoders 290, 490, 690, 990, 1190, 1390, 2090, 2290. For example, features designated with equal names, may have equivalent or similar functionalities.

Conventional Solutions

Features described herein may optionally be implemented by embodiments of the invention. For example, the features may be combined with embodiments both individually or in combination.

Assume, for example, a probability estimator (which may, e.g., part of the interval size information determination) that is configured to maintain one or more so-called context models. The probability estimator maintains, for example, for each context model, a first and a second source statistic value as well as a first and a second window size parameter. For example, for each context model, the probability estimator is configured to determine the first source statistic value (e.g. a state variable value) (e.g. $a_t$) (which is, for example, based on a frequency of previously decoded binary values $x_{t-1}, x_{t-2}, \ldots$) (and which is, for example, also designated as a "counter variable" or "counter") using the first window size (e.g. $w_a$) (which may, for example, be represented by a window size variable), for example, on the basis of a previously decoded binary sequence, and to determine a second source statistic value (e.g. $b_t$) (which is, for example, based on a frequency of previously decoded binary values $x_{t-1}, x_{t-2}, \ldots$) using a second window size (e.g. $w_b$), for example, on the basis of the previously decoded binary sequence. The probability estimator is, for example, configured to determine for each context model a probability estimate (e.g. $p_t$) on the basis of the first source statistic value (e.g. $a_t$) and on the basis of the second source statistic value (e.g. $b_t$). The binary entropy encoder or decoder is, for example, configured to execute the binary entropy encoding or entropy decoding of a binary decision based on the probability estimate (e.g. $p_t$). The binary entropy encoder produces, for example, a first code length (an averaged portion of bits, which may be a fractional number, that is written to the bit stream and that can be attributed to the encoding of the binary decision) if the binary decision is a "1" or a second code length if the binary decision is a "0". The binary entropy encoder may, for example, be configured such that the first code length is close to $-\log_2 p_t$ and that the second code length is close to $-\log_2(1-p_t)$. For example, if the binary entropy encoder or decoder is a binary arithmetic coder, the probability estimate is used to determine the position where the coding interval is split into two subintervals.

In an advantageous embodiment, the video decoder employs a quantization parameter (e.g. QP) (which may also be denoted as quality parameter, cf., e.g. aspect 8) which controls the trade-off between bit stream size and video quality.

For example, one or more context models are used, each being equipped with a first and a second source statistic value ($a_t$ and $b_t$) as well as a first and a second window size parameter ($w_a$ and $w_b$).

For example, most of the binary decisions to be decoded are associated with one of the context models while some are not (e.g. bits for headers and so-called bypass bins which are, for example, typically encoded with a code length of 1). The first and the second source statistic value of the context model are used, for example, to derive a probability estimate (e.g. $p_t$), which is used to decode a binary decision $x_t$ by e.g. employing a binary arithmetic decoder. Afterwards, the first and the second source statistic value is updated in dependence of the decoded binary decision.

The first and the second source statistic value shall, for example, be represented as positive integer values $a_t$ and $b_t$ that can be represented with $BITS_a$ and $BITS_b$ bits.

General remark: A shift by a negative number shall be interpreted by a shift into the opposite direction by the negated number.

For example, the following equations can be used for updating $a_t$ in dependence of the decoded binary decision $x_t$:

$$a_{t+1} = a_t + x_t \cdot (ONE_a >> n_a) - (a_t >> n_a)$$

where $$ONE_a = (1 << BITS_a) - k_a,$$

with $k_a$ equal to 0 or 1 and where $$w_a=1<<n_a$$

Analogously, the following equations can, for example, be used for updating $b_t$ in dependence of the decoded binary decision $x_t$:

$$b_{t+1}=b_t+x_t\cdot(ONE_b>>n_b)-(b_t>>n_b)$$

where $$ONE_b=(1<<BITS_b)-k_b$$

with $k_b$ equal to 0 or 1 and where $$w_b=1<<n_b$$

The probability estimate $p_t$ is derived, for example, from the first and the second source statistic value according to the following equation:

$$P_t=((a_t>>(BITS_a-BITS_{min}))+(b_t>>(BITS_b-BITS_{min})))>>1$$

$$p_t=P_t/(1<<BITS_{min})$$

where $$BITS_{min}=\min(BITS_a,BITS_b)$$

Note that the probability estimate $P_t$ may, for example, be divided by $1<<BITS_{min}$ in order to yield an actual probability value $p_t$ between 0 and 1, which can then be used for the coding interval subdivision in arithmetic decoding. However, in a practical implementation, the actual value $p_t$ is usually not calculated, for example, when integer arithmetic is employed.

Before the decoding of, for example, a picture starts, or from time to time, whenever it is desired that the state of the decoder shall be reset, the parameters of all context models are initialized.

The arithmetic encoder and decoder maintain a coding interval R (for example a positive integer). Encoding or decoding of a binary decision (also denoted "bin" in the following) corresponds to subdividing R. This corresponds to multiplying the current coding interval R with the probability estimate $p_t$ in order to yield a subinterval for symbol "1". To yield the subinterval for symbol "0", R is multiplied with $1-p_t$. Note that this multiplication can also be approximated by using a 2-D lookup table that is accessed with quantized versions of R and $p_t$. Depending on the one value of the bin, the one or the other coding interval is selected as new coding interval.

A widely used technique for coding interval subdivision employs the so-called MPS/LPS representation (less probable symbol and more probable symbol) as described in the following.

Instead of encoding a binary decision $x_t$ with probability estimate $p_t$, the following new variables are derived:

$$x_{LPS}=p_t\geq0.5?1-x_t:x_t$$

$$p_{LPS}=p_t\geq0.5?1-p_t:p_t$$

The two subintervals are then calculated as $R_{LPS}=R\cdot p_{LPS}$ and $R_{MPS}=R-R_{LPS}$. The decoder can reconstruct the actual value $x_t$ from $x_{LPS}$. The advantage of this concept is that the arithmetic coder only needs to be able to operate with probability values that do not exceed 0.5, which may simplify the implementation.

Multiplication-Based Coding Interval Subdivision

An approximation of the computation of $P_{LPS}$ (which corresponds to $P_{LPS}$) uses, for example, the following computation, which has a particularly low computational complexity:

$$val_{MPS}=P_t>>(BITS_{min}-1)$$

$$P_{LPS}=(val_{MPS}?(1<<BITS_{min})-1-P_t:P_t)$$

$$R_{LPS}=(((R>>SHIFT_R)\cdot(P_{LPS}>>SHIFT_P))>>SHIFT_{MUL})+add_{LPS}$$

Here, for example, the value $add_{LPS}$ is added in order to ensure that $R_{LPS}$ cannot be smaller than $add_{LPS}$. The three parameters $SHIFT_R$, $SHIFT_P$, and $SHIFT_{MUL}$ can be used to control the register width of the multiplication. In a practical application, where R may, for example, be in the range [256,510] (before encoding of a binary decision), the following parameter values could be an appropriate choice (example):

$$SHIFT_R=5$$

$$SHIFT_P=BITS_{min}-6$$

$$SHIFT_{MUL}=1$$

$$add_{LPS}=4$$

Whenever the coding interval falls below a predetermined threshold $R_{min}$ (for example $R_{min}=256$ as used in the M coder of AVC or HEVC), the renormalization process is triggered in order to ensure that $R\geq R_{min}$. For example, R can be doubled repeatedly until $R\geq R_{min}$ is fulfilled. Note that the process of renormalization also controls writing and reading of the bitstream (i.e., signaling a value inside of the coding interval), for example like done in the M coder of AVC and HEVC.

For example, the first computation rule 555 or the multiplication operation 759 may implement the herein described multiplication Invention An embodiment according to the present invention describes a new approach for achieving scalability in terms of computational complexity in the probability estimation stage and the arithmetic coding stage as used, for example, for the binary entropy encoding or decoding stage of a video encoding or decoding approach.

Consider a coding application for video, audio or other types of data that employs probability estimation and arithmetic coding. Typically, a corresponding encoder or decoder implementation (in hardware or software) is designed to guarantee a particular maximum number of bins per second (throughput) it can encode or decode. In this invention, according to an aspect, the probability estimation and entropy coding method is extended with a less computationally complex operation mode that can be switched on or off and that only involves very minor algorithmic additions to the existing method. In this way, by accepting a slightly larger compressed representation (due to the less accurate probability modeling), the achievable maximum throughput can be increased.

In order to achieve a (less computationally complex) high throughput operation mode, several simplifications (which can be used independently or in combination) are introduced as described in the following:

1. According to an aspect (e.g. embodiments of the first aspect), when the high throughput mode is enabled, one or both source statistics values $a_t$ and $b_t$ are not updated after the encoding of a binary decision. This means that the probability estimate $P_t$ of a context model is not modified as long as the high throughput mode is active.

2. According to an aspect (e.g. embodiments of the second aspect), when the high throughput mode is enabled, the computationally complex multiplication in the coding interval subdivision is replaced by a bit-shift.

Bit-Shift-Based Coding Interval Subdivision (Aspect)

In order to simplify the coding interval subdivision, the computation of the subinterval $R_{LPS}$ is modified as follows:

$$R_{LPS}=R>>g_{LPS}$$

with where $g_{LPS}$ is a positive integer greater 0. This corresponds, for example, to values $$p_{LPS} \in \{\frac{1}{2}, \frac{1}{4}, \frac{1}{8}, \ldots\}$$

The variable $g_{LPS}$ may be set (or may, in some embodiments need to be set) to a value that reflects the statistics of the associated binary decisions properly.

For examples, embodiments of the second computation rule 557 and the bit-shift operation 758 may implement the herein described bit-shift operation.

Fixed LPS Width-Based Coding Interval Subdivision (Aspect)

An even more simple method for the coding interval subdivision is as follows:

$$R_{LPS}=R'>>g_{LPS}$$

The variable R' is a constant that corresponds, for example, a typical average value of the actual value R. For example, R' may correspond to the predetermined value, to which the bit-shift operation 1558 may be applied. For example, if R may be a value in the interval [256, 510] (for example, before encoding a binary decision), the variable R' could, for example, be set to 384, which is, for example, in the middle of the interval. As a consequence, there is, for example, only one $R_{LPS}$ value for each allowed value of $g_{LPS}$.

An experimental evaluation shows that this approximation of the bit-shift-based coding interval subdivision creates a bit rate overhead. Smaller values of $g_{LPS}$ correspond to a larger bit rate overhead. Therefore, it may, for example, be useful to (optionally) use the fixed LPS width-based coding interval subdivision for sufficiently large $g_{LPS}$ only. In an advantageous embodiment, the fixed LPS width-based coding interval subdivision is used, for example, for $g_{LPS}>1$. For example, for $g_{LPS}=1$, either the bit-shift-based coding interval subdivision is used or a so-called bypass mode. This concept of a bypass mode is, for example, known from the arithmetic coding engines of H.264/AVC or H.265/HEVC and the differences relative to the bit-shift-based coding interval subdivision with $g_{LPS}=1$ are outlined in the following:

If, for example, R is in the interval [256,510], the largest value that can occur for $R_{LPS}$ is 510>>1=255 and the largest value that can occur for $R_{MPS}$ is $R-R_{LPS}=510-(510>>1)=255$. Therefore, it is, for example, guaranteed that the renormalization step is typically a left-shift of R, for example, by 1. I.e., after renormalization R is the same value as before the coding interval subdivision, for example, except for the least significant bit, which is, for example, set to zero. Therefore, the bypass mode optionally omits the right shift of the coding interval subdivision and the left shift of the renormalization. Furthermore, since, for example, $R_{LPS} \approx R_{MPS}$, it is, for example, not necessary to do the conversation from $x_t$ to $x_{LPS}$ and instead, $x_t$ is optionally encoded in the bypass mode.

In an optional more general variant of the fixed LPS width-based coding interval subdivision, a mapping table (or a lookup table) of $g_{LPS}$ values to $R_{LPS}$ is optionally used where the representative values for $R_{LPS}$ are, for example, optimized to the application.

Optional Improvements (Optional, Aspect)

Furthermore, consider the case where all values for $R_{LPS}$ are, for example, multiples of a predefined power of two and, for example, the initial value of R is also set to a value that is a multiple of the same predefined power of two. Then, the value of R, $R_{LPS}$, and $R_{MPS}$ is, for example, typically guaranteed to be a multiple of this power of two and a corresponding number of LSBs (for example, equal to the exponent of the power of two) are, for example, guaranteed to typically be zero. A practical implementation could, for example, exploit these properties and represent the coding interval with a reduced number of bits. For example, when R' is set to 384 and when, for example, the largest allowed value for $g_{LPS}$ is 3, all possible values for $R_{LPS}$ are, for example, multiples of $2^4=16$ and an R could be represented, for example, with 4 bit less. I.e., for example, instead of 9 bits, only 5 bits would be sufficient and the allowed values for R would be, for example, in the interval [16,30]. In an advantageous embodiment, the initial value of R is (optionally) set to a multiple of a power of two and, for example, all possible values of $R_{LPS}$ are also restricted to multiples of the same power of two.

This concept may, for example, be useful when an encoder should support the high throughput mode and the regular mode. For example, consider there exist two types of decoders for which an encoder shall be able to produce bitstreams. The one type of decoders supports, for example, both, the regular and, optionally, also the high throughput coding mode. The other type of decoders, for example, only supports the high throughput mode.

For example, an encoder that already supports the regular coding mode only can be extended to also support the high throughput mode with minimal changes as described above.

For example, the same argumentation holds for decoders that support both, the regular and the high throughput mode.

Further Aspects

In the following, a computationally simple method for deriving $g_{LPS}$ from a probability estimate $p=P/(1<<BITS)$, where P and BITS are integers, is presented, which may optionally be used in embodiments of the invention, e.g. embodiments of the third aspect.

First, the integer representation of the corresponding LPS probability is derived, for example, as follows:

$$P_{LPS}=P \geq P_{HALF}?(1<<BITS)-P:P$$

where $$P_{HALF}=1<<(BITS-1)$$

is the integer representation of probability 0.5 represented with BITS bits. For example, p can be the probability estimate of the probability estimator $p_t$ as described above and BITS can be the associated variable $BITS_{min}$. Or, to give another example, p and BITS can be derived from a context initialization method as described below.

The shift parameter $g_{LPS}$ is then, for example, derived as $$g_{LPS}=\min(g_{MAX},BITS-1-\lfloor \log_2(P_{LPS}+(P_{LPS}>>2)) \rfloor)$$

Note that the operation $\lfloor \log_2 x \rfloor$ is, for example, simply the position of the most significant bit of x, which can be derived very efficiently.

The parameter $g_{MAX}$ is (optionally) used to limit the maximum allowed value for $g_{LPS}$.

The above method turned out to be a good trade-off between computational complexity and the resulting compression. Note that the theoretically optimal values can also be derived, but this would involve a much more complex operation.

Consider an arithmetic coder that represents the coding interval R with $BITS_{R1}$ bits. Correspondingly, the allowed range of values for R before encoding of a binary decision shall, for example, be in the interval $$[1<<(BITS_{R1}-1),(1<<BITS_{R1})-1].$$

For example, when $BITS_R=9$, the interval is [256, 511]. According to an (optional) aspect, it may be beneficial if the bit-shift-based coding interval subdivision can operate with a coding engine that represents the coding interval R with $BITS_{R2}<BITS_{R1}$ because a lower resolution may be sufficient, depending on $g_{MAX}$. For example, $BITS_{R2}=g_{MAX}+ADD_{MAX}$ where $ADD_{MAX}$ is an integer greater 0. Note that $ADD_{MAX}=1$ is the smallest value for which the result of the bit-shift-based coding interval subdivision is guaranteed to be greater zero, which may be fulfilled in order to allow the coding engine to work. Depending on the implementation of the coding engine, it may, in some cases, be useful to ensure larger minimum values for $R_{LPS}$ which can be realized by increasing $ADD_{MAX}$. This implementation of R, which may correspond to the overall coding interval size value, may optionally be implemented in embodiments of the invention, e.g. in embodiments of the fifth aspect.

Next, according to an (optional) aspect, the method of deriving $g_{LPS}$ is seamlessly integrated into a method for context model initialization. That is, the method for context initialization may optionally combined with other aspects, e.g. aspects describing a determination of the interval size or the interval size information. Further it is noted, that the here described context initialization, may optionally be implemented by the context initialization described with respect to embodiments of the fourth aspect, e.g. in section 1.5

Consider the following method for context model initialization. Input are two integer values slopeIdx and offsetIdx, which are, for example, predetermined parameters associated with a context model. Both values may, for example, be from the interval [0,7]. A further (optional) input to the process is, for example, an integer quality control parameter qp.

A probability estimate $p_{init}$ is derived from these parameters, for example, as follows:

$$p_{init}=P_{clip}/128$$

where $$P_{clip}=\min(127,\max(1,P_{init}))$$

$$P_{init}=((\text{slope}\cdot(qp-16))>>1)+\text{offset}$$

and where $$\text{slope}=\text{slopeIdx}-4$$

and $$\text{offset}=\text{offsetIdx}\cdot 18+1$$

The source static values $a_t$ and $b_t$ can, for example, directly be initialized from $P_{clip}$ as follows ($p_{init}$ is not needed):

$$a_t=P_{clip}<<(BITS_a-7)$$

$$b_t=P_{clip}<<(BITS_b-7)$$

According to an aspect, it is a particularly low additional implementation effort to extend this approach to also be able to implement the derivation of $g_{LPS}$. Simply set $P=P_{clip}$ and BITS=7 (example).

In an advantageous embodiment, the variable $BITS_a=10$ and $BITS_a=14$ (example). In an advantageous embodiment, the above method for context model initialization use the same set of parameters slopeIdx and offsetIdx (one or more instances per context model) for deriving $a_t$, $b_t$, and $g_{LPS}$.

Complexity-Scalable Context Derivation (Aspect of the Invention)

The context derivation described herein, or parts thereof, may optionally be implemented by the context initialization as described with respect to the eighth aspect, e.g. in section 1.9. Further it is noted, that the context initialization may optionally be combined with other aspects of the invention, e.g. with aspects referring to the determination of the interval size information or the interval size.

Next, a scheme for complexity-scalable context derivation is described. This concept can be used individually and optionally also in combination with any of the features, functionalities and details described in the other sections and in defined in the claims.

Assume, for example, an entropy coding scheme where the encoding and decoding procedure includes the derivation of context model indexes, for example, employing a plurality of context derivation rules. For example, a particular binary decision to be encoded or decoded can use one of a number of context models (or, for example, a selected context model) depending on previously encoded binary decisions and/or depending on the current state of the encoder or decoder. Encoder and decoder can, for example, either operate in a high efficiency mode or in a high throughput mode. For example, in the high efficiency mode, each context model employs a first probability estimator while, for example, in high throughput mode, each context model employs a second probability estimator. The first and second probability estimator may, for example, be according to an arbitrary one described in this document. For example, for each context model, a first set of initialization parameters is maintained for initializing the context model when it operates in high efficiency mode (for example, using the first probability estimator), and a second set of initialization parameters is maintained for initializing the context model when it operates in high throughput mode (for example, using the second probability estimator). For example, the first probability estimator could maintain two state variables $a_t$ and $b_t$ with the first set of initialization parameters consisting of (or comprising), for example, slopeIdx and offsetIdx (as described above) while the second probability estimator could, for example, maintain a shift parameter $g_{LPS}$ and MPS value $val_{MPS}$ (as described above) with the second set of initialization parameters, for example, consisting of (or comprising) initial value for $g_{LPS}$ and for $val_{MPS}$. In high throughput mode, no update of source statistics values is required which may, for example, lead to a higher throughput than in the high efficiency mode. Furthermore, consider, for example, a context derivation rule that derives the context model to be used for encoding or decoding a particular binary decision. For example, the context derivation rule could select one out of two candidate context models based on the preceding binary decision encoded or decoded. If, for example, the context initialization values $g_{LPS}$ and for $val_{MPS}$ are set to the same values for both candidate context models, the context derivation rule needs not to be carried out, which may increase the achievable throughput. For example, this method implicitly reduces the number of different context models by skillfully setting $g_{LPS}$ and for $val_{MPS}$ to the same values for selected context models.

In an advantageous embodiment, encoder and decoder (optionally) distinguish between three types of pictures or picture segments. For example, denoted I, P, and B slices (e.g. independent slices, one-direction-prediction slices and two-direction-prediction slices). Furthermore, the encoder and decoder optionally maintain a picture quality parameter qp. For example, for the first probability estimator (for example, used for high efficiency mode), each context model is associated with one set of context initialization parameters per slice type (for example, I, P or B slice). For example, for the second probability estimator (for example, used for high throughput mode), each context model is associated with one set of context initialization parameters independently of the slice type.

In another advantageous embodiment, the context model initialization method (for example, initializing the internal state of a context model based on the set of context initialization parameters like for example slopeIdx and offsetIdx) (optionally) depends on the parameter qp for the first probability estimator while for the second probability estimator it is independent of the qp.

In another advantageous embodiment, a context derivation rule (optionally) selects one out of a number of candidate context models to be used for encoding or decoding a binary decision. For example, in high efficiency mode, each of the candidate context models uses an individual set of context model initialization parameters while, for example, in high throughput mode, two or more candidate context models use the same sets of context model initialization parameters.

Further Embodiments (Examples)

In an advantageous embodiment, the encoder and/or the decoder use the following high throughput configuration for the coding interval subdivision. For example, the shift parameter $g_{LPS}$ may be an integer from the interval [1, 4] and, before encoding/decoding of a binary decision, the coding interval R may, for example, be an integer value in the interval [256, 511]. At the beginning of the encoding/decoding, the coding interval R is, for example, set to an initial value of 512−n·8 where n is a positive integer, for example n=4. For example, for $g_{LPS}$=1, the bypass mode of CABAC is used for encoding/decoding binary decisions. That is, $x_t$ is, for example, arithmetically encoded/decoded and the value R is not modified (for example, omitting the right-shift by one from the coding interval subdivision and the subsequent left-shift by 1 from the renormalization). For example, for $g_{LPS}$>1, the fixed LPS width-based coding interval subdivision is used. That is, $R_{LPS}$=R'>>$g_{LPS}$, for example with R'=384, and $R_{MPS}$=R−$R_{LPS}$. Note that, because, for example, the three LSBs of R are typically 0, this configuration encodes/decodes exactly the same bitstream as the following one:

The shift parameter $g_{LPS}$ may, for example, be an integer from the interval [1, 4] and, before encoding/decoding of a binary decision, the coding interval R may, for example, be an integer value in the interval [32, 63]. At the beginning of the encoding/decoding, the coding interval R is, for example, set to an initial value of 64−n where n is a positive integer, for example n=4.

Alternatively to the high throughput mode, the same encoder and/or decoder can, for example, use the regular mode. That is, the encoder and/or decoder use, for example, the multiplication-based coding interval subdivision and a probability estimator per context model that is based on the update equations involving $a_t$ and $b_t$ as described above.

This configuration shows that an arithmetic encoder or decoder that already has such a regular coding mode can optionally extended with a high throughput mode with only adding very few new algorithmic elements.

3. Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An arithmetic decoder for decoding a plurality of symbols comprising symbol values,
   wherein the arithmetic decoder is configured to derive an interval size information for an arithmetic decoding of one or more symbol values to be decoded on the basis of one or more state variable values, which represent statistics of a plurality of previously decoded symbol values in a first mode of operation and to update the one or more state variable values and/or the interval size information for a decoding of one or more subsequent symbol values to be decoded in the first mode;
   wherein the arithmetic decoder is configured to disable an update of the one or more state variable values and/or of the interval size information in a second mode;
   wherein the arithmetic decoder is configured to receive a side information indicating whether the first mode, in which the update of the one or more state variable values and/or of the interval size information is enabled, or the second mode, in which the update of the one or more state variable values and/or of the interval size information is disabled, is used.

2. Arithmetic decoder according to claim 1, wherein the arithmetic decoder is configured to receive the side information indicating whether the first mode, in which the update of the one or more state variable values and/or of the interval size information is enabled, or the second mode, in which the update of the one or more state variable values and/or of the interval size information is disabled, is used, on a per frame basis, or on a per-slice-basis, or on a per-group-of-pictures basis or on a per-sequence basis.

3. Arithmetic decoder according to claim 1, wherein the arithmetic decoder is configured to receive the side information indicating whether the first mode, in which the update of the one or more state variable values and/or of the interval size information is enabled, or the second mode, in which the update of the one or more state variable values and/or of the interval size information is disabled, is used, on a per profile basis.

4. Arithmetic decoder according to claim 1, wherein the arithmetic decoder is configured to receive a dedicated side information indicating whether the first mode, in which the update of the one or more state variable values and/or of the interval size information is enabled, or the second mode, in which the update of the one or more state variable values and/or of the interval size information is disabled, is used.

5. Arithmetic decoder according to claim 1, wherein the arithmetic decoder is configured to re-use one or more previously determined state variable values and/or a previously determined interval size information when using the second mode.

6. Arithmetic decoder according to claim 1, wherein the arithmetic decoder is configured to acquire an interval size associated with a symbol value out of a plurality of possible symbol values on the basis of an overall coding interval size value and on the basis of the interval size information.

7. Arithmetic decoder according to claim 1, wherein the arithmetic decoder is configured to acquire an interval size associated with a symbol value out of a plurality of possible symbol values on the basis of an overall coding interval size value and on the basis of the interval size information using a first computation rule when operating in the first mode and using a second computation rule when operating in the second mode.

8. Arithmetic decoder according to claim 1, wherein the arithmetic decoder is configured to acquire an interval size associated with a symbol value out of a plurality of possible symbol values on the basis of an overall coding interval size value and on the basis of the interval size information
   using a multiplication of the overall coding interval size value, or of a bit-shifted version thereof, with an interval size information value, or with a bit-shifted version thereof when operating in the first mode; and
   using an application of a bit shift operation to the overall coding interval size value, wherein a number of bits by which the overall coding interval size value is shifted, is determined by the interval size information, when operating in the second mode.

9. Arithmetic decoder according to claim 8, wherein the arithmetic decoder is configured to determine a shift count value, which describes a number of bits by which the overall coding interval size value is shifted, on the basis of an integer value representation of the probability value comprising a number BITS of bits
   using a determination of a bit position of a most significant non-zero bit of an operand value which is increased or decreased with respect to the integer value representation of the probability value.

10. Arithmetic decoder according to claim 8, wherein the arithmetic decoder is configured to determine a shift count value, which describes a number of bits by which the overall coding interval size value is shifted, on the basis of one or more initialization parameters.

11. The arithmetic decoder according to claim 1, wherein the arithmetic decoder is configured to acquire an updated version $a_{t+1}$ of the first state value according to $$a_{t+1} = a_t + x_t \cdot (ONE_a >> n_a) - (a_t >> n_a)$$

wherein $a_t$ is a current version of the first state value,
wherein $x_t$ is a current decoded symbol,
wherein $n_a$ is a window size information,
wherein $$ONE_a = (1 << BITS_a) - k_a,$$

wherein BITSa is a number of bits used to represent the first state value,
wherein $k_a$ is a predetermined number; and/or
wherein the arithmetic decoder is configured to acquire an updated version $b_{t+1}$ of the first state value according to $$b_{t+1} = b_t + x_t \cdot (ONE_b >> n_b) - (b_t >> n_b)$$

wherein $b_t$ is a current version of the first state value,
wherein $x_t$ is a current decoded symbol,
wherein $n_b$ is a window size information,
wherein $$ONE_b = (1 << BITS_b) - k_b,$$

wherein $BITS_b$ is a number of bits used to represent the first state value,
wherein $k_b$ is a predetermined number.

12. The arithmetic decoder according to claim 1, wherein the arithmetic decoder is configured to perform a weighted combination of the first state variable value and of the second state variable value, in order to acquire the interval size information.

13. The arithmetic decoder according to claim 1,
wherein the arithmetic decoder is configured to derive a probability estimate $P_t$ according to $$P_t = ((a_t >> (BITS_a - BITS_{min})) + (b_t >> (BITS_b - BITS_{min}))) >> 1$$

where $$BITS_{min} = \min(BITS_a, BITS_b),$$

wherein $a_t$ is the first state variable value,
wherein $b_t$ is the second state variable value,
wherein $BITS_a$ is a number of bits used for a representation of $a_t$;
wherein $BITS_b$ is a number of bits used for a representation of $b_t$.

14. The arithmetic decoder according to claim 1, wherein the arithmetic decoder is attached to a video decoder,
wherein the video decoder is configured to decode a plurality of video frames,
wherein the video decoder uses the arithmetic decoder for providing a decoded binary sequence on the basis of an encoded representation of the binary sequence.

15. An arithmetic encoder for encoding a plurality of symbols comprising symbol values,
wherein the arithmetic encoder is configured to derive an interval size information for an arithmetic encoding of one or more symbol values to be encoded on the basis of one or more state variable values, which represent statistics of a plurality of previously encoded symbol values in a first mode of operation and to update the one or more state variable values and/or the interval size information for an encoding of one or more subsequent symbol values to be encoded in the first mode;
wherein the arithmetic encoder is configured to disable an update of the one or more state variable values and/or of the interval size information in a second mode;
wherein the arithmetic encoder is configured to provide a side information indicating whether the first mode, in which the update of the one or more state variable values and/or of the interval size information is enabled, or the second mode, in which the update of the one or more state variable values and/or of the interval size information is disabled, is used.

16. A method for decoding a plurality of symbols comprising symbol values,
wherein the method comprises deriving an interval size information for an arithmetic decoding of one or more symbol values to be decoded on the basis of one or more state variable values, which represent statistics of a plurality of previously decoded symbol values in a first mode of operation and to update the one or more state variable values and/or the interval size information for a decoding of one or more subsequent symbol values to be decoded in the first mode;
wherein the method comprises disabling an update of the one or more state variable values and/or of the interval size information in a second mode;
wherein the method comprises receiving a side information indicating whether the first mode, in which the update of the one or more state variable values and/or of the interval size information is enabled, or the second mode, in which the update of the one or more state variable values and/or of the interval size information is disabled, is used.

17. A non-transitory digital storage medium having a computer program stored thereon to perform the method for decoding a plurality of symbols comprising symbol values,
wherein the method comprises deriving an interval size information for an arithmetic decoding of one or more symbol values to be decoded on the basis of one or more state variable values, which represent statistics of a plurality of previously decoded symbol values in a first mode of operation and to update the one or more state variable values and/or the interval size information for a decoding of one or more subsequent symbol values to be decoded in the first mode;
wherein the method comprises disabling an update of the one or more state variable values and/or of the interval size information in a second mode;
wherein the method comprises receiving a side information indicating whether the first mode, in which the update of the one or more state variable values and/or of the interval size information is enabled, or the second mode, in which the update of the one or more state variable values and/or of the interval size information is disabled, is used,
when said computer program is run by a computer.

* * * * *